(12) United States Patent
Cleveland et al.

(10) Patent No.: US 11,094,161 B2
(45) Date of Patent: Aug. 17, 2021

(54) SYSTEM AND METHOD FOR CASHLESS EXCHANGE AT TABLE GAMES

(71) Applicant: ARISTOCRAT TECHNOLOGIES AUSTRALIA PTY LIMITED, North Ryde (AU)

(72) Inventors: Christopher Cleveland, Las Vegas, NV (US); Angelo Palmisano, Henderson, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

(21) Appl. No.: 16/586,168

(22) Filed: Sep. 27, 2019

(65) Prior Publication Data

US 2020/0111279 A1    Apr. 9, 2020

Related U.S. Application Data

(60) Provisional application No. 62/900,274, filed on Sep. 13, 2019, provisional application No. 62/900,004,
(Continued)

(51) Int. Cl.
*G07F 17/32* (2006.01)
*G06Q 20/32* (2012.01)
(Continued)

(52) U.S. Cl.
CPC ....... *G07F 17/322* (2013.01); *G06Q 20/3276* (2013.01); *G06Q 20/3278* (2013.01);
(Continued)

(58) Field of Classification Search
None
See application file for complete search history.

(56) References Cited

U.S. PATENT DOCUMENTS 6,394,907 B1    5/2002   Rowe
6,585,598 B2    7/2003   Nguyen
(Continued)

OTHER PUBLICATIONS

Notice of Allowance dated Dec. 2, 2020 for U.S. Appl. No. 16/586,246 (pp. 1-10).
(Continued)

*Primary Examiner* — Ronald Laneau
(74) *Attorney, Agent, or Firm* — Armstrong Teasdale

(57) ABSTRACT

A system includes a memory storing player positioning information associated with a table gaming environment and a smart table configured to use RFID-enabled chips and RFID sensors configured to detect the presence of RFID-enabled chips, including a dealer scratchpad area. The system also includes a processor configured to (a) detect presence of a player at a player position, (b) receive, from a player computing device, a request to buy into the wagering game for a buy-in value using a funds source from a digital wallet accessed from the player computing device, (c) display, to a dealer, a confirmation that the player is entitled to receive the buy-in value, (d) detect, from the at least one RFID sensor, a chip value within the scratchpad area, (e) compare the chip value to the buy-in value, and (f) display, to the dealer, a confirmation that the chip value matches the buy-in value.

20 Claims, 21 Drawing Sheets

Related U.S. Application Data filed on Sep. 13, 2019, provisional application No. 62/741,768, filed on Oct. 5, 2018, provisional application No. 62/741,641, filed on Oct. 5, 2018, provisional application No. 62/741,626, filed on Oct. 5, 2018.

(51) Int. Cl.
| | |
|---|---|
| *G06Q 20/36* | (2012.01) |
| *G06Q 20/40* | (2012.01) |
| *G06Q 30/02* | (2012.01) |
| *G06Q 50/34* | (2012.01) |
| *A63F 1/00* | (2006.01) |
| *G07F 17/34* | (2006.01) |

(52) U.S. Cl.
CPC ....... *G06Q 20/3672* (2013.01); *G06Q 20/405* (2013.01); *G06Q 30/0212* (2013.01); *G06Q 30/0215* (2013.01); *G06Q 30/0226* (2013.01); *G06Q 50/34* (2013.01); *G07F 17/3209* (2013.01); *G07F 17/3211* (2013.01); *G07F 17/3223* (2013.01); *G07F 17/3225* (2013.01); *G07F 17/3227* (2013.01); *G07F 17/3232* (2013.01); *G07F 17/3255* (2013.01); *G07F 17/3267* (2013.01); *G07F 17/3276* (2013.01); *G07F 17/3288* (2013.01); *A63F 2001/003* (2013.01); *G07F 17/3213* (2013.01); *G07F 17/3239* (2013.01); *G07F 17/34* (2013.01)

(56) References Cited

U.S. PATENT DOCUMENTS

| | | | |
|---|---|---|---|
| 6,739,975 B2 | 5/2004 | Nguyen | |
| 6,835,134 B2 | 12/2004 | Poole | |
| 6,866,586 B2 | 3/2005 | Oberberger | |
| 6,925,307 B1 | 8/2005 | Mamdani | |
| 7,114,718 B2 | 10/2006 | Grauzer | |
| 7,169,053 B2 | 1/2007 | Moik | |
| 7,240,036 B1 | 7/2007 | Mamdani | |
| 7,370,012 B2 | 5/2008 | Karns | |
| 7,390,263 B1 | 6/2008 | Acres | |
| 7,419,428 B2 | 9/2008 | Rowe | |
| 7,559,462 B2 | 7/2009 | Brosnan | |
| 7,749,079 B2 | 7/2010 | Chamberlain | |
| 7,771,277 B2 | 8/2010 | Chamberlain | |
| 7,819,742 B2 | 10/2010 | Chamberlain | |
| 7,997,978 B2 | 8/2011 | Kaminkow | |
| 8,333,653 B2 | 12/2012 | Nyman | |
| 8,382,582 B2* | 2/2013 | Sammon | A63F 13/00 463/25 |
| 8,393,955 B2 | 3/2013 | Arezina | |
| 8,449,378 B2 | 5/2013 | Michaelson | |
| 8,463,711 B2 | 6/2013 | Cunningham, II | |
| 8,523,657 B2 | 9/2013 | Michaelson | |
| 8,602,874 B2 | 12/2013 | Rowe | |
| 8,613,659 B2 | 12/2013 | Nelson | |
| 8,870,647 B2 | 10/2014 | Huizinga | |
| 8,956,222 B2 | 2/2015 | Lemay | |
| 8,961,298 B2 | 2/2015 | Czyzewski | |
| 8,992,306 B2 | 3/2015 | Iddings | |
| 9,058,716 B2 | 6/2015 | Rajaraman | |
| 9,245,414 B2 | 1/2016 | Radisich | |
| 9,269,231 B2 | 2/2016 | Curtin | |
| 9,311,769 B2 | 4/2016 | Lemay | |
| 9,317,995 B2 | 4/2016 | Nyman | |
| 9,324,209 B2 | 4/2016 | Cunningham, II | |
| 9,367,835 B2 | 6/2016 | Nelson | |
| 9,418,519 B2* | 8/2016 | Walker | G07F 17/3206 |
| 9,437,073 B2 | 9/2016 | Lestrange | |
| 9,454,872 B2 | 9/2016 | Muir | |
| 9,501,899 B2 | 11/2016 | Radisich | |
| 9,530,277 B2 | 12/2016 | Nelson | |
| 9,613,491 B2 | 4/2017 | Roth | |
| 9,659,444 B2 | 5/2017 | Norris | |
| 9,666,027 B2 | 5/2017 | Curtin | |
| 9,786,123 B2 | 10/2017 | Huizinga | |
| 9,852,578 B2 | 12/2017 | Nelson | |
| 9,875,499 B2 | 1/2018 | Washington | |
| 9,875,607 B2 | 1/2018 | Nelson | |
| 9,881,444 B2 | 1/2018 | Nelson | |
| 9,928,502 B2 | 3/2018 | Curtin | |
| 9,928,689 B2 | 3/2018 | Walker | |
| 10,013,850 B2 | 7/2018 | Nelson | |
| 10,032,334 B2 | 7/2018 | Cuddy | |
| 10,121,129 B2 | 11/2018 | Kalgi | |
| 10,121,318 B2 | 11/2018 | Lemay | |
| 10,121,319 B2 | 11/2018 | Radisich | |
| 10,134,223 B2 | 11/2018 | Mandava | |
| 10,134,234 B2 | 11/2018 | Lestrange | |
| 10,140,810 B1 | 11/2018 | Boyle | |
| 10,192,400 B2 | 1/2019 | Price | |
| 10,192,401 B2 | 1/2019 | Nelson | |
| 10,217,317 B2 | 2/2019 | Nelson | |
| 10,242,525 B1 | 3/2019 | Knust | |
| 10,242,530 B2 | 3/2019 | Arnone | |
| 10,282,939 B2 | 5/2019 | Yamaguchi | |
| 10,297,105 B2 | 5/2019 | Lemay | |
| 10,339,755 B2 | 7/2019 | Snow | |
| 10,360,761 B2 | 7/2019 | Higgins | |
| 10,360,763 B2 | 7/2019 | Higgins | |
| 10,373,430 B2 | 8/2019 | Higgins | |
| 10,380,843 B2 | 8/2019 | Higgins | |
| 10,417,867 B2 | 9/2019 | Nelson | |
| 10,453,297 B2 | 10/2019 | Lemay | |
| 10,460,560 B2 | 10/2019 | Cunningham, II | |
| 10,460,563 B2 | 10/2019 | Miri | |
| 10,546,463 B2 | 1/2020 | Higgins | |
| 10,573,129 B2 | 2/2020 | Higgins | |
| 10,621,826 B2 | 4/2020 | Higgins | |
| 10,643,426 B2 | 5/2020 | Higgins | |
| 10,699,527 B2 | 6/2020 | Higgins | |
| 10,706,683 B2 | 7/2020 | Higgins | |
| 10,720,016 B2 | 7/2020 | Nelson | |
| 10,726,668 B2 | 7/2020 | Nelson | |
| 10,755,520 B2* | 8/2020 | Moore | G07F 17/322 |
| 10,783,416 B2* | 9/2020 | Shigeta | A63F 13/80 |
| 2008/0045342 A1 | 2/2008 | Crowder, Jr. | |
| 2008/0305855 A1 | 12/2008 | Czyzewski | |
| 2009/0191933 A1 | 7/2009 | French | |
| 2010/0312625 A1 | 12/2010 | Miller | |
| 2011/0306400 A1 | 12/2011 | Nguyen | |
| 2015/0228153 A1 | 8/2015 | Hedrick | |
| 2015/0243133 A1 | 8/2015 | Nicholas | |
| 2016/0029155 A1 | 1/2016 | Kerr | |
| 2016/0234123 A1 | 8/2016 | Alisawi | |
| 2017/0076540 A1 | 3/2017 | Saffari | |
| 2017/0092054 A1 | 3/2017 | Petersen | |
| 2017/0092060 A1 | 3/2017 | Toohey | |
| 2017/0092061 A1 | 3/2017 | Nelson | |
| 2017/0289154 A1 | 10/2017 | Krieger | |
| 2018/0061179 A1 | 3/2018 | Miri | |
| 2018/0075690 A1* | 3/2018 | Moore | A63F 3/00157 |
| 2018/0108213 A1 | 4/2018 | Sanford | |
| 2018/0357850 A1* | 12/2018 | Moore | G07F 17/322 |
| 2019/0066441 A1 | 2/2019 | Lestrange | |
| 2019/0073873 A1 | 3/2019 | Lemay | |
| 2019/0096175 A1 | 3/2019 | Higgins | |
| 2019/0096180 A1 | 3/2019 | Petersen | |
| 2019/0102985 A1 | 4/2019 | Higgins | |
| 2019/0188951 A1 | 6/2019 | Nelson | |
| 2019/0188961 A1 | 6/2019 | Higgins | |
| 2019/0188962 A1 | 6/2019 | Higgins | |
| 2019/0188963 A1 | 6/2019 | Higgins | |
| 2019/0197526 A1 | 6/2019 | Higgins | |
| 2019/0197822 A1 | 6/2019 | Shepherd | |
| 2019/0197830 A1 | 6/2019 | Petersen | |
| 2019/0205866 A1 | 7/2019 | Higgins | |
| 2019/0244476 A1 | 8/2019 | Miltenberger | |
| 2019/0272704 A1 | 9/2019 | Lemay | |
| 2019/0325701 A1 | 10/2019 | Higgins | |
| 2020/0005595 A1 | 1/2020 | Nelson | |

(56) References Cited

U.S. PATENT DOCUMENTS

| | | |
|---|---|---|
| 2020/0043284 A1 | 2/2020 | Lemay |
| 2020/0058190 A1 | 2/2020 | Cunningham, II |
| 2020/0111319 A1* | 4/2020 | Palmisano ........... G06Q 20/405 |
| 2020/0134973 A1 | 4/2020 | Higgins |
| 2020/0152005 A1 | 5/2020 | Higgins |
| 2020/0302740 A1* | 9/2020 | Cleveland ........... G07F 17/3225 |

OTHER PUBLICATIONS

Office Action dated Dec. 2, 2020 for U.S. Appl. No. 16/586,356 (pp. 1-7).
Notice of Allowance dated Feb. 11, 2021 for U.S. Appl. No. 16/586,127 (pp. 1-15).
International Search Report and Written Opinion for App. No. PCT/US19/53823, dated Jan. 3, 2020, 10 pages.

* cited by examiner

SYSTEM AND METHOD FOR CASHLESS EXCHANGE AT TABLE GAMES

CROSS-REFERENCE TO RELATED APPLICATIONS

This application claims the benefit of priority to U.S. Provisional Patent Application No. 62/741,626, filed 5 Oct. 2018, entitled "SYSTEM AND METHOD FOR TICKETING AT A GAMING TABLE," U.S. Provisional Patent Application No. 62/741,641, filed 5 Oct. 2018, entitled "SYSTEM AND METHOD FOR CASHLESS EXCHANGE AT TABLE GAMES," U.S. Provisional Patent Application No. 62/741,768, filed 5 Oct. 2018, entitled "SYSTEM AND METHOD FOR SECONDARY ENGAGEMENT WITH TABLE GAMES," U.S. Provisional Patent Application No. 62/900,004, filed 13 Sep. 2019, entitled "SYSTEM AND METHOD FOR CARDLESS CONNECTION AT SMART TABLES," and U.S. Provisional Patent Application No. 62/900,274, filed 13 Sep. 2019, entitled "IMPLEMENTING ASPECTS OF A CASINO PLAYER LOYALTY PROGRAM VIA A MOBILE WALLET," the entire contents and disclosures of which are hereby incorporated herein by reference in their entirety.

TECHNICAL FIELD

The field of disclosure relates generally to casino gaming, and more particularly to systems and methods for cashless exchange at table games.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player via a printed "ticket" upon completion of a gaming session or when the player wants to "cash out."

For conventional table games, such as blackjack, roulette, craps, poker, and so forth, players typically exchange personal funds for casino chips, which may then be used to place wagers at the table games. Chips may be acquired from a designated exchange point in the casino ("the cage"), or they may be acquired at the table games themselves. Traditionally, when a player wishes to acquire chips at a table game, the player lays cash on the table surface and alerts the dealer that they would like to acquire additional chips ("cash in"). The dealer takes and counts the players cash (e.g., $100), removes a number of chips from a chip stock (e.g., an inventory "float" of chips) on the table (e.g., twenty $5 chips), and gives those chips to the player in exchange for the cash. In some situations, the dealer may display the cash and the chips to a table surveillance camera (e.g., "eye in the sky"), and may make a hand signal to indicate to the camera the nature or significance of the event. The player may then use those chips at the table over the course of a gaming session at the table. When the player wishes to conclude their gaming session, they pick up their chips and vacate their position at the table. Conventional casinos are not configured to allow the player to exchange chips back to the dealer for cash. Instead, the player must take their chips to the cage to redeem for cash ("cash out").

BRIEF DESCRIPTION

In one aspect, a system is provided. The system includes a memory storing player positioning information associated with a table gaming environment. The system also includes a smart table at which a wagering game is provided to one or more active players and is configured to use radio-frequency identification (RFID)-enabled chips. The smart table includes at least one RFID sensor configured to detect the presence of RFID-enabled chips. The at least one RFID sensor includes a dealer scratchpad for detecting a value of RFID-enabled chips within a scratchpad area on the smart table. The smart table defines a plurality of player positions. The system further includes at least one processor executing instructions which cause the processor to detect, by the smart table, presence of a player at a first player position of the plurality of player positions. The instructions also cause the at least one processor to receive, from a player computing device of the player, a request to buy into the wagering game for a buy-in value using a funds source from a digital wallet of the player accessed from the player computing device. The instructions further cause the at least one processor to display, to a dealer of the wagering game at the smart table, a confirmation that the player at the first player position is entitled to receive the buy-in value. The instructions also cause the at least one processor to detect, from the at least one RFID sensor, a chip value within the scratchpad area. The instructions further cause the at least one processor to compare the chip value to the buy-in value. The instructions also cause the at least one processor to display, to the dealer, a confirmation that the chip value matches the buy-in value, thereby authorizing the dealer to pass chips from the dealer scratchpad to the player.

In another aspect, a method for cashless exchange at a smart table is provided. The method is performed by a computing device including at least one processor. The smart table provides a wagering game to one or more active players using radio-frequency identification (RFID)-enabled chips. The smart table includes at least one RFID sensor configured to detect the presence of RFID-enabled chips. The at least one RFID sensor includes a dealer scratchpad for detecting a value of RFID-enabled chips within a scratchpad area on the smart table. The smart table defines a plurality of player positions. The method includes detecting, by the smart table, presence of a player at a first player position of the plurality of player positions. The method also includes receiving, from a player computing device of the player, a request to buy into the wagering game for a buy-in value using a funds source from a digital wallet of the player accessed from the player computing device. The method further includes displaying, to a dealer of the wagering game at the smart table, a confirmation that the player at the first player position is entitled to receive the buy-in value. The method also includes detecting, from the at least one RFID sensor, a chip value within the scratchpad area. The method further includes comparing the chip value to the buy-in value. The method also includes displaying, to the dealer, a confirmation that the chip value matches the buy-in value, thereby authorizing the dealer to pass chips from the dealer scratchpad to the player.

In yet another embodiment, a non-transitory computer readable medium that includes computer executable instructions is provided. When executed by a computing device comprising at least one processor in communication with at least one memory device, the computer executable instructions cause the computing device to detect, by a smart table, presence of a player at a first player position of the plurality of player positions. The smart table provides a wagering game to one or more active players using radio-frequency identification (RFID)-enabled chips. The smart table including at least one RFID sensor configured to detect the presence of RFID-enabled chips. The at least one RFID sensor includes a dealer scratchpad for detecting a value of RFID-enabled chips within a scratchpad area on the smart table. The smart table defines a plurality of player positions. The instructions also cause the computing device to receive, from a player computing device of the player, a request to buy into the wagering game for a buy-in value using a funds source from a digital wallet of the player accessed from the player computing device. The instructions further cause the computing device to display, to a dealer of the wagering game at the smart table, a confirmation that the player at the first player position is entitled to receive the buy-in value. The instructions also cause the computing device to detect, from the at least one RFID sensor, a chip value within the scratchpad area. The instructions further cause compare the chip value to the buy-in value. The instructions also cause the computing device to display, to the dealer, a confirmation that the chip value matches the buy-in value, thereby authorizing the dealer to pass chips from the dealer scratchpad to the player.

BRIEF DESCRIPTION OF THE DRAWINGS

An example embodiment of the subject matter disclosed will now be described with reference to the accompanying drawings.

DETAILED DESCRIPTION

Figure 1:
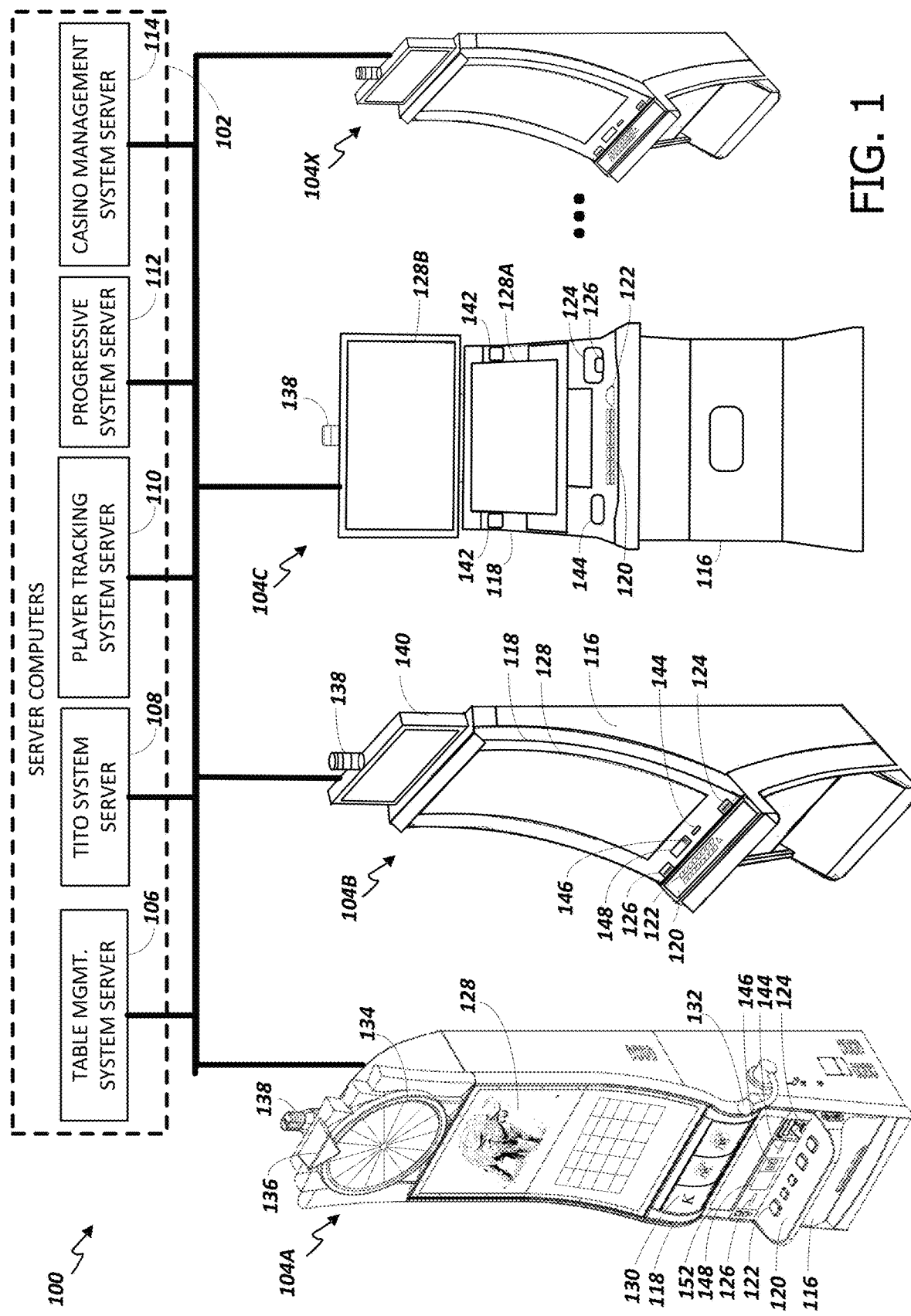
FIG. 1 is a diagram of exemplary EGMs networked with various gaming-related servers.

In some known casinos, players may have the option to play both electronic gaming machines ("EGMs", e.g., slot machines, video poker) as well as a variety of table games (e.g., black jack, roulette, craps, poker). Typically, players utilize chips to place wagers when playing table games. Electronic gaming machines, on the other hand, typically accept cash (e.g., bills or coins via a bill acceptor or a coin acceptor) or tickets (e.g., "vouchers") from a "cashless" ticket system (e.g., via a ticket acceptor). The EGM may establish and maintain a credit balance for a player during a gaming session, where each wager by the player reduces their credit balance, and where each win adds to their credit balance. When the player concludes their gaming session, the player presses a "cash out" button and the EGM prints out a ticket embodying the player's balance (e.g., a voucher with a cash value redeemable by the casino operator). This disparity between wagering currencies causes numerous problems within the casino environment, both for players and for casino operators.

For example, when a player wishes to transition from an EGM to a table game, their currency is often in the form of a printed ticket from the last EGM they played. However, conventional table games are not equipped to accommodate such tickets. Rather, the player may redeem their ticket for cash at the casino's cage, or perhaps at a redemption kiosk on the gaming floor. The player then takes the cash to the table game for conversion to chips. Similarly, when the player wishes to move from a table game to an EGM, they are confronted with a similar problem. The player cannot convert their chips to either cash or to a ticket at the table game. Rather, the player takes their chips to the cage for conversion to cash, which they may then take to an EGM for electronic game play.

In one example embodiment, a table ticketing system is provided that allows a player to redeem a ticket for chips or to redeem chips for a ticket at a table game. The table ticketing system includes a computing device with a display and user interface through which a dealer at the table performs various operations within the ticketing system. The table ticketing system also includes a ticket reader device that allows the dealer to scan a ticket presented by the player for redemption and a ticket printer device that allows the dealer to print a ticket (e.g., a redemption slip for table drops, a change voucher, a cash-out TITO ticket, or such). Further, the table ticketing system may also include a "smart table" that includes one or more radio-frequency identification (RFID) sensors configured to detect and probe RFID-enabled casino chips. The placement of an RFID sensor defines an RFID area on the table surface (e.g., near the dealer) that the dealer uses to verify aspects of the exchange transaction (e.g., total chip value determination) when the player wants to convert a ticket to chips or chips to a ticket.

For example, the player may establish a position at the smart table and present a ticket to the dealer for conversion to chips. The dealer takes the ticket and scans the ticket with the ticket reader device, then lays the ticket on the table in clear view. The table ticketing system reads a ticket identifier from the ticket via the ticket reader and transacts with a casino ticketing (ticket-in/ticket-out, or "TITO") system to determine whether the ticket is valid (e.g., not expired, not voided, or otherwise legitimate and active) and to confirm its value. If successful validation of the ticket occurs, a redemption slip will print for deposit into the table drop, and a change voucher may be printed (e.g., for any unredeemed value of the ticket, such as cents value). The dealer then withdraws and counts out a number of RFID-enabled chips from the table's chip tray totalling the ticket value. The dealer places these chips within the RFID area, from which the table ticketing system automatically counts the total value of the chips via the RFID sensor and verifies that the chip total value matches the ticket value. After confirmation of matching values, the dealer pushes the chips to the player and deposits the ticket into a drop box for the table. The table ticketing system also transacts with the casino ticketing system to confirm completion of the redemption of that particular ticket.

The term "ticket," as used herein, refers to a printed slip of paper that may be generated in a casino environment for the various aspects and embodiments described herein. The term "voucher," as used herein, refers to a type of ticket that embodies direct cash value. For example, when a player cashes out of an EGM, the EGM prints a ticket embodying that player's balance within the EGM that the player may then use at another EGM, or redeem at the cage of the casino for cash, or exchange at a table game for casino chips as described herein. As such, this example ticket is a voucher.

The terms "bonus ticket" or "reward ticket," as used herein, refers to a type of ticket that embodies a bonus or reward given to the player, usually by the casino, for various value other than direct cash value (e.g., non-cashable). For example, bonus tickets or reward tickets may include non-cashable "free play vouchers" that may be redeemed for free plays (e.g., at table games), isolating the voucher to be used for a tokenized game hand. Various example bonus tickets or reward tickets are described herein. The term "ticket" may be used interchangeably herein with either the term "voucher" or the terms "bonus ticket" or "reward ticket" based on the context within which the term is used.

The terms "amount" and "value," as used herein and when referring to casino chips and tickets, is generally used to refer to a dollar value of such chips or tickets. The term "number" or "count," as used herein and when referring to casino chips, refers to a numerical count of individual chips. In other words, and for example, a player may have five $20 chips, where five is the number of chips or the chip count, and where $100 is the amount of chips or the value of chips.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a web site maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server (not separately shown), a table management system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket (e.g., a voucher) to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A. In some embodiments, the cashless ticket system may integrate with the table ticketing system to facilitate allowing players to exchange tickets for chips or chips for tickets at table games.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

Figure 2A:
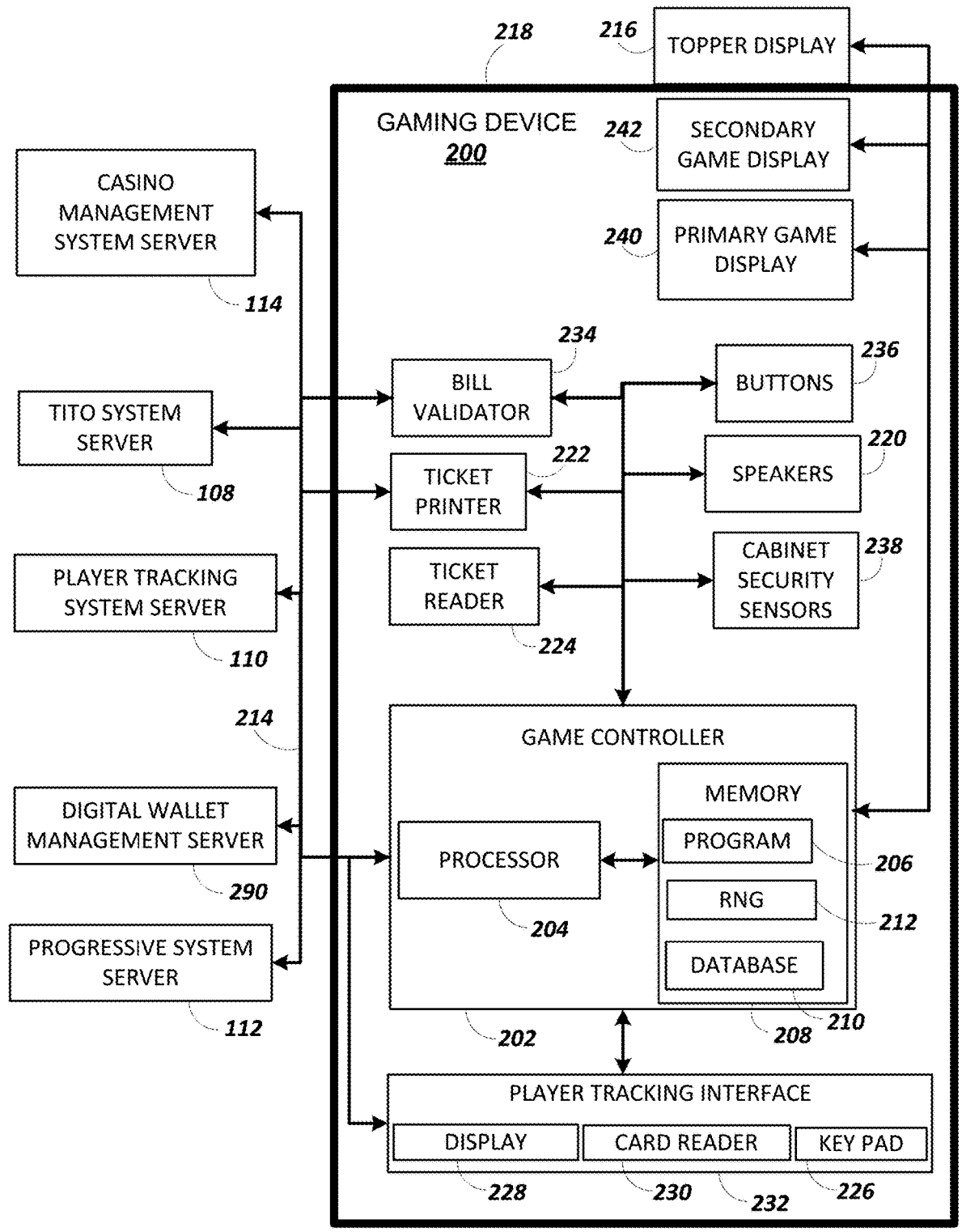
FIG. 2A is a block diagram depicting exemplary internal electronic components of a gaming device connected to various external systems.

FIG. 2A is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as the central determination gaming system server. The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader (or ticket scanner) 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a "cash out" button to receive a ticket from the ticket printer 222). The ticket may be redeemed for cash money or inserted into another machine to establish a credit balance for further play. In some embodiments, tickets may be redeemed for chips at table games as described below.

While an example gaming device 200 has been described in regard to FIG. 2A, certain aspects of the present disclosure may be implemented by gaming devices that lack one or more of the above-described components. For example, not all gaming devices suitable for implementing aspects of the present disclosure necessarily include top boxes, information panels, cashless ticket systems, and/or player tracking systems. Further, some suitable gaming devices may include a single game display having mechanical reels or a video display. Moreover, other embodiments may be designed for bar tables and have displays that face upwards.

Many different types of wagering games, including mechanical slot games, video slot games, video poker, video blackjack, video pachinko, keno, bingo, and lottery, may be provided by the gaming device 200. In particular, the gaming device 200 may be operable to provide many different instances of games of chance. The instances may be differentiated according to themes, sounds, graphics, type of game (e.g., slot game vs. card game vs. game with aspects of skill), denomination, number of paylines, maximum jackpot, progressive or non-progressive, bonus games, class 2 or class 3, etc.

The gaming device 200 may allow a player to select a game of chance, skill, or combination thereof, to play from a plurality of instances available on the gaming device 200. For example, the gaming device 200 may provide a menu with a list of the instances of games that are available for play on the gaming device 200 and a player may be able to select, from the list, a game that they wish to play.

Figure 2B:
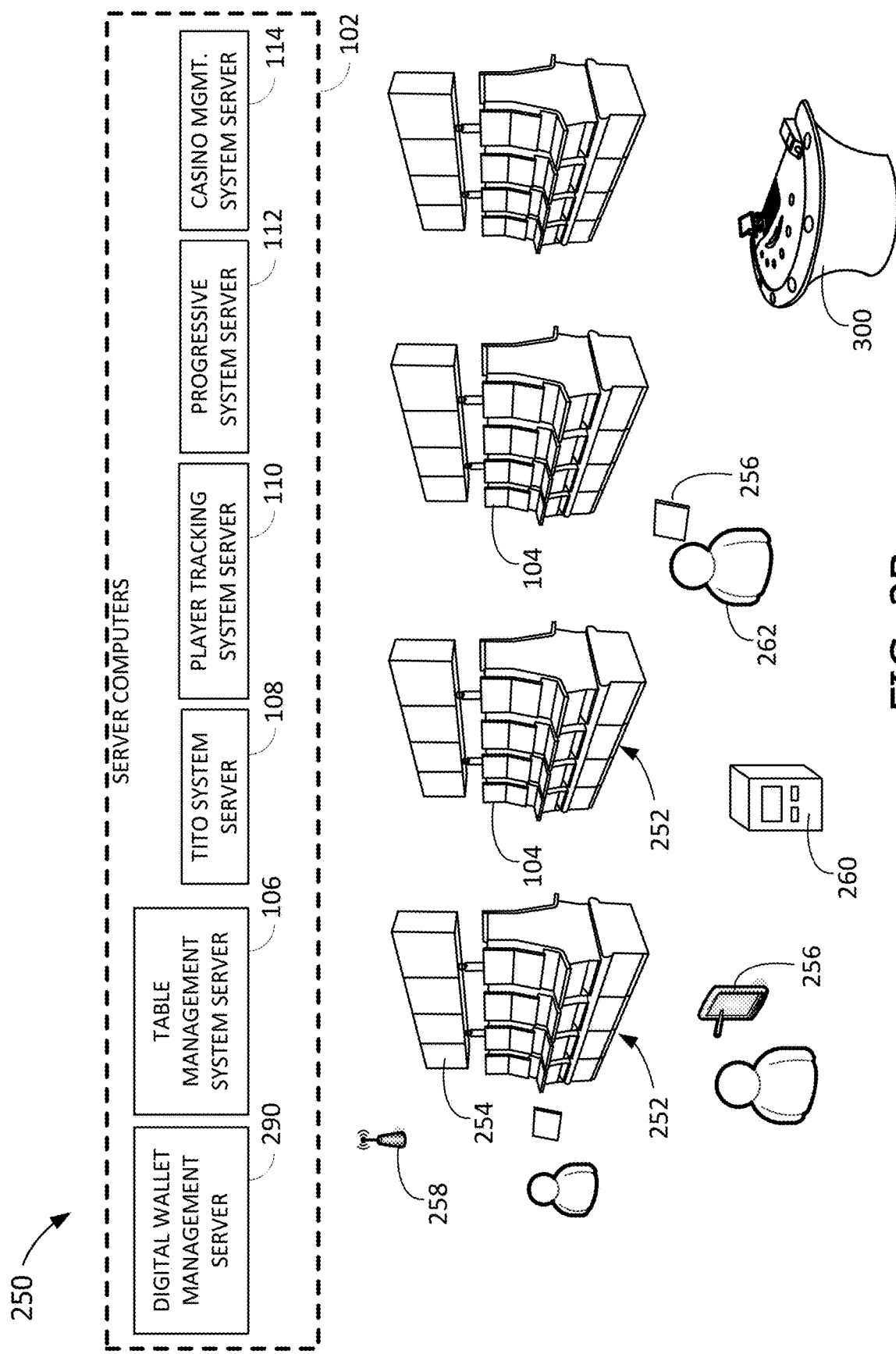
FIG. 2B illustrates an example gaming environment in which the gaming device shown in FIGS. 1 and 2A may appear.

FIG. 2B illustrates an example gaming environment 250 in which the gaming devices 104, 200 shown in FIGS. 1 and 2A may appear. In the example embodiment, the gaming environment 250 is a physical venue of a casino that includes banks 252 of gaming devices 104. In this example, each bank 252 of gaming devices 104 includes a corresponding gaming signage system 254. In this example, the gaming environment 250 includes a smart table 300 that is configured for table gaming. Details of the smart table 300 are described below with reference to FIG. 3. The gaming environment 250 also includes mobile gaming devices 256 which, in various embodiments, may present wagering games or social games. The mobile gaming devices 256 may, for example, include tablet devices, cellular phones, smart phones, or other handheld computing devices. In this example, the mobile gaming devices 256 are configured for communication with one or more other devices in the gaming environment 250, including but not limited to one or more of the gaming devices 104, one or more smart tables 300, one or more kiosk(s) 260, and one or more of the server computers 102, via wireless access points 258. In some implementations, the mobile gaming devices 256 may be configured for communication with one or more other devices in the gaming environment 250, including but not limited to one or more of the gaming devices 104, one or more smart tables 300, one or more kiosk(s) 260, via wireless communications (e.g., near-field communication (NFC), Bluetooth, Wi-Fi, or such, via one of the "beacons" described herein).

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the gaming devices 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some embodiments, the gaming environment 250 may include one or more kiosks 260 that are configured to facilitate monetary transactions involving the mobile gaming devices 256, which may include cash out and/or cash in transactions. The kiosk(s) 260 may be configured for wired and/or wireless communication with the mobile gaming devices 256. The kiosk(s) 260 may be configured to accept monetary credits from casino patrons 262 or to dispense monetary credits to casino patrons 262 via cash, a credit or debit card, via a wireless interface (e.g., via a wireless payment app), via tickets, digital wallet, or such. According to some examples, the kiosk(s) 260 may be configured to accept monetary credits from a casino patron and to provide a corresponding amount of monetary credits to a mobile gaming device 256 for wagering purposes (e.g., via a wireless link such as an NFC link). In some such examples, when a casino patron 262 is ready to cash out, the casino patron 262 may select a cash out option provided by the mobile gaming device 256, which may include a real button or a virtual button (e.g., a button provided via a graphical user interface) in some instances. In some such examples, the mobile gaming device 256 may send a "cash out" signal to the kiosk 260 via a wireless link in response to receiving a "cash out" indication from a casino patron. The kiosk 260 may provide monetary credits to the patron 262 corresponding to the "cash out" signal, which may be in the form of cash, a credit ticket, a credit transmitted to a financial account corresponding to the casino patron, a digital wallet account, or such.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as within a casino gaming area (e.g., based on GPS and geofencing).

Figure 2C:
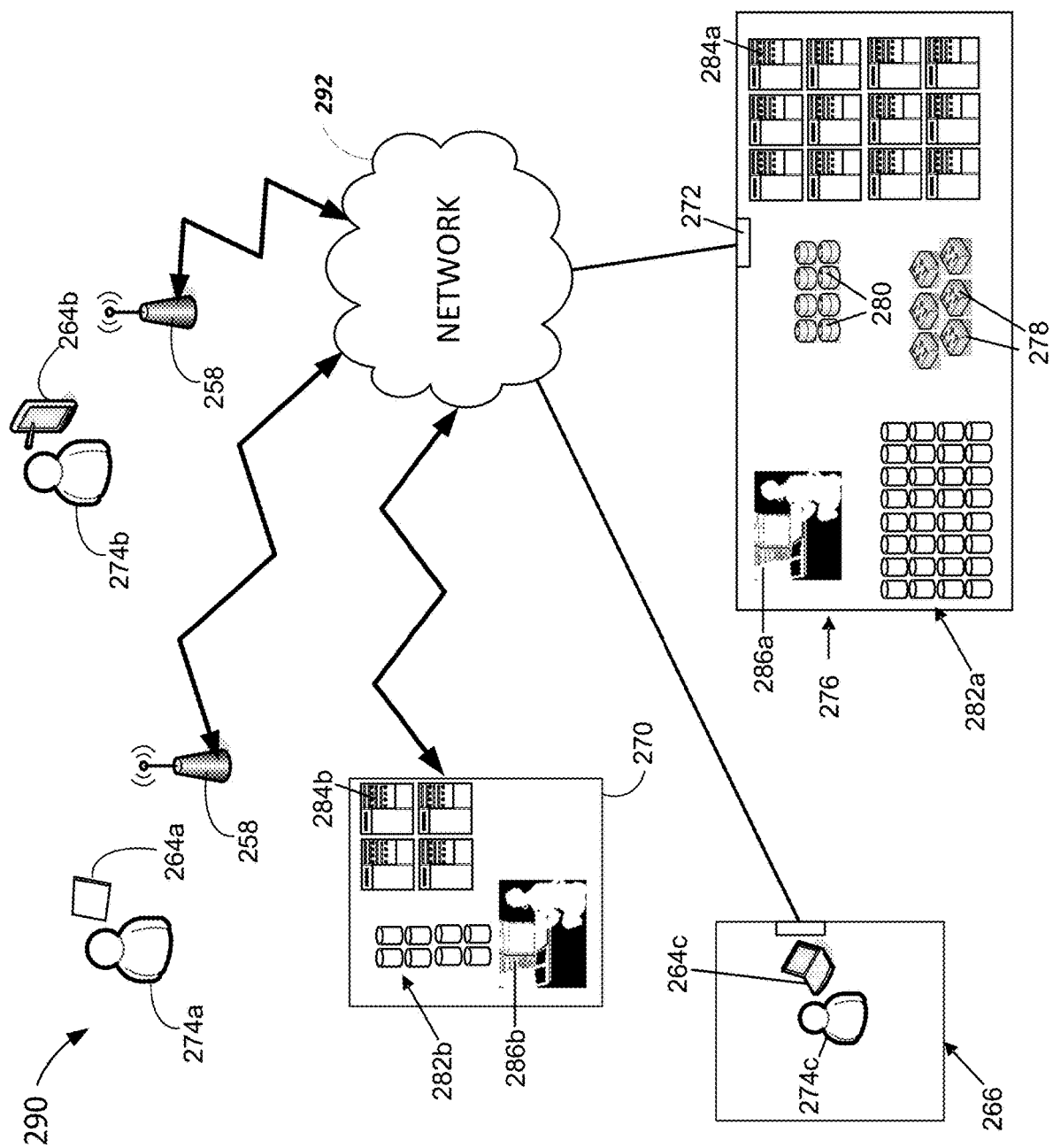
FIG. 2C is a diagram that shows examples of components of a system for providing online gaming according to some aspects of the present disclosure.

FIG. 2C is a diagram that shows examples of components of a system 290 for providing online gaming according to some aspects of the present disclosure. As with other figures presented in this disclosure, the numbers, types and arrangements of gaming devices shown in FIG. 2C are merely shown by way of example. In the example embodiment, various gaming devices, including but not limited to end user devices (EUDs) 264a, 264b and 264c are capable of communication via one or more networks 292. The networks 292 may, for example, include one or more cellular telephone networks, the Internet, Wi-Fi networks, satellite networks, or such. In this example, the EUDs 264a and 264b are mobile devices. For example, the EUD 264a may be a tablet device and the EUD 264b may be a smart phone. The EUD 264c is a laptop computer that is located within a residence 266 at the time depicted in FIG. 2C. Accordingly, in this example the hardware of EUDs 264 is not specifically configured for online gaming, although each EUD 264 is configured with software for online gaming. For example, each EUD 264 may be configured with a web browser, installed gaming applications, player apps, or such. Other implementations may include other types of EUD 264, some of which may be specifically configured for online gaming.

In this example, a gaming data center 276 includes various devices that are configured to provide online wagering games or social games via the networks 292. The gaming data center 276 is capable of communication with the networks 292 via the gateway 272. In this example, switches 278 and routers 280 are configured to provide network connectivity for devices of the gaming data center 276, including storage devices 282a, servers 284a and one or more workstations 286a. The servers 284a may, for example, be configured to provide access to a library of games for online game play or for download and installation by remote devices (e.g., EUDs 264). In some examples, code for executing at least some of the games may initially be stored on one or more of the storage devices 282a. The code may be subsequently loaded onto a server 284a after selection by a player via an EUD 264 and communication of that selection from the EUD 264 via the networks 292. The server 284a onto which code for the selected game has been loaded may provide the game according to selections made by a player and indicated via the player's EUD 264. In other examples, code for executing at least some of the games may initially be stored on one or more of the servers 284a. Although only one gaming data center 276 is shown in FIG. 2C, some implementations may include multiple gaming data centers 276.

In this example, a financial institution data center 270 is also configured for communication via the networks 292. Here, the financial institution data center 270 includes servers 284b, storage devices 282b, and one or more workstations 286b. According to this example, the financial institution data center 270 is configured to maintain financial accounts, such as checking accounts, savings accounts, loan accounts, payment card accounts, rewards accounts, loyalty accounts, player accounts, digital wallet accounts, or such. In some implementations one or more of the authorized users 274a-274c may maintain at least one financial account with the financial institution that is serviced via the financial institution data center 270.

According to some implementations, the gaming data center 276 may be configured to provide online wagering games in which money may be won or lost, or various social games, some of which may use virtual currencies. According to some such implementations, one or more of the servers 284a may be configured to monitor player credit balances, which may be expressed in game credits, in real or virtual currency units, or in any other appropriate manner. In some implementations, the server(s) 284a may be configured to obtain financial credits from and/or provide financial credits to one or more financial institutions, according to a player's "cash in" selections, wagering game results and a player's "cash out" instructions. According to some such implementations, the server(s) 284a may be configured to electronically credit or debit the account of a player that is maintained by a financial institution, e.g., an account that is maintained via the financial institution data center 270. The server(s) 284a may, in some examples, be configured to maintain an audit record of such transactions.

In some embodiments, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274a-274c), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

In some embodiments, the financial institution data center 270 may be configured for communication with one or more devices in the gaming environment 250. As noted above, the mobile gaming devices 256 may or may not be specialized gaming devices, depending on the particular implementation. In some examples, the mobile gaming devices 256 may be end user devices (EUDs 264), such as tablet devices, cellular phones, smart phones and/or other handheld devices. For example, referring again to FIG. 2B, a digital wallet management server 290 may include some of the server computers 102. (As used herein, the terms "mobile wallet" and "digital wallet" will be used synonymously.) The digital wallet management server 290 may be configured for communication with one or more financial institution data centers 290, such as data centers configured for implementing bank accounts (e.g., checking accounts), credit card accounts, debit card accounts, digital wallets, and such.

The digital wallet management server 290 may be configured to provide functionality related to digital wallets, including but not limited to the establishment of digital wallet accounts and implementing financial transactions made via digital wallets. The digital wallet management server 290 may communicate with, for example, the mobile gaming devices 256 (such as smartphones of users associated with digital wallets), with the gaming devices 104, with the smart table 300, with kiosks 260, or with other devices or entities, such as devices associated with merchants or service providers, for the purposes of completing various financial transactions involving digital wallets. These financial transactions may include, but are not limited to, financial transactions relating to wager gaming, such as providing credits for wager gaming on an EGM, providing credits for table gaming, facilitating cash out transactions relating to wager gaming on gaming devices 104 or at smart tables 300, establishing lines of credit or markers, or paying back debts such as markers. In some embodiments, a digital wallet may be used for purposes other than wager gaming (e.g., at a casino restaurant, a casino bar, a casino entertainment venue and/or a casino retail store, for reward collection and redemption). In some implementations a digital wallet may be used for transactions outside the casino context. For example, the digital wallet may be used during online gaming (e.g., to purchase apps, virtual currency, or other in-game purchases), for making in-store or online purchases (e.g., purchases of goods or services related to a casino but available online), or such. One or more devices of the digital wallet management server 290 may be configured to provide security (e.g., encryption, authentication, authorization) for communications involving transactions made via a digital wallet.

In some embodiments, the gaming environment 250 may include one or more kiosks 260. According to some implementations, the kiosk(s) 260 may be part of the digital wallet management server 290 even though in FIG. 2B the kiosk(s) 260 and the digital wallet management server 290 are shown separately. The kiosk(s) 260 may be configured for communication with other devices of the digital wallet management server 290 (e.g., with one or more servers of the digital wallet management server 290), for example, to allow digital wallet-based transactions at the kiosk 260 (e.g., purchasing credits from a digital wallet account to cash or to a TITO ticket, redeeming a TITO ticket to a digital wallet account, redeeming a reward stored in a digital wallet).

In some embodiments, the kiosk(s) 260 may be configured to facilitate monetary transactions involving a digital wallet (e.g., monetary transactions involving digital wallet software being executed by one or more of the mobile gaming devices 256). Such transactions may include, but are not limited to, cash out and/or cash in transactions. The kiosk(s) 260 may be configured for wired and/or wireless communication with the mobile gaming devices 256. The kiosk(s) 260 may be configured to accept monetary credits from casino patrons 262 and/or to dispense monetary credits to casino patrons 262 via cash, a credit or debit card, via a wireless interface (e.g., via a wireless payment app), via tickets, etc. Accordingly, in some such examples, the kiosk(s) 260 may be configured for communication with one or more financial institution data centers.

In some embodiments, the kiosk(s) 260 may be configured to accept monetary credits from a casino patron and to provide a corresponding amount of monetary credits to a mobile gaming device 256 for wagering purposes (e.g., via a wireless link such as a near-field communications link). According to some implementations, a digital wallet app running on one of the mobile gaming devices 256 (e.g., on a patron's cell phone) may be configured for wireless communication with gaming devices 104, smart tables 300, or such (e.g., to provide digital wallet-based, cashless "cash-out" and/or "cash-in" transactions at location). In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the patron 262 corresponding to the "cash out" signal, which may be in the form of cash, a credit ticket, a credit transmitted to a financial account corresponding to the casino patron, etc.

In some implementations, the kiosk 260 may be configured to authorize and/or initiate a download of digital wallet software to a patron's mobile device. In some examples, a server of the digital wallet management server 290 may be configured for storing and updating digital wallet software, and for downloading digital wallet software to a patron's mobile device.

In some embodiments, the digital wallet management server 290 may be configured for communication with one or more devices that are configured to implement a player loyalty program, such as the player tracking system server 110. In some embodiments, a member of a casino player loyalty program may input at least some of the member's casino player loyalty program information during the process of creating a digital wallet account. According to some such implementations, the kiosk 260 may be configured as an interface for creating digital wallet accounts. In some examples, during a process of creating a digital wallet account a person may provide casino player loyalty program information to the kiosk 260 by inserting or swiping a player loyalty program card. Alternatively, or additionally, the kiosk 260 may be configured to accept manually-input information that may include, but may not be limited to, casino player loyalty program information.

In some examples, at least some of the mobile gaming devices 256 may be configured for implementing digital wallet transactions with a gaming device 104 or a smart table 30 via Bluetooth or NFC. According to some implementations, the gaming device 104 or smart table 300 may be configured to provide a Bluetooth low-energy (LE) beacon for establishing wireless communication with at least some of the mobile gaming devices 256. In some implementations, the mobile gaming device 256 may implement digital wallet transactions (such as cash in or cash out transactions) with the gaming device 104 or smart table 300 directly, via NFC or Bluetooth. In other implementations, the gaming device 104 or smart table 300 may be able to transmit communications to a mobile gaming device via NFC or the Bluetooth (LE) beacon, but the mobile gaming device may be required to provide input to the gaming device 104 or smart table 300 indirectly (e.g., via one or more devices of a player loyalty system or of a digital wallet management system).

Some embodiments provide alternative methods of establishing a "cardless" connection between a mobile gaming device and an EGM or a smart table. In some such implementations, a player tracking interface of the gaming device 104 or smart table 300 may be configured to establish a wireless connection and a cardless player tracking session with a mobile gaming device. For example, the gaming device 104 may be configured to establish a wireless connection and a cardless player tracking session with a mobile gaming device via the player tracking interface 232 that is described above with reference to FIG. 2A. A smart table 300 may be configured to establish a wireless connection and a cardless player tracking session with a mobile gaming device via an interface system of the table management device 320 that is described below with reference to FIG. 3A. In other words, the table management device 320 may be configured to provide a player tracking interface.

In some examples, a player tracking interface of the gaming device 104 or smart table 300 may be configured for wireless communication with a mobile gaming device (e.g., via Bluetooth or NFC). In some such examples, the player tracking interface may include a user interface (e.g., a GUI or a physical button) with which a player can interact in order to obtain a passcode from the player tracking interface. The passcode may, for example, be an RNG code. The passcode may be provided to the player via a display of the player tracking interface. The player may be required to input the code (e.g., via the mobile gaming device) in order to pair the mobile gaming device with the player tracking interface and enable digital wallet transactions with the EGM or the smart table. According to some such implementations, a "cardless" player loyalty session may also be established when the mobile gaming device is paired with the player tracking interface.

Accordingly, in some embodiments, the digital wallet management server 290 may be configured to implement aspects of a casino player loyalty program related to digital wallets and to allow for cardless connection to gaming devices 104, smart tables 300, or kiosks 260. For example, the digital wallet management server 290 may be configured for establishing a rules engine for digital wallets, implementing the rules engine for digital wallets, etc. The rules engine may be configured, at least in part, according to criteria relating to a casino player loyalty program.

Figure 3:
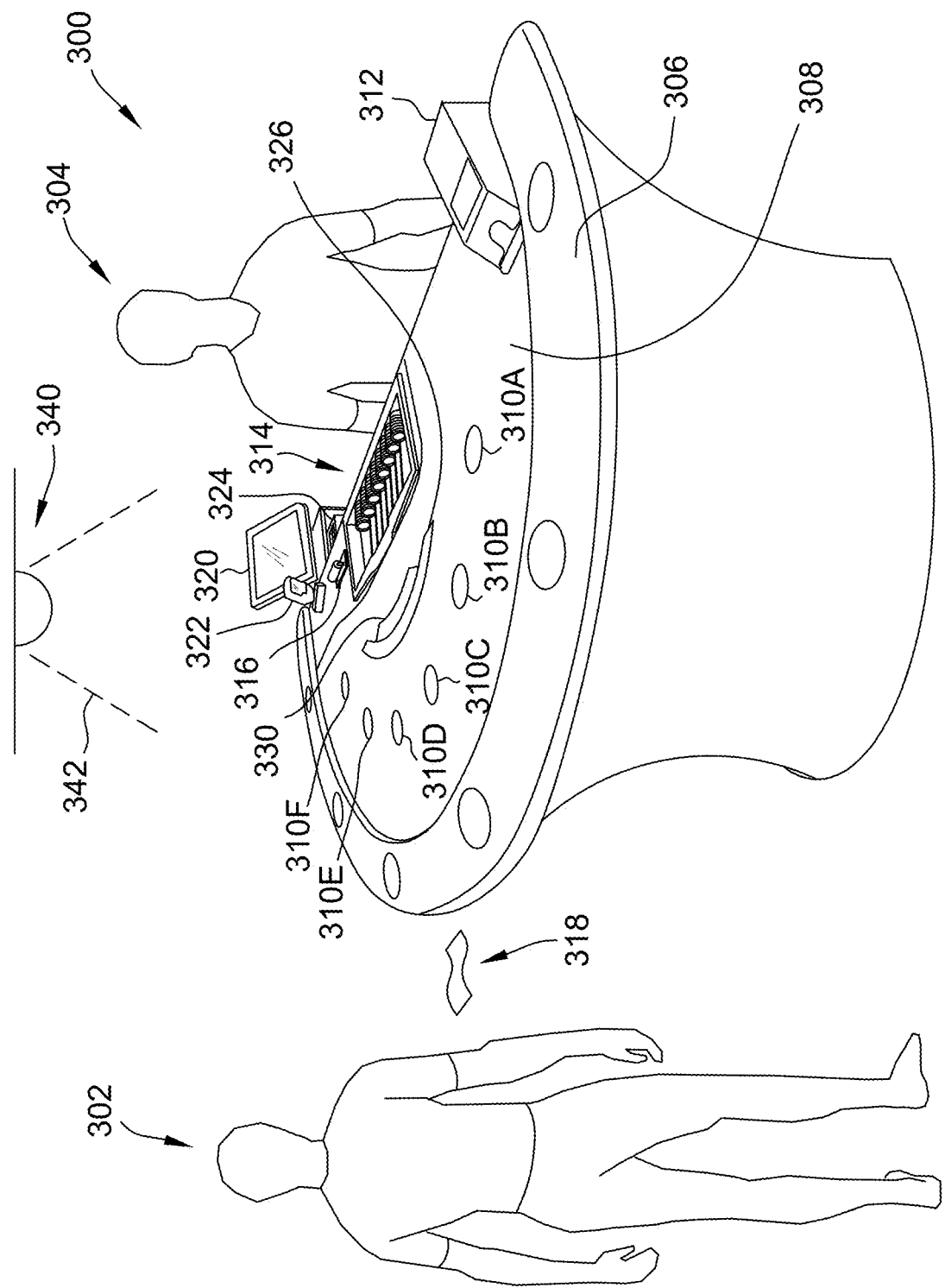
FIG. 3 is a diagram of an example smart table used for table gaming in a casino environment.

FIG. 3 is a diagram of an example smart table 300 used for table gaming in a casino environment. In the example embodiment, a table ticketing system (e.g., including table management system server 106) integrates with the smart table 300 to allow players to exchange tickets from the cashless ticketing (TITO) system described above for casino chips that are used during play of the table game. For example, a player 302 may have come from playing an electronic game, such as those shown in FIGS. 1 and 2, with a cashless ticket 318 printed by the EGM 104 at the end of their gaming session. In an example depicted here, the player 302 approaches the smart table 300 and wishes to exchange their ticket 318 for chips. For example, the ticket 318 may have been generated by the EGM 104 for a value of $225.50. Such an event may be referred to herein as a "cash-in," "ticket-in," or voucher redemption event, in the sense that the ticket 318 represents a cash value and the player 302 wishes to obtain chips for that value. The smart table 300, in this example embodiment, is configured to provide a card-based table game, such as blackjack, Caribbean stud, three-card poker, or Spanish 21.

The smart table 300, in the example embodiment, includes several player positions, generally represented here by wagering areas 310A-310F (collectively, "wagering areas 310) (e.g., one wagering area 310 per primary player). In this example table game, players 302 typically stand or sit near their wagering area 310 and place wagers (e.g., chips) within the wagering area 310 during the course of play. Wagering areas 310 are typically visually marked on a table surface (or just "surface") 308 of the table 300, such as by circles as shown here. In some embodiments, additional side bet wagering areas (not shown, but similar to wagering areas 310) may be provided on the table 300 for "side bets," allowing the smart table 300 to determine when the player 302 has made a side bet of a particular type (e.g., based on location of RFID chips). The smart table 300 also includes a card shoe 312 from which a dealer 304 dispenses cards during the course of play. In addition, the dealer 304 collects and dispenses chips from a chip inventory maintained in a chip tray 314. The smart table 300 also includes a drop box 316 into which the dealer may deposit cash, tickets, or other items. Further, in some table games, the table surface 308 may include an insurance bar 326 or other such visually-demarcated areas used for the particular table game. Other common table surface areas and hardware may be present but are not illustrated here for purposes of clarity (e.g., automatic card shuffling device, card return tray, additional wagering areas, and so forth).

In the example embodiment, the smart table 300 also includes electronic components of or otherwise used by the table ticketing system. A table management device 320 includes a display and a user interface (both not separately depicted in FIG. 3) through which the dealer 304 or casino management (e.g., pitboss) may interface with the table ticketing system or other systems such as the casino management system or the player tracking system. The table management device 320 is communicatively attached to a ticket reader (or "ticket scanner") device 322 that may be used to scan the tickets 318 presented by players 302 (e.g., during a ticket-in event). A ticket printing device (or just "printer") 324 is attached to the table management device 320, and may be used to generate new tickets 318 (e.g., during a "ticket-out" or chip redemption event, or as a partial reimbursement from a ticket-in event). The table management device 320, in some embodiments, is configured to communicate with a table management system (not separately shown) operated by the casino to manage aspects of table games.

In some embodiments, the smart table 300 is configured with one or more chip sensors that may be used in conjunction with the table ticketing system or other systems described herein. In this example, the smart table 300 is configured with one or more radio-frequency identification ("RFID") readers (also referred to herein as "RFID sensors," not separately shown) embedded within (e.g., just underneath the surface 308 of) the table 300. Further, the chips are each embedded with RFID tags (e.g., passive tags) that may be sensed and read by the readers. The particular placement and configuration of each of the RFID readers establishes or otherwise creates RFID areas (or "sensing areas") on the table surface 308 within which chips may be placed and read (e.g., counted for total value) for that particular RFID area. The various RFID sensors provided by the smart table 300 may be configured such as to establish non-overlapping RFID areas. When a particular RFID area does not overlap with any other RFID areas, the chip detection by that associated RFID sensor is isolated from other sensors such that those chips may be considered to be solely within a significant region of the table 300.

In the example embodiment, one RFID area provided by the smart table 300 is a dealer scratchpad 330. In FIG. 3, the dealer scratchpad 330 is visually identified by markings on the table (e.g., an enclosed region identifying where the dealer 304 may put chips when using the dealer scratchpad 330). This visual region also approximately defines the configuration of an underlying RFID reader (not separately depicted) under the table surface 308 300, as well as an associated RFID area within which chips may be detected and associated with that area. During operation, the dealer scratchpad 330 may be used to determine a value of chips being dispensed to the player 302 during a ticket-in event (e.g., to verify against a value of the ticket 318), or to determine a value of chips being collected from the player 302 during a ticket-out event (e.g., to establish a value for a ticket to be printed).

In some embodiments, another RFID reader may be provided that defines an RFID area for the chip tray 314. Such an RFID area allows aspects of chip tracking to and from the chip tray 314. In some embodiments, various player-oriented RFID readers may be provided within the table 300 that define RFID areas used individually by each of the players 302. For example, the smart table 300 may include RFID readers that define RFID areas for each of the wagering areas 310. As such, the value of chips placed within the wagering areas 310 for each player may be automatically determined on demand. In some embodiments, additional play areas (not shown) associated with the play of the table game may be similarly defined by associated RFID readers. Further, in some embodiments, the smart table 300 may include RFID readers that define RFID areas for each player 302's chip inventory (not shown) (e.g., the chips of the player 302 on the table 300 but not currently being used by the player 302). For example, player inventory areas may be defined on the table 300 and approximately adjacent to an interior edge of an arm rest rail 306, where players 302 conventionally maintain their own chip inventories.

In the example embodiment, the smart table 300 is monitored by a security camera (or just "camera") 340 (e.g., a digital video camera). The camera 340 has a field of view 342 of the table surface 308, and transmits video, still images, or other digital image information to a casino surveillance system (not separately shown). The camera 340 may be used to generally monitor aspects of play at the table 300, and may additionally integrate with the table ticketing system to capture digital image information during the various table ticketing events described herein. The camera 340 may sometimes be referred to as the "eye in the sky."

In some embodiments, the smart table 300 and table management system may include a beacon within or otherwise near the table 300 that enables the table management system to use near-field communications (NFC) to detect the presence and position of personal devices of the players at the table 300. In some embodiments, the smart table 300 may include a plug-in or surface charger for each player position, allowing the players to charge their personal devices, and may also provide another mechanism to detect the presence of particular players at particular player positions, or for other communications between the players' personal devices and the table management system.

In some embodiments, the table management system, or the table 300 itself, may include one or more digital camera devices (not shown) that are positioned such as to capture front views of the seated or standing players at or near the table 300. Such digital video may be used for facial recognition applications by the table management system. For example, the table management system may perform facial recognition on people sitting at the various player positions provided by the table, allowing the table management system to automatically detect which known players are sitting at each player position. In some embodiments, facial recognition may be used to verify the identity of the active players at the table 300 or secondary players standing near the table 300 for purposes of authenticating identity of a player as they log into the table management system. In some embodiments, each player position may also include a position label (e.g., a QR code or other machine readable image) displayed at each position and which may be read by the digital camera device(s) and used to uniquely identify a particular table 300 or a particular position 602 at a particular table 300. As such, position occupation at the table 300 may be determined, and in some embodiments, particular player identities may be automatically determined and assigned to the position. In some embodiments, if the player is recognized as an excluded player, the table management system may reject the ticket transaction. In some embodiments, if the player is recognized as non-compliant in parental support (e.g., in a national "deadbeat dads" database), ticket transactions may be reported.

In other embodiments, the smart table 300 may be configured to support other table games such as Roulette, poker, Baccarat, craps, or such real-money wagering games as are commonly played at casinos. In other words, smart table 300 may be a Roulette table, a poker table, a craps table, or such, each of which may include their own particular configurations (not separately shown) which may include alternate configuration of wagering areas 310 and dealer scratchpad 330 that enable the functionality described herein. In a Roulette example, a Roulette table may include chip sensors underneath each of the wagering areas on a conventional Roulette table (e.g., coloured number squares, columns, 0, 00, dozen spaces, odd/even spaces, red/black spaces, split, street, corner, and so forth). Two or more chip sensors may be used in conjunction to determine, for example, split bets (e.g., where a single bet straddles two adjacent wagering areas). The Roulette table may also include a dealer scratchpad 330 and chip tray 314 which the dealer 304 may use in similar fashion (e.g., for chip management, security, chip counting, ticketing, and such other uses as described herein). In a poker example, a poker table may include individual wagering areas for each position at the table (e.g., from which individual player bets may be automatically determined), as well as a central "pot" area (e.g., for determining the current size of the pot). The poker table may also include a display device (not separately shown) that is visible to the dealer 304 and players 302 and that automatically determines and displays such quantities during a hand. In a craps example, a craps table may include chip sensors underneath each of the wagering areas of a conventional craps table (e.g., place bets, don't pass bar, pass line, field, come, and so forth).

Figure 4:
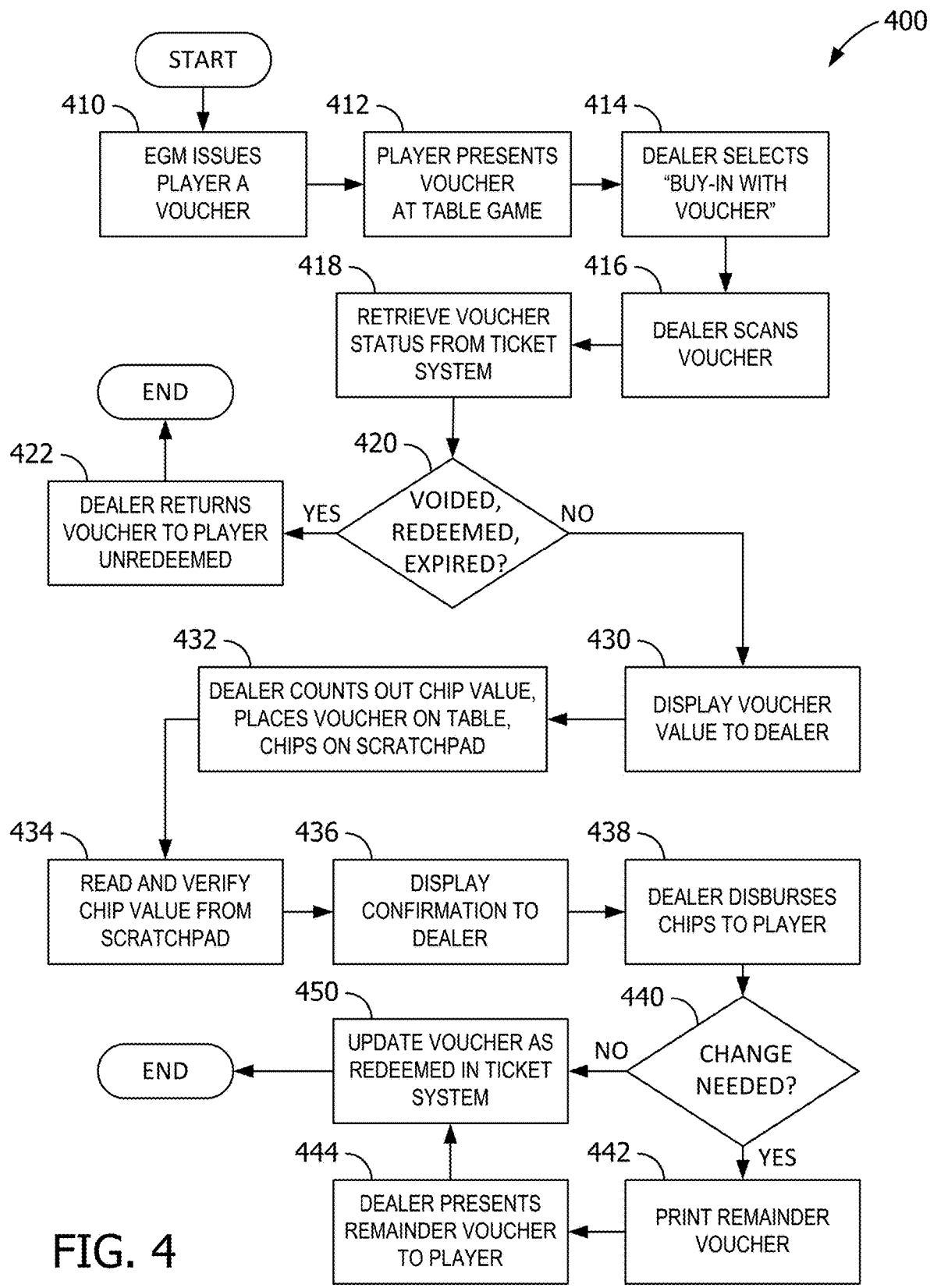
FIG. 4 is a flow chart illustrating an example method for performing a voucher redemption or "ticket-in" action at the smart table using the table ticketing system.

FIG. 4 is a flow chart illustrating an example method 400 for performing a voucher redemption or "ticket-in" action (also referred to herein as "buy-in with voucher") at the smart table 300 using the table ticketing system. In the example embodiment, the player 302 is participating in an electronic gaming session at an electronic gaming machine similar to the EGMs shown in FIGS. 1 and 2. At the conclusion of their electronic gaming session, the player 302 wishes to cash out and move to a table game. The EGM issues the player a voucher (e.g., voucher 318), printing the voucher with a value based on the player 302's current balance from their gaming session (operation 410). For example, presume the player 302 cashes out of the EGM when their machine balance is $135.20. As such, the printed voucher 318 embodies a cash value of $135.20. This new voucher 318 is also registered and recorded (e.g., by TITO system server 108) in the casino ticket system, being established as a valid, unredeemed voucher at a value of $135.20.

The player 302 approaches the smart table 300 and occupies one of the positions at the table 300. In this example, the smart table 300 is a $5 minimum blackjack table using RFID-enabled chips. The player 302 presents the voucher 318 to the dealer 304 (operation 412), and may verbally request chips in exchange for the voucher 318 to clarify the request. In some embodiments, the player 302 may also present their player loyalty card, which may additionally be scanned by the ticket reader 322 or otherwise entered into the table management device 320 to acknowledge the player 302's presence at the table 300. The dealer 304 takes the ticket 318 from the player 302, inspects the ticket visually to identify its apparent value, and selects a voucher redemption button (e.g., "buy-in with voucher") on the table management device 320 (e.g., via a user interface ("UI")) to initiate a voucher redemption operation with the table ticketing system (operation 414). Upon selection of the voucher redemption button, table management device 320 activates ticket reader 322, allowing the dealer 304 to scan the voucher (operation 416) (e.g., reading a unique voucher ID from the voucher 318). In some embodiments, the ticket reader 322 may collect and retain submitted vouchers (e.g., similar to a bill acceptor).

In the example embodiment, ticket management device 320 receives the voucher ID from the scanning of the voucher 318 and communicates with the casino ticket system, retrieving various voucher information from the casino ticket system such as the value of the voucher and the voucher status (operation 418). If, at test 420, the voucher 318 is not redeemable (e.g., voided, expired, or previously redeemed), the dealer 304 returns the voucher 318 to the player 302 (operation 422) and the voucher redemption action is concluded. If, at test 420, the voucher 318 is redeemable, then the table management device 320 displays the voucher value to the dealer 304 (operation 430) and prompts the dealer 304 to provide an amount of chips equalling a determined chip disbursement amount. In other words, the chip disbursement amount is the value, in chips, that the dealer 304 is authorized to give to the player 302 during this voucher redemption action. In some embodiments, the chip disbursement amount may equal the voucher value (e.g., when the voucher value is an even dollar amount with fractional dollar amount). In other embodiments, the chip disbursement amount may be less than the total voucher value. In this example, the smallest denomination chip that the smart table 300 has is a $1 chip and, as such, $135.00 of the total voucher value may be tendered to the player 302 in chips, but not the remainder amount of $0.20. As such, the table management device 320 may determine the chip disbursement amount to be $135 with a remainder amount of $0.20 due to the player 302 in some other form. In some embodiments, the player 302 may request less than the entire value of the voucher 318. For example, the player 302 may request only $100 in chips from the voucher 318 and, as such, the table management device 320 may determine the chip disbursement amount to be $100 with a remainder amount of $35.20. In some embodiments, the smart table 300 or casino management system server 114 may be configured to automatically generate a security alert (e.g., to dealer, floor management, surveillance) if a ticket issuance or redemption exceeds a pre-determined threshold, or may prompt manager authorization to issue or redeem.

The dealer 304 withdraws chips from the chip tray 314 and counts out an amount of chips (a number of "disbursement chips") equal to the chip disbursement amount displayed by the table management device 320. The dealer 304 places the disbursement chips onto the scratchpad 330 for system verification (operation 432). In some embodiments, the RFID reader of the scratchpad 330 continuously and periodically polls for chip information (e.g., chip count, chip value) within the scratchpad 330 at a pre-determined interval (e.g., once every second, once every 0.5 seconds) and transmits those readings to the table management device 320. In some embodiments, the table management device 320 activates periodic polling for chip information from the scratchpad 330 beginning when the chip disbursement amount is displayed to the dealer 304. The amount of chips on the scratchpad 330 (e.g., as read by the RFID reader) is referred to herein as the "scratchpad amount." The table management device 320 compares the scratchpad amount with the chip disbursement amount to verify that the dealer 304 has counted out the proper value of chips (operation 434). Once the scratchpad amount has been confirmed to equal the chip disbursement amount, the table management device 320 displays a confirmation to the dealer (operation 436) and the dealer 304 then distributes the disbursement chips to the player 302 (operation 438). If, at test 440, no change is needed for this voucher redemption, the table management device 320 updates the voucher 318 as being redeemed in the casino ticket system (operation 450).

In some embodiments, as described above, the dealer 304 may owe the player 302 a remainder amount from the voucher redemption. For example, if the dealer 304 disbursed $135 in chips to player 302, the dealer 304 may owe the player $0.20 as the remainder value from the voucher 318. Or in another example, if the dealer 304 disbursed only $100 in chips to the player 302, the dealer 304 may owe the player $35.20 as the remainder value from the voucher 318. In such remainder situations, the table management device 320 may automatically print a remainder voucher at the ticket printer 324 (operation 442), which the dealer 304 presents to the player 302 (operation 444). In other embodiments, the table management device 320 may perform an account deposit transaction of the remainder value into an account of the player 302 (e.g., a digital wallet account, a house account) or gifted to the dealer 304 (e.g., as a tip into a dealer tip account). Once completed, the table management device 320 updates the voucher 318 as being redeemed in the casino ticket system (operation 450).

In some embodiments, the dealer 304 may be required to present a voucher redemption with scripted mechanics. For example, the dealer 304 may be required to stage the original voucher and any remainder voucher on the table surface 308 alongside the disbursement chips, with the disbursement chips still on the scratchpad 330 (e.g., before disbursing any of the chips or remainder ticket). This allows the security camera 340 an opportunity to clearly witness the components of the exchange together. In some embodiments, the dealer 304 may make a hand gesture (e.g., "clearing hands") to signify (e.g., to the camera, the pit boss, the players, and so forth) that a significant event is being performed by the dealer 304. In some embodiments, the dealer 304 may press a button on the table management device 320 that signifies the staging of the exchange components. At such time, the table management device 320 may trigger the security system to capture video or images of the table 300 at or during that time.

Figure 5:
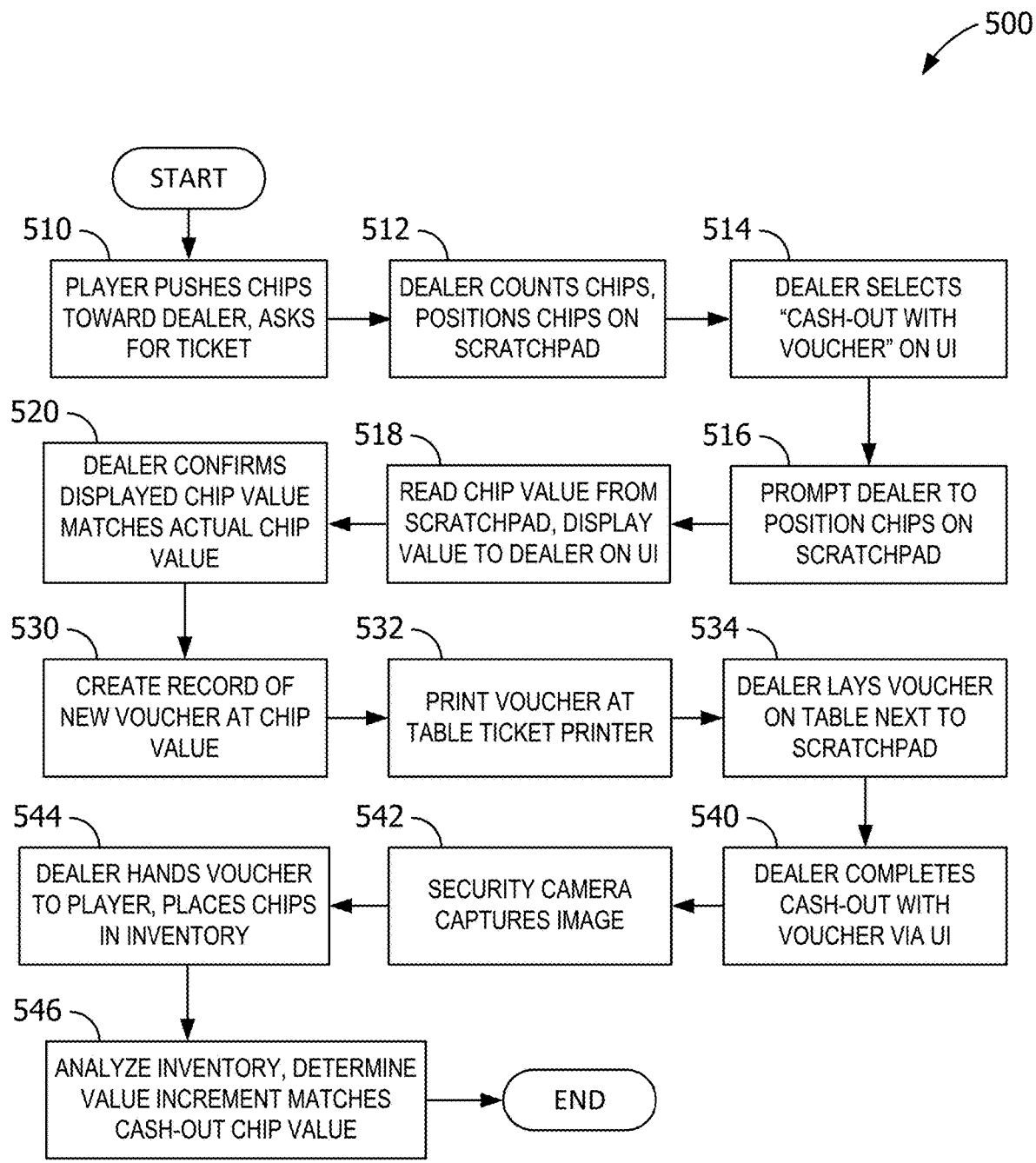
FIG. 5 is a flow chart illustrating an example method for performing a voucher redemption or "ticket-out" action at the smart table using the table ticketing system.

FIG. 5 is a flow chart illustrating an example method 500 for performing a voucher redemption or "ticket-out" action (also referred to herein as "cash-out with voucher") at the smart table 300 using the table ticketing system. In the example embodiment, the player 302 is participating in a table gaming session at the smart table 300 (e.g., playing blackjack). At the conclusion of their table gaming session, the player 302 wishes to cash out and move to an electronic gaming machine such as those shown in FIGS. 1 and 2. For example, presume the player 302 holds a personal chip inventory valued at $220 at the end of their table gaming session. To initiate the ticket-out event, the player 302 pushes their chips toward the dealer 304 and asks for a ticket (operation 510). In some embodiments, the player 302 may also present their player loyalty card, which may also be scanned by the ticket reader 322 or otherwise entered into the table management device 200 to acknowledge the termination of the player 302's session at the table game. The dealer 304 manually counts the chips and positions the chips on the scratchpad 330 (operation 512). The dealer 304 selects a voucher creation button (e.g., "cash-out with voucher") on the table management device 320 (e.g., on the UI) to initiate a voucher creation operation with the table ticketing system (operation 514).

The table management device 320, in the example embodiment, prompts the dealer 304 to position the incoming chips on the scratchpad 330 (operation 516), reading the detected chip value from the scratchpad 330 and displaying the value on the UI (operation 518). As such, the dealer 304 can confirm that the detected chip value matches the actual chip value based on their visual inspection. Once the dealer 304 verifies that the detected value matches the actual value, the dealer 304 confirms the displayed chip value through the UI on the table management device 320 (e.g., pressing a confirmation button) (operation 520).

Upon confirmation, the table management device 320 causes a new voucher to be created in the casino ticket system based on the confirmed chip value (e.g., a valid and unredeemed $220 voucher). More specifically, the table management device 320 creates or otherwise causes the creation of a record for a new voucher (operation 530). In the example embodiment, the table management device 320 transmits a voucher creation request to the TITO system server 108, and the TITO system server 108 creates a new record for the new voucher in a backend database (not shown). The TITO system server 108 generates ticket information that is used by the table management device 320 to print the new voucher at the ticket printer 324 (operation 532).

Once printed, the dealer 304 lays the new voucher on the table 300 next to or near the scratchpad 330 and the incoming chips (operation 534) and completes the cash-out with voucher action on the UI of the table management device 320 (e.g., pressing a final completion button) (operation 540). In some embodiments, the table management device 320 may transmit a command to the security system to have the security camera 340 capture an image or a video of the transaction (operation 542). In some embodiments, the table management device 320 may transmit an initiation operation to the security system when the dealer 304 initially selects the cash-out with voucher option at operation 514 (e.g., causing the security camera 340 to begin capturing video) and may transmit a completion operation to the security system when the dealer 304 completes the cash-out at operation 540 (e.g., causing the security camera 340 to cease capturing video).

The dealer 304 hands the new voucher to the player 302 and places the chips into the chip tray 314 (operation 544). In some embodiments, the table management device 320 may detect chip value changes to the chip tray 314 during and after the ticket-out action to ensure that the value of chips, or even the particular chips, involved in the ticket-out action are placed into the chip tray 314 (operation 546). For example, the table management device 320 may capture a value of chips within chip tray 314 periodically (e.g., every 5 seconds) or at stages of the ticket-out action, and the changes in chip value may be evaluated by the table management device 320 or the security system to ensure that the incoming chips are placed into the chip tray 314.

For example, the table management device 320 may capture an initial tray value when the ticket-out action is initiated at operation 514. Since the dealer 304 is conventionally under instruction to only process one transaction operation at a time, the only change in the total value of the chip tray 314 during the ticket-out action should be the incoming chips being placed into the chip tray 314, which would thus increase the total chip value of the chip tray 314 by the chip value determined from the scratchpad 330 during the exchange. The table management device 320 may, thus, also capture a final chip value (e.g., at or after operations 540-544, within a pre-determined amount of time after operation 540). The final chip tray value may be compared to the initial chip tray value to determine that the chip tray value has increased by an amount equal to the value of the incoming chips. In some embodiments, individual chip IDs of the incoming chips may be detected (e.g., as a list of particular chips at operation 518) and may later be analysed to determine whether those particular chips appear within the chip tray 314.

Such ticket-in and ticket-out actions provide numerous benefits to the casino and their players. For example, the various automated detections by the RFID readers in the smart table 300 provide enhanced security as dealers exchange chips with players, reducing some cash handling by dealers when they receive tickets instead, and automatic counting and verification of chip values as chips move to and from the chip tray 314. In addition, allowing ticket-in and ticket-out actions at table games reduces the number of "fills" and "credits" associated with table games. Further, lines at the casino cage may be reduced since players do not need to go to the casino cage to acquire cash or chips with their EGM-generated tickets. In addition, tickets become valid currency at both EGMs and table games, allowing players to move more easily between these two wagering venues. Security may also be enhanced by, for example, requiring large ticket issuances or redemptions to be approved by a manager before completion.

In some embodiments, the casino operator may provide rewards or bonuses to the player 302 based on their play at table games (e.g., at the smart table 300). For example, the casino operator may wish to incentivize continued play or reward the player 302 for an amount of time played at the table game, an amount wagered during table game play, or an amount won or lost at table game play. Aspects of the smart table 300, the table management device 320, or the ticket printer 324 facilitate player play tracking and rewarding beyond what is possible at a conventional table game. For example, the table management device 320 may identify when a particular player begins and ends table game play based on the player 302 providing their player loyalty card during ticket-in or ticket-out/cash-out actions. In some embodiments, the position of the player 302 may be established. For example, the dealer 304 may enter the player 302's identification into a particular table position within the UI, or the position of the player 302 may be automatically detected as described herein. The table management device 300 may use the RFID technology of the smart table 300 to track how much the player 302 bet each round, or overall during their gaming session (e.g., using an RFID area associated with their wagering area 310), or how many hands have been played while the player 302 has been playing.

As such, the table management device 320 in conjunction with the casino management system or player tracking system may utilize the play data of the player 302 at the smart table 300 to determine an award or bonus for the player. When the player 302 has achieved an award (e.g., free bet, match play, promo bet), the table management system may issue the award to the player (e.g., within the player app). If the player wishes to redeem the award, the table management device 320 may print an award voucher (not separately shown) at the ticket printer 324 for the dealer to exchange for chips or use as chip replacement (e.g., for a single-hand bet). Such awards may be achieved during table game play (e.g., based on recent table game play data) and, in some embodiments, may even be related to the particular table game being played at the smart table 300. Accordingly, the award voucher may be given to the player 302 by the dealer 304 during their current game session. For example, the award may be for a free $10 bet on a hand of blackjack. As such, the player 302 may use the award voucher immediately or during their current gaming session at the smart table 300. In some embodiments, the table management system may utilize data from the smart table 300 to provide awards at the table 300 such as based on player session, based on player bet behaviour, randomly award prizes, provide progressive and mystery awarded prize pools, provide prize pools that span across table games and EGMs, location-based prizes, tournament-based awards tied to groups of players, and consolation prizes based on location, behaviour, or other criteria. In some embodiments, awards may be triggered based on pre-defined earning rules, and may include corresponding messaging.

In some embodiments, the player 302 may redeem the ticket 318 at the table 300 either partially or completely into their digital wallet. For example the player 302 may have a ticket 318 worth $104.50 and may ask the dealer for $100 in chips (e.g., for table game play) and the remainder to be deposited into their digital wallet (e.g., casino play wallet). As such, after scanning the ticket 318, the dealer 304 may use the table management device 320 to identify any portion of the ticket value that may be assigned to a chip buy-in and any portion of the ticket value that may be assigned as a deposit amount into their digital wallet. The dealer performs the chip buy-in portion for the buy-in value (if any) and the table management system transfers the remainder as a deposit into the player's digital wallet. The identity of the player and their associated digital wallet may be performed via any of the methods described herein, such as via presentation of a player tracking card to the dealer 304, cardless connection and identification of the player via their mobile device, identity of the player 302 based on the ticket 318, or such. The table management system may print a redemption slip that may include deposit information for placement into the table drop.

Figure 6:
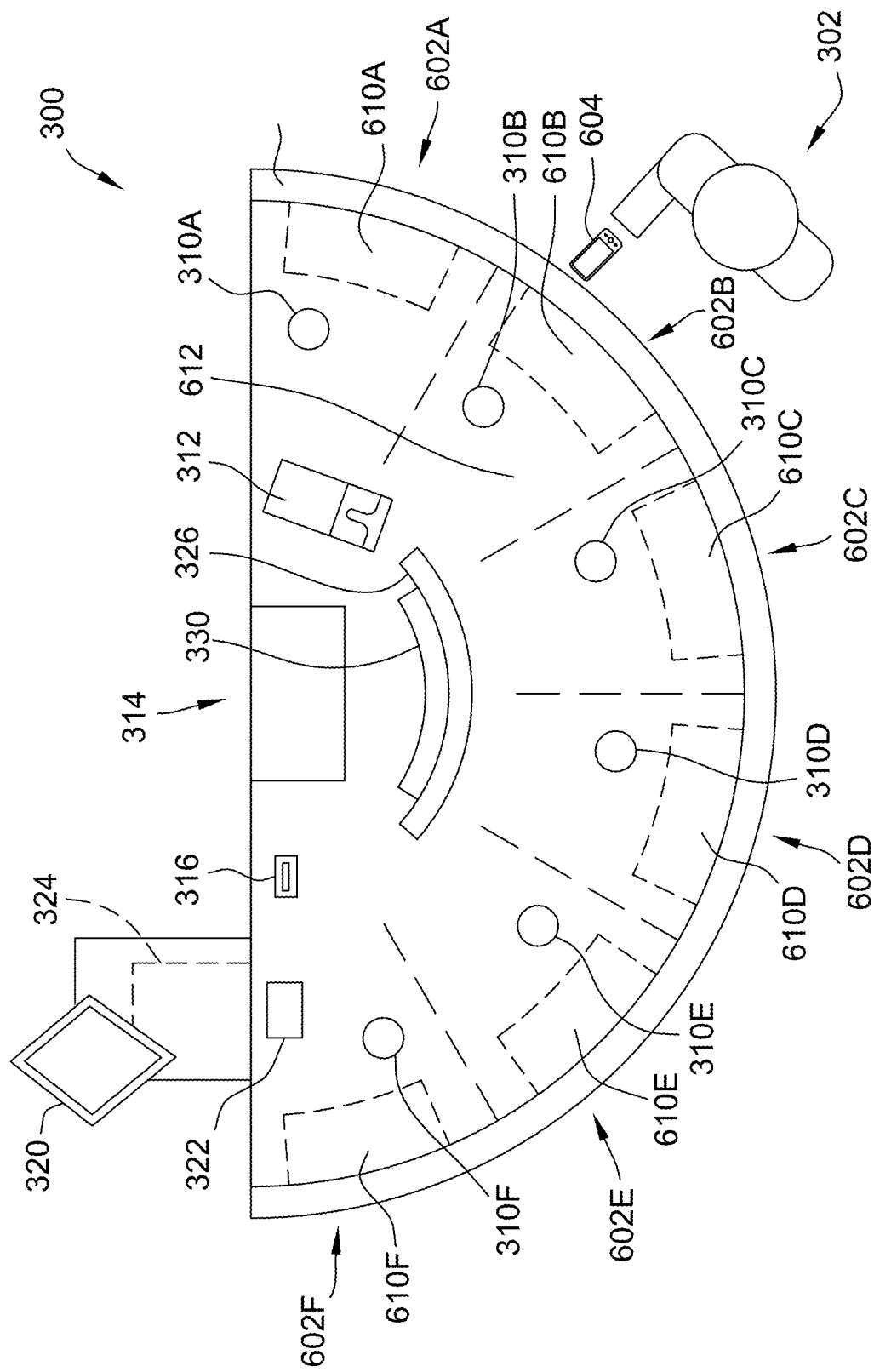
FIG. 6 is an overhead view of the smart table and table management device that are configured to allow the player to use a digital wallet from their mobile computing device to perform buy-in and cash-out actions during a table gaming session.

FIG. 6 is an overhead view of the smart table 300 and table management device 320 that are configured to facilitate player positioning and allow the player 302 to use a digital wallet from their mobile computing device 604 to perform buy-in and cash-out actions during a table gaming session. In some embodiments, the player positioning and digital wallet methods described below may be used in conjunction with the ticketing methods described above with respect to FIGS. 3-5. In the example embodiment, FIG. 6 illustrates various player positions 602A-602F (collectively, "player positions 602") for a table game (e.g., blackjack). The smart table 300 includes various components as shown in FIG. 3, not all of which may be illustrated for purposes of clarity. The diagram shown in FIG. 6 includes several long broken lines that approximately separate the exterior, player-adjacent portion of the table into six player positions 602. It should be understood that more or less player positions 602 may be provided, and that these broken lines may or may not appear as markings on the table, but are used here to illustrate the play area used by an individual player 302 to play the table game (e.g., when sitting or standing near that play area 602).

In some embodiments, one function of the smart table 300 and associated devices is to establish a virtual representation of the table 300 (e.g., in computer memory, database, or such) that identifies which players 302 occupy which particular positions 602 at that table 300. As such, the table management device 320 or the table management system server 106 may create and manage data structures (not shown) for each table 300 (e.g., for some or all smart tables in a particular property, or across multiple properties). These data structures are referred to herein as a table management database 1320 (shown in FIG. 13). The table management database 1320 may include, for example, table-level information for each table 300 (e.g., unique table identifier, table type, number of positions, position identifiers for each position, active dealer, current chip counts), position-level information for each position 602 at a table 300 (e.g., current occupancy status, player identification for that position), or transaction for players (e.g., when player funds table play through use of a voucher, if player has taken change voucher and redeemed or funded other gaming types, if player has redeemed table chips for a voucher and either redeemed at a redemption source or used for other game play). Such information may also be displayed to the dealer 304 via the UI provided by the table management device 320 as described herein. It should be understood that "table 300" and "positions 602" may be used to refer either to the real-world tables or real-world positions at those tables, to the virtual tables or virtual positions at those tables (e.g., within the table management database), or both, depending on context.

In some embodiments, the table management device 320 allows manual positioning of the player 302 at a particular player position 602. Manual positioning updates the data structure, establishing the presence of the player 302 at their particular position 602B within the table management database 1320. Manual positioning may initiated by the dealer 304 ("manual dealer-initiated player positioning") or by the player 302 ("manual player-initiated player positioning"), as described below.

In some embodiments, the table management device 320 allows dealer-initiated player positioning. For example, the dealer 304 may use the table management device 320 to associate a selected position at the table 300 with the particular player 302 by scanning or swiping a loyalty card of the player 302 when the player first begins their gaming session at the table 300 to enter the player 302 into rated session play. In some embodiments, the player 302 may perform cardless connect with the table 300 via their mobile device 604, or perform a digital card scan that displays within the player app, to identify the player 302 to the table 300. Once the player 302 has been identified within the table management device 320, the dealer 304 may assign that player 302 to a particular logical position corresponding to their physical position 602 at the table 300. For example, the dealer 304 may select, on a virtual table map (not separately shown) displayed to the dealer 304 on the UI of the table management device 320, the particular position 602B at the table 300 that particular player 302 actually occupies. As such, the player 302 is virtually assigned to their real-world position.

In another example, the table management device 320 allows player-initiated player positioning. For example, the player 302 may use their personal device 604 to select the table 300 from a map of the casino and the particular position 602B from a map of that table 300. The property owner, table manufacturer, or other parties may provide a downloadable app ("the app", not shown, e.g., installed on their personal device 604) through which the player 302 can interact with the table management system server 106 or casino management system server 114 to facilitate aspects of the functionality described herein (e.g., player positioning, digital wallet use, back-betting, and so forth). In some embodiments, the app may provide a map of the casino property and allow the player to select their table and position from the map. In some embodiments, the app may allow the player to scan a position label (e.g., a QR code or other machine readable image) displayed on or near the table that can be used to uniquely identify a particular table 300 or a particular position 602 at a particular table 300. In some embodiments, the player app may determine which table 300 the player 302 is nearest and may allow the player 302 to select a position at which they are seated.

In some embodiments, the dealer may first perform dealer-initiated player positioning and, once entered, the table management device 320 may prompt the player 302 to confirm the dealer-selected positioning (e.g., via the player app on their personal device 604).

In some embodiments, the table management device 320 automatically detects which player position (or just "position") 602 the player 302 occupies at the table 300. The player 302, in this example, is a loyalty member with the casino operator, having a registered player profile with the casino (e.g., a loyalty card, a unique identifier, player information, and so forth, stored within the player tracking system). Further, the player 302 has their mobile computing device (or just "personal device") 604 (e.g., their smartphone) on their person during the game play session, and the player 302 has a player application ("player app") installed on their personal device 604. Such verification then associates the particular player 302 to the player position 602B for a game play session (e.g., via virtual presence as recorded and maintained in table management database 1320).

Figure 7:
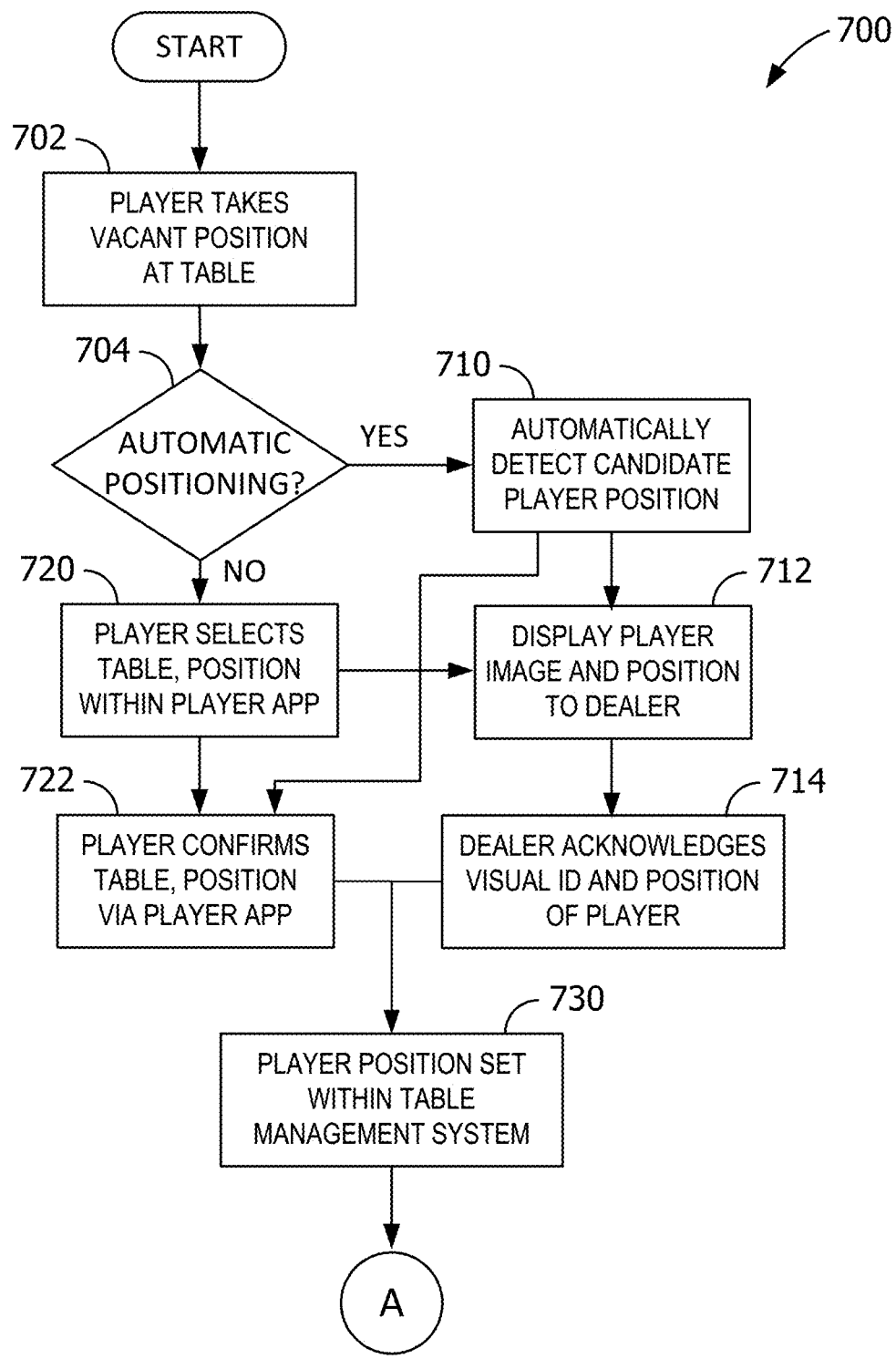
FIG. 7 is a flow chart illustrating an example method for establishing player positioning of the player at the smart table.

In some embodiments, the table management device 320 utilizes global positioning system (GPS) functionality to automatically perform position determination for the player 302. More specifically, the table management device 320 may use GPS position information to determine where the player 302 is within the casino and, more particularly, where the player 302 is relative to the smart table 300. For example, the table management device 340 may utilize pre-configured geofencing relative to the smart table 300 to determine whether the player 302 is near the table 300 and optionally which position 602 of the table ("candidate player position 612") the player may be occupying relative to the table 300. For example, each player position 602 may be fenced to include a portion of the table 300 (e.g., where the player 302 may set their mobile device 604) and a seating area adjacent to that position 602 (e.g., where the player 302 may be holding their mobile device 604 or have their mobile device in their pocket, purse, coat, or such). In some embodiments, once a candidate player position 612 for the player 302 is identified, the table management device 320 may prompt the dealer 304 to verify the presence of the particular player 302 at that candidate position 612 (e.g., by displaying the candidate position 612 along with a profile image of the player 302 to the dealer 304 via the UI of the table management device 340). Such is referred to herein as "dealer-verified automatic positioning." In some embodiments, the table management device 320 may prompt the player 302 to verify occupation of the candidate position 612 (e.g., by displaying the table 300 within the casino layout and the candidate position 612 over an image of the table via the player app). Such is referred to herein as "player-verified automatic positioning." In some embodiments, both the dealer 304 and the player 302 may verify the candidate position 612. Such verification then associates the particular player 302 to the player position 602 for a game play session. FIG. 7 describes player positioning at the smart table 300 in greater detail below.

In some embodiments, the table 300 may include one or more wireless beacons (not shown) through which the table management system may use, for example, Bluetooth or other NFC technology to automatically and cardlessly connect with personal devices 604 of players 302, determine identities of players 302 (e.g., loyalty IDs, player tracking IDs, or such), and determine positions 602 of various players and their personal devices. The beacon may be, for example, a Bluetooth radio device and associated controller for managing connectivity with player devices (e.g., personal devices 604).

In some embodiments, the table 300 may include surface technology (e.g., NFC, contactless technology) that allows the player 302 to place their device 604 at or near a particular location on the table surface (not separately shown) to allow the table 300 to wirelessly connect with and identify the device 604 and an identity of the associated player 302, and thus associated that player with a particular player position. For example, each position 602 at the table 300 may include an NFC target device (not shown) embedded below each player inventory area 610 such that, when the player 302 places their personal device 604 near the NFC target device, an NFC connection is affected. In some embodiments, the table 300 may provide a designated area outlined on the surface of the table 300 onto which the player 302 is to place their personal device 604 to affect this NFC connectivity (e.g., a circular section, not shown, at each player position 602), and under which the NFC target device is installed. The NFC device may be tuned to have a range of just a few inches in diameter to, for example, avoid accidentally allowing adjacent players 302 to inadvertently connect at an incorrect position 602. As such, during game play, the player 302 may place their personal device 604 to affect automatic player positioning via NFC. In some embodiments, the table 300 may allow the player to pair with the table 300 using a connection code. Cardless connection is described in greater detail below, including FIG. 15.

In the example embodiment, each play area 602 includes a wagering area 310 within which the player 302 places wagers. As the dealer 304 deals cards from the shoe 312, the dealer 304 places those cards for each player 302 somewhere within the player position 602, allowing the player 302 to see their cards and distinguish their cards from the cards of the other players 302. Further, the smart table 300 also includes player inventory areas 610A-610F (collectively, "player inventor areas 610"), one for each player position 602.

During game play, players 302 typically maintain their personal inventories of chips near themselves and adjacent to the arm rest rail 306 (e.g., the chips that they have not currently placed as a wager). The smart table 300 includes RFID areas underneath each of the player inventory areas 610 that allow the table management device 320 to determine and evaluate the chip inventory of the player 302 for various purposes described herein. In the example embodiment, the short broken lines bordering the player inventory areas 610 approximately indicate where each player 302 may place their chip inventory such as to be readable by the associated RFID reader. As such, the player inventory areas 610 represent where the smart table 300 can detect out-of-play chips of the player. The smart table 300 or the table management device 320 may use the RFID sensors of the player inventory areas 610 to detect, for example, a total value of chips held by the player 302, which particular chips are held by the player 302, and chip movement into and out of the player inventory areas 610. In some embodiments, the player inventory areas 610 may be wider or narrower.

For example, the table management device 320 may analyze a value of chips moved from the player inventory area 610B of the player 302 to the wagering area 310B to determine when a wager has been made. The table management device 320 may analyze a value of chips moved from the wagering area 320B to either the player inventory area 610B (e.g., in the case of a player win) or to the chip tray 314 (e.g., in the case of a player loss). Such chip movement may be used to demarcate a single hand played at the table 300 or by the player 302, to validate a proper award amount during a player win, to determine whether the player 302 won or lost the current hand, to determine a specific amount won or lost by the player during a particular hand, to determine a net amount won or lost by the player 302 during their table gaming session, or to determine when the player 302 is leaving the table 300 (e.g., when their chips disappear from the player inventory area 610B and appear on the dealer scratchpad 330 for a ticket-out action or otherwise do not appear on the wagering area 310B). Such data may be referred to generally herein as "chip movement data" of the player 302.

In the example embodiment, the player 302 has a digital wallet app (or just "digital wallet") installed on or otherwise facilitated by their personal device 604. In some embodiments, the player app may be the digital wallet (e.g., a "casino play wallet (CPW)") and may interact with a third-party digital wallet app to facilitate various embodiments described herein. The digital wallet may contain payment account information for various personal financial accounts (e.g., bank accounts, house accounts) and payment cards (e.g., debit cards, credit cards) of the player 302 from which the player 302 may withdraw or deposit funds, and may also contain loyalty card information for the player 302 (e.g., associated with the player tracking system of the casino). Further, in some embodiments, the player tracking system server 110 or other back-end system operated by the casino operator may maintain a financial account on behalf of the player 302 and may allow the player to deposit funds into or withdraw funds from that personal casino account (e.g., as another source of funds) and may provide rewards to the player 302 via their digital wallet.

Figure 8:
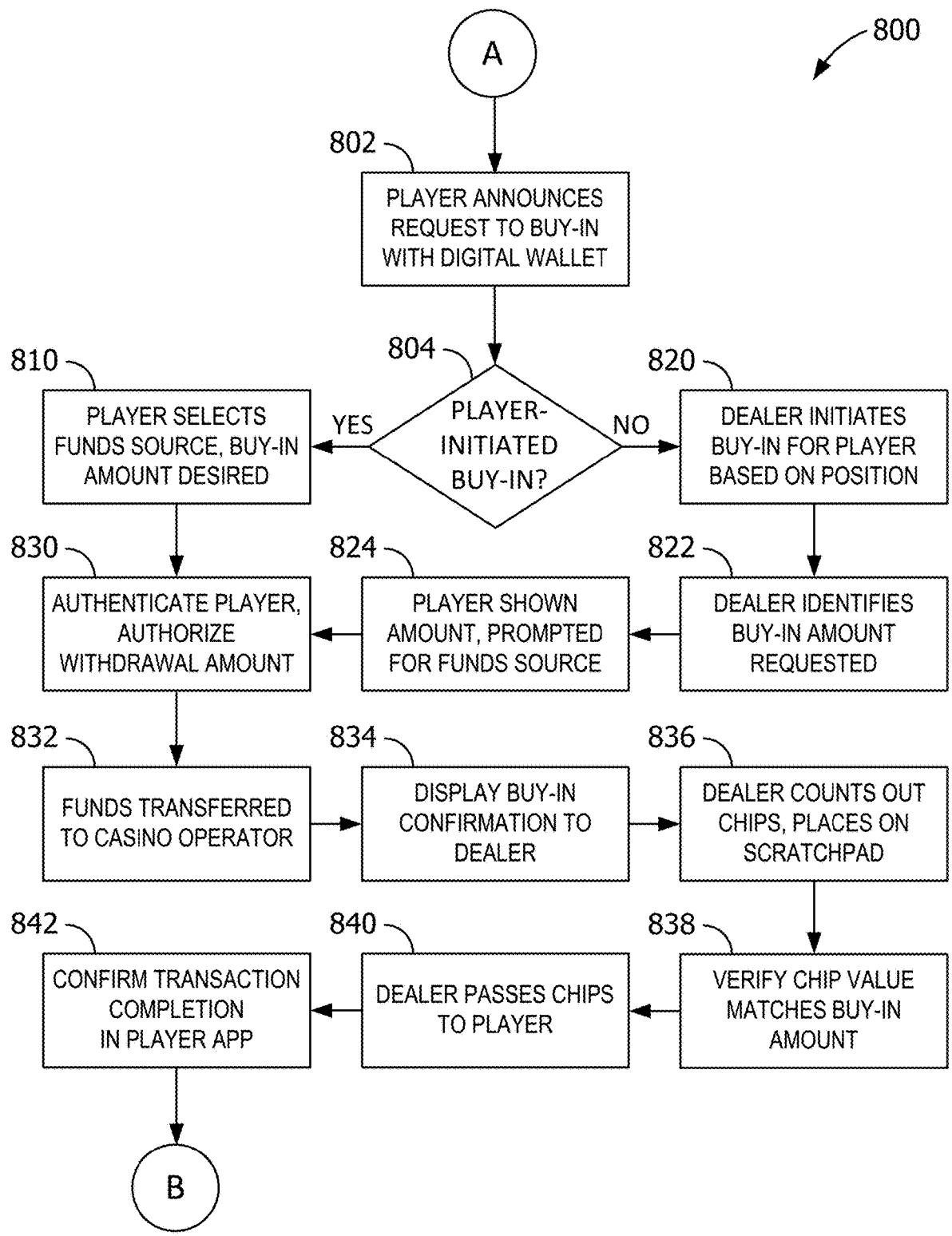
FIG. 8 is a flow chart illustrating an example method for performing a digital wallet-based cashless buy-in action at the smart table using a table management system.
Figure 9:
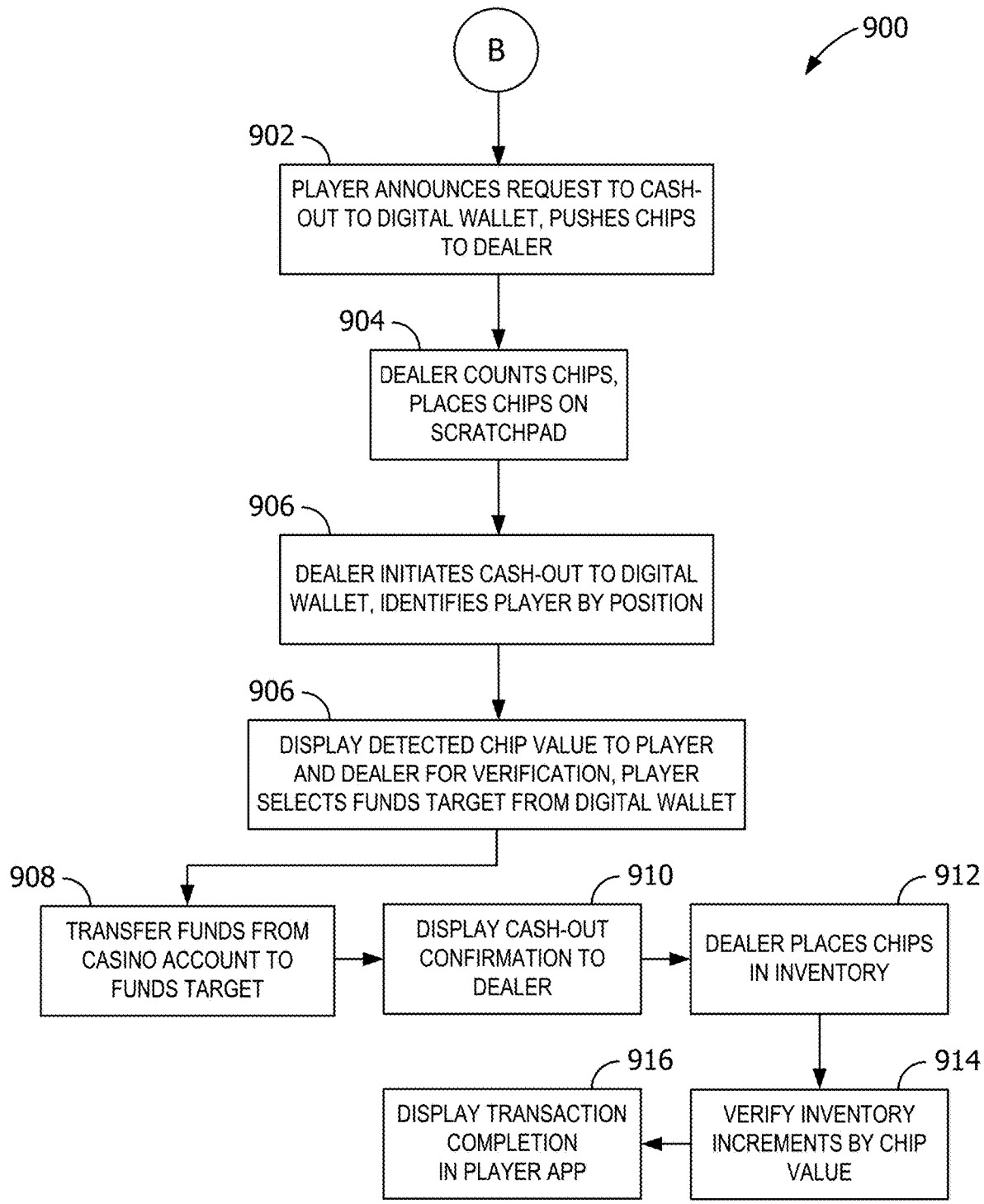
FIG. 9 is a flow chart illustrating an example method for performing a digital wallet-based cashless cash-out action at the smart table using a table management system.

During table gaming at the smart table 300, in the example embodiment, the table management device 320 facilitates digital wallet-based cashless buy-in, cash-out, and reward redemption actions from or to the digital wallet of the player 302 using their personal device 604. For example, the digital wallet may identify account information for several fund sources, such as personal bank accounts, payment cards, or personal casino accounts of the player 302. During a buy-in transaction, the player 302 may use their personal device 604 to initiate a buy-in with the dealer 304 at the table 300, causing funds from a fund source in the digital wallet to be used (e.g., in lieu of cash or ticket) to acquire chips at the table 300. During a cash-out transaction, the player 302 may use their personal device 604, or the dealer 304 may use the table management device 320, to initiate a cash-out at the table 300, causing funds to be deposited into a target account in exchange for the chips of the player 302. In some embodiments, the casino operator may wish to reward loyalty players with various awards (e.g., free bets, match play, promo bet) based on certain actions or achievements performed or accomplished by the player 302, and may deposit those awards into the digital wallet of the player 302 and alert the player via the player app on their mobile device 604. Some reward achievements may be digital wallet accomplishments, such as a first-time funding of the digital wallet with a threshold amount (e.g., first $100) for game play or performing a digital wallet-based cashless buy-in or cash-out at the smart table 300 or an EGM, or for loyalty accomplishments such as receiving 100 loyalty points during ranked session play. FIG. 8 describes the digital wallet-based cashless buy-in process in greater detail below. FIG. 9 describes the digital wallet-based cashless cash-out process in greater detail below.

For purposes of illustration and example, FIGS. 7, 8, and 9 together describe a combined example that includes aspects of player positioning, digital wallet-based buy-in and cash-out. However, it should be understood that any of these three techniques may be practiced independently of the others.

FIG. 7 is a flow chart illustrating an example method 700 for establishing player positioning of the player 302 at the smart table 300. In the example embodiment, the method 700 utilizes one or both of the table management system (e.g., the table management device and smart table 300) and the personal device 604 of the player 302. During operation, the player 302 physically takes a vacant position 602 at the table 300 (operation 702). If, at test 704, automatic positioning is being used, then the table management system automatically detects a candidate player position 612 of the player 302 (e.g., using GPS, NFC, Bluetooth, or other wireless technology-based player positioning methods described herein) (operation 710). Once the player 302 is at a candidate position 612, the table management system displays an image of the player 302 and the candidate position 612 to the dealer 304 (e.g., via the table management device 320) (operation 712). The dealer acknowledges visual identification of the player 302 and the candidate position 612 of the player (operation 714). In some embodiments, the table management system may additionally or alternatively have the player 302 confirm their table and position (e.g., via the player app) (operation 722).

If, at test 704, automatic positioning is not being used, the player 302 selects the table 300 (e.g., from a map of the casino, by table identifier) and position 602B at that table 300 (operation 720). In other embodiments, the dealer 304 may establish the position 602B of the player 302 by, for example, scanning the loyalty card of the player 302 or scanning the ticket 318 associated with the player 302 and assigning that player 302 to the position 602B. In some embodiments, the dealer 304 may additionally or alternatively be prompted to verify the position 602B manually selected by the player 302 (e.g., operations 712, 714). Once one or both of the player 302 and the dealer 304 have verified the player position 602B of the player 302, the player position 602B for the player 302 is set within the table management system (e.g., within the table management database 1320) (operation 730).

FIG. 8 is a flow chart illustrating an example method 800 for performing a digital wallet-based cashless buy-in action (also referred to herein as "buy-in with app") at the smart table 300 using a table management system. In this example, the player 302 occupies a player position 602B at the beginning of a table gaming session and the player 302 wishes to acquire chips to use during table game play. In the example embodiment, the player position 602B is automatically or manually determined within the table management system as described above with regard to method 700 shown in FIG. 7. In other embodiments, player positioning may not be used prior to method 800. The player 302 verbally announces to the dealer 304 that they wish to acquire chips with their digital wallet (operation 802), in some embodiments alerting the dealer 304 as to the value of chips they wish to acquire.

In the example embodiment, buy-in and cash-out events may be either initiated either (1) by the player 302 (e.g., initiated within their digital wallet or app) or (2) by the dealer 304 (e.g., in response to a verbal request made by the player 302). In player-initiated embodiments, the player 302 initiates the buy-in within the table management system via the app or digital wallet. In such scenario, in the example embodiment, the player 302 selects a funds source and a buy-in amount via their personal device 604 and player app (operation 810). The funds source is one of the funds sources from their digital wallet, such as a personal bank account or personal casino player account. In some embodiments, the player 302 is wirelessly connected to the table 300 and has a position determined (e.g., manually by dealer, manually by player, automatically, as described herein) to initiate the cashless buy-in or cash-out events.

In dealer-initiated embodiments, the dealer 304 initiates the buy-in within the table management system via the table management device 320. In such scenario, in the example embodiment, the dealer 304 identifies the player 302 within the table management system based on the player position 602B (e.g., by selecting a position 602B on the GUI, by scanning a loyalty card of the player 302 which is already associated with the position 602B, by confirming that the player 302 has otherwise already established that position) and initiates the buy-in process for that player 302 (operation 820). In the example embodiment, the identity of the player 302 is also identified with the table management system (e.g., for tracking of rated session play, transactions, generating awards, providing messaging, and such). In some embodiments, the dealer 304 may identify a buy-in amount requested by the player 302 (operation 822). In some embodiments, the player 302 may input or the buy-in amount or change the dealer-entered buy-in amount via the app on their personal device 604.

In situations where the player 302 is already identified within the table management system (e.g., assigned to the position 602B of the buy-in event, scanned by loyalty card, wirelessly connecting via their mobile device 604, or such), the table management system identifies and communicates with the personal device 604 of the player 302 to affect a digital wallet-based transaction for this buy-in process. The player 302 is shown the buy-in amount via their personal device 604 and player app, and the player 302 is prompted to select a funds source from the payment methods stored in their digital wallet (e.g., personal casino account, bank accounts, payment card accounts, casino credit account) (operation 824). In some embodiments, the player 302 may activate loyalty rewards at this stage. In some embodiments, the dealer 304 may be shown a photo image of the player 302 to visually confirm the identity of the player 302, or the table management system may perform facial identification as an authentication factor.

In situations where the player 302 is not yet identified within the table management system, the player 302 may use the player app to establish connection and identification with the table management system through any of the methods described herein.

In the example embodiment, the player 302 is authenticated by the table management system (e.g., via password, pin, multi-factor authentication, and so forth), and the withdrawal transaction is authorized by the funds source (operation 830). In some embodiments, a payment card processing network or third-party digital wallet provider may be used to authenticate and authorize the transaction. For example, the player 302 may authorize a bank withdrawal through their casino play wallet and the casino play wallet may submit a transaction request to the third-party digital wallet provider of an external digital wallet associated with the player. As such, the third-party digital wallet provider may perform the withdrawal transaction with the funds source (e.g., bank, payment card of the player 302, including transaction authentication and authorization) and, upon successful completion, the casino play wallet credits the funds to the casino play wallet of the player. The player 302 may need to separately authenticate with the third-party digital wallet provider during the transaction. The funds are transferred from the funds source to the casino operator (operation 832). In some embodiments, the funds source may include awards given to the player 302 and stored in the digital wallet, such as free bets or promo play, allowing the player 302 to redeem these types of awards. Once complete, the table management system displays successful transaction confirmation and buy-in amount to the dealer 304 (e.g., via the table management device 320) (operation 834) and optionally to the player 302 (e.g., via the app). The dealer 304 counts out chips equalling the buy-in amount and places those chips on the scratchpad 330 (operation 836). The table management system detects the chip value on the scratchpad 330 and verifies that the detected chip value matches the buy-in amount confirmed in the transaction (operation 838). The table management system displays confirmation of the match on the table management device 320 and the dealer 304 then passes the chips to the player 302 (operation 840). The table management system confirms the completed transaction with the player 302 via the player app, allowing the player 302 to verify the amount of the transaction versus the value of chips given. In some embodiments, the dealer 304 may push the chips to the wagering area 310B of the player 302 in lieu of, or in addition to, the scratchpad 330 and the table management system may count the chips via the wagering area 310B.

FIG. 9 is a flow chart illustrating an example method 900 for performing a digital wallet-based cashless cash-out action (also referred to herein as "cash-out with app") at the smart table 300 using a table management system. In this example, the player 302 occupies a player position 602B during the table gaming session, and the player 302 wishes to cash out at the conclusion of their table gaming session. In the example embodiment, the player position 602B is identified (e.g., automatically or manually determined) within the table management system as described above. The player 302 verbally announces to the dealer 304 that they wish to cash out with their digital wallet and pushes some or all of their chip inventory to the dealer 304 (operation 902). The dealer 304 counts the chips manually and places the chips on the scratchpad 330 (operation 904). The dealer 304 initiates a cash-out to digital wallet via the table management system, identifying the player 302 based on their player position 602B at the table 300 (operation 906). In some embodiments, the player 302 may be identified at the time of the cash-out event (e.g., via player loyalty card).

The table management system, in the example embodiment, detects the chip value present on the scratchpad 330 and displays the detected chip value to either or both of the dealer 304 (e.g., via table management device 320) and the player 302 (e.g., via the player app on personal device 604), and the player 302 selects a funds target from their digital wallet (operation 906). The funds target represents the receiving end of the cash-out transaction, where the funds will be deposited. In some embodiments, the player 302 may be allowed to identify an existing casino credit or markers as the funds target, allowing the player to satisfy a debt during the cash-out process via their digital wallet or player app. Upon identification of the funds target, the table management system transfers the funds from a casino account to the funds target account (operation 908). Upon successful completion, the table management system displays a cash-out confirmation to the dealer 304 (operation 910) and the dealer 304 places the chips into the chip tray 314 on the table 300 (operation 912). In some embodiments, the table management system may verify that the chip tray 314 incremented in value by the cash-out amount (operation 914). The table management system displays a transaction completion indication to the player 302 via the player app, thereby allowing the player to view and confirm the completion of the deposit. In some embodiments, the table management system may print a transaction receipt for the player 302 (e.g., via printer 324).

In some embodiments, the digital wallet of the player 302 may receive, contain, and be used to redeem virtual voucher rewards or bonuses issued by the casino. For example, the table management system may award the player 302 a virtual award voucher or bonus by depositing the voucher into the digital wallet of the player or otherwise allowing the player 302 to virtualize a physical voucher into their digital wallet. As such, the digital wallet may act as a holding place for award vouchers, and may be used to redeem such vouchers. For example, the player 302 may have received a $10 free play on the blackjack table 300 as an incentive for past play time, and that virtual award may have been deposited into their digital wallet. The player 302 may thus indicate to the dealer 304 that they have a virtual voucher that they wish to redeem. The dealer 304 may verify receipt and validity of the virtual voucher via the table management system, the digital wallet, and the player app, and may thus redeem the virtual voucher and cause that virtual voucher to be updated as consumed within the table management system. In some embodiments, the ticket printer 324 may print a physical voucher at the time of redemption, and that physical voucher may be used on the table 300 and deposited into the drop box 316 after use. As such, the table management system allows the player 302 to store and use awards from their digital wallet.

As described above, the table management database 1320 may be used to track player position at various tables 300 within the casino. In some embodiments, this player positioning data may be updated when players 302 vacate their positions 602. In one example, the player 302 may initiate a cash-out event to their digital wallet as described above. As such, the table management system may remove the player 302 from their position 602B in the table management database 1320 as a part of the cash-out process. In another example, the player 302 may remove their chips from the table (e.g., without a cash-out to digital wallet) and walk away. The table management system may automatically detect the removal of the chips from the position 602B (e.g., by detecting absence of the player's chips from player inventory area 610B for a pre-determined amount of time). As such, the table management system may remove the player 302 from their position 602B in the table management database 1320. The table management system may allow the dealer 304 to manually remove the player 302 from their position 602B by, for example, selecting a particular player or position from within the GUI on the table management device 320 and initiating a position clear or player removal event, thereby updating the table management database 1320. In some embodiments, the table management system may automatically vacate the player 302 from their position 602 if the player 302 is not within a pre-determined distance (outside a "zone of play") of the table 300 (e.g., as determined by GPS or other positioning described herein). In some embodiments, the table management system may automatically vacate the player 302 from their position 602 if their personal device 604 disconnects from the table 300 (e.g., disconnecting from NFC beacon or WiFi beacon provided by the table 300). In some embodiments, the player 302 may indicate they are vacating their position through the player app. In some embodiments, players 302 may be automatically vacated from their positions 602 based on hardware failures or disconnections (e.g., if the table beacon goes offline, if the mobile device 604 of the player goes into airplane mode or experiences loss of WiFi or data coverage).

Figure 10:
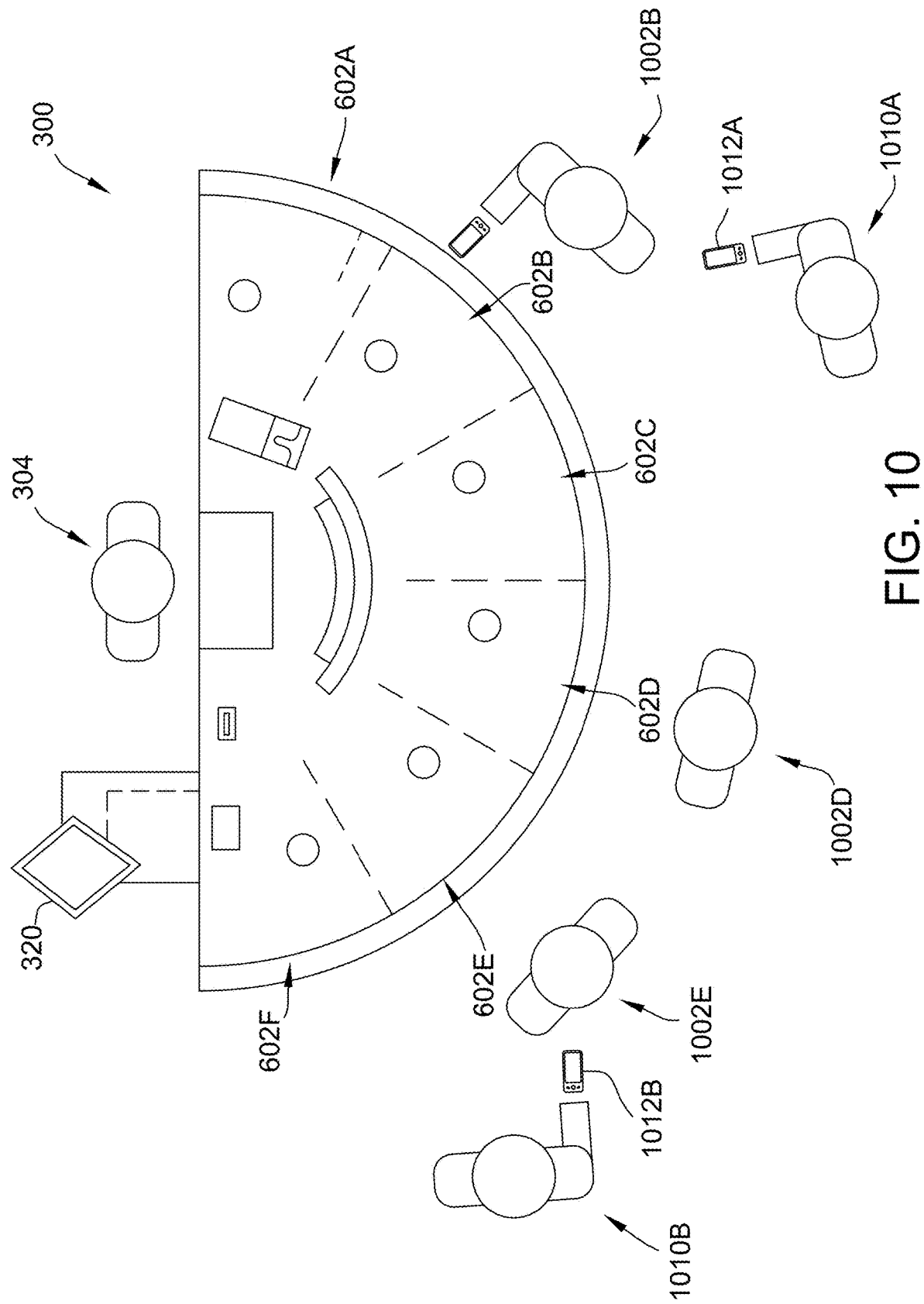
FIG. 10 is an overhead view of the smart table and table management device shown in FIGS. 3 and 6 that are configured to allow unseated players (or "secondary players") to wirelessly bet on seated players (or "primary players") using their digital wallet and personal device.

Some table games do not have pre-defined positions. For example, craps tables and Roulette tables typically have players standing around a perimeter of the table during game play with no pre-defined boundaries or wagering areas specific to each particular person. The term "position-less table," as used herein, refers to a table for a wagering game that does not provide pre-defined positions for each player, and the term "positioned table," as used herein, refers to a table for a wagering game that provides pre-defined positions for each player. Table 300 of FIGS. 3, 6, and 10 illustrate an example of a positioned table (e.g., for blackjack). A position-less table is not shown here. During game play at position-less tables, primary players typically hold their chip inventories and place their wagers on some specific areas of the table to represent their chosen wager. In some embodiments, the table management system may include a position-less table that provides many of the devices and functionality of example table 300. Many aspects of the ticketing methods, digital wallet methods, and back-betting methods described herein may be facilitated by the position-less table and table management system described herein. For example, the position-less table may provide a dealer scratchpad 330, table management device 320, ticket reader 322, and printer 324 that can be used for ticketing in or out at the position-less table, as described with respect to FIGS. 3-5. The position-less table may detect player presence at the table via a table beacon (e.g., Bluetooth) and the personal device 604 of a player 302 at the table and may facilitate digital wallet buy-in and cash-out as described with respect to FIGS. 6-9.

In some embodiments, the player 302 may perform a cashless cash-out to their digital wallet at a cage of the casino. For example, the player 302 may take their chips from the table 300 to the cage for redemption. The cage (not shown) may follow a process similar to method 900, using an chip count RFID area at the cage in lieu of the scratchpad 330 (e.g., to count the chips at operation 904), and with a cage attendant acting in lieu of the dealer 304. To identify the player 302 and their associated digital wallet, the player 302 may wirelessly connect to an NFC beacon or Bluetooth beacon at the cage via their player app, similar to as described at the smart table 300. Once identified and confirmed by the cage operator, the cage operator can initiate a deposit transaction for the cash-out operation to the digital wallet of the player 302.

FIG. 10 is an overhead view of the smart table 300 and table management device 320 that are configured to allow unseated players (or "secondary players") 1010 to indirectly (e.g., wirelessly) submit wagers on seated players (or "primary players") 1002 using their digital wallet and personal device 1010 (referred to herein as "back-betting" or "secondary engagement"). In some embodiments, the back-betting methods described below may be used in conjunction with the ticketing methods described above with respect to FIGS. 3-5 or the player positioning or digital wallet methods described above with respect to FIGS. 6-9. In the example shown here, some numbering has been excluded for ease of illustration. As used herein, the term "primary player" is used herein to refer to a person that is physically placing wagers on the table 300 during the table game (e.g., occupying a position 602 at the table 300 and participating directly in the table game, making decisions or otherwise taking actions that affect the outcome of their own table wager and potentially that of other back-betters). Primary players 1002, for example, place chip wagers on the table 300 (e.g., in wagering areas 310) and receive or lose chips based on the outcome of each round of the game. The term "primary wagering" is used herein to refer to primary players placing physical wagers on the table 300 during game play, and the term "primary wager" is used herein to refer to the wager of the primary player that is placed on the table 300. In some embodiments, such as illustrated in FIG. 10, each primary player 1002 occupies a position 602 at the table 300. In other embodiments, the table 300 may be a position-less table and, as such, primary players 1002 do not occupy pre-defined positions at the table 300. The term "secondary player" or "back-better" are used herein to refer to a person who is not a primary player (e.g., not placing chip wagers on the table 300), but who is instead participating virtually by back-betting during game play. The term "secondary wagering" is used herein to refer to secondary players placing wagers on the outcome of primary players, and the term "secondary wager" is used herein to refer to the wager a secondary player places during back-betting.

In the example embodiment, several primary players 1002B, 1002D, 1002E (collectively, "primary players 1002") occupy player positions 602B, 602D, 602E, respectively, at the table 300. The occupied player positions 602B, 602D, 602E may be referred to herein as active positions, as they are occupied by primary players 1002 and active during game play. The various player positions 602 at the table 300 may be identified herein as positions "A" through "F", the letters of which are also used as suffixes to the position-specific numerical indicia used in FIG. 10 for purposes of illustration. The primary players 1002B, 1002D, 1002E place physical chip wagers as primary wagers on the table 302 during game play. In some embodiments, the table 300 may detect primary wager amounts of primary wagers by sensing chip counts within wagering areas 310 via associated sensors.

Further, there are also several secondary players 1010A and 1010B (collectively, "secondary players 1010") shown in FIG. 10, each of which has a personal device 1012A, 1012B, respectively (collectively, "personal devices 1012"). Personal devices 1012 may be similar to the personal device 604 of player 302. In the example embodiment, secondary players 1010 have the app installed on their personal devices 1012 and the app participates in the table management system to facilitate allowing the secondary players 1010 to back-bet during game play at the table 300. Each of the secondary players 1010, in the example embodiment, use their personal devices 1012 to wirelessly communicate with the table management system and wager on the game play at the table 300. More specifically, the table management system allows secondary players 1010 to "back-bet," placing secondary wagers on the outcome of one or more of the primary players 1002, by placing secondary wagers (e.g., without physical chips) using funds from their digital wallet. Such secondary wagering allows the secondary player 1010 to place wagers that win or lose based on the outcome of the primary player 1002's play outcome. In other words, while the secondary player 1010 may choose an amount to wager separate from, and perhaps different than, the primary player 1002, the secondary player 1010 wins or loses the game round based on the decisions made by the primary player 1002. In some embodiments, the secondary player 1010 may bet against the outcome of the primary player 1002 (e.g., winning when the primary player 1002 loses, losing when the primary player 1002 wins). This relationship between the secondary player's wager and the outcome of the primary player is referred to herein as "hitching." In other words, the secondary player 1010A's secondary wager, once placed, is said to be "hitched" to the outcome of the primary player 1002B for a given game round.

For example, the primary player 1002B may make a $5 primary wager on a hand of blackjack by placing $5 in chips on their wagering area 310B, and the secondary player 1010A may make a secondary wager of $20, using funds from a fund source in their digital wallet, where the outcome of the secondary wager will be based on the game outcome of the primary player 1002B during that round of play. If the primary player 1002B wins that particular round, then the primary player 1002B is paid $5 by the dealer 304 with chips from the chip tray 314 (e.g., as a typical win in blackjack pays 1 for 1). Further, if the primary player 1002B won this round with a typical win, the secondary player 1010A is also paid 1 for 1, but based on the secondary bet amount of the secondary player 1010A (e.g., $20). As such, the secondary player 1010A is credited with a $20 win. Similarly, if the primary player 1002B loses the current game round, the primary player 1002B forfeits their $5 wager in chips, and the secondary player 1010A likewise forfeits their $20 secondary wager (e.g., from their digital wallet funds source).

To facilitate allowing secondary players 1010 to place secondary wagers on table games, the table management system provides a user interface (e.g., the player app) which may be installed or otherwise accessed via the personal device 1012 of the secondary player 1010. The user interface allows secondary players 1010 to place secondary wagers by hitching onto particular positions, particular players, or particular primary wagers, as described below. During operation, the secondary players 1010 execute the player app on their personal devices 1012, which facilitate player authentication and authorization into the back betting functionality described herein. The player may be required to authenticate within the player app, and with the table management system (e.g., via one- or two-factor authentication, including factors such as username and password, facial recognition, device confirmation, PIN, or such). The player app allows the secondary players 1010 to, for example, view active primary players and tables, hitch to players, positions, or tables, identify sources and targets of funds for secondary wagering, submit secondary wagers, view aspects of game play and results of primary and secondary wagers, live video streams, amongst other functionality.

In some embodiments, the secondary players 1010 hitch to primary players 1002 based on table position (e.g., at position-oriented tables such as, for example, black jack tables, poker tables, baccarat tables, or the like). The app may, for example, allow the secondary player 1010A to make a selection of an occupied player position 602 in the app. The user interface may present the secondary player 1010A with a map of the casino floor showing all of the table games, and may show a map of each individual table 300 illustrating the various positions 602 at that table 300. From this interface, the secondary player 1010A may find the table 300 near to where they are standing, and may select with which position 602 the secondary player 1010A wishes to hitch. In this example, the secondary player 1010A identifies the smart table 300 from the other tables in the casino, and further identifies the "B" position (e.g., the primary player 1002B) for hitching. In some embodiments, some primary players 1002 may have their position identified in the table management system via automatic or manual position determination, as described above in reference to FIGS. 6-9. Such data may be used by the table management system to identify which player positions 602 at the table 300 are currently occupied by primary players 1002. In some embodiments, the table management system may allow the secondary player 1010A to view certain public player profile information of the primary players 1002 in each of the positions 602, such as an identifier, a first name, a nickname, a thumbnail picture, or a personal icon. Once selected, the app initiates an interface for back-betting at the table of the selected position.

In some embodiments, the app may allow the secondary player 1010A to hitch to a particular primary player 1002B (e.g., independent of position). For example, in some embodiments, the app may display a "friends list" of other players known by the secondary player 1010A and may allow the secondary player 1010A to select a particular friend as the primary player 1002B with which to hitch. In some embodiments, the app may display an active or inactive status of each friend, and may display a table location for active friends in the list (e.g., based on position recorded in table management database 1320). As such, the secondary player 1010A may easily identify which of their friends are actively playing games and where they are, thus allowing the secondary player 1010A to more easily find that game and participate in back-betting. In some embodiments, the table management system may allow the secondary players 1010 to search for a particular player (e.g., to determine if they are active, to determine where they are currently playing, to view hitching statistics showing who is currently hitched to the particular player, and so forth). Once selected, the app initiates an interface for back-betting at the table at which the selected player (e.g., primary player 1002B) is currently active, thereby allowing the secondary player 1010A to place secondary wagers on the outcome of the selected primary player 1002B. In some embodiments, as the primary player 1002B relocates between tables, the app detects that the primary player 1002B at the new table and updates the interface to allow secondary wagering on the primary player 1002B at the new table.

In some embodiments, the app may allow the secondary player 1010A to hitch to a particular table bet (e.g., at position-less tables such as, for example, craps tables, roulette tables, or the like). The secondary player 1010A may select a table at which they wish to place secondary wagers (e.g., from a table list or map of the casino property). The position-less table may be configured to detect distinct bets at various betting locations on a position-less table based on table sensors within the table. For example, in a game of Roulette, the table may sense that a $100 primary wager has been placed on "Black" (e.g., via RFID chip count of the "Black" space of the table) and a $5 primary wager has been placed on the number "13" (e.g., via RFID chip count of the "13" space of the table). The app may detect and display each detected primary wager to the secondary player 1010A (e.g., in list form, as a graphical depiction over an image representation of the particular type of table). As such, the app allows the secondary player 1010A to both see each of the active wagers as well as select an active wager onto which to hitch. For example, the secondary player 1010A may select the primary wager on the "13" space. The app also allows the secondary player 1010A to identify a secondary wager amount to submit as the secondary wager (e.g., from a digital wallet source), where the secondary wager amount is placed as a secondary wager on the same space as the primary wager.

In some embodiments, possession of RFID-enabled chips may be tagged to individual players 302 (e.g., primary players 1002). In other words, when particular chips are issued to or won by a known player 302 (e.g., assigned during buy-in, upon awarding chips after a win, by storage in a known player's player inventory area 610, or such transactions visible to the table management system via the various RFID sensors), the table management system may track that possession until the player 302 loses that chip in a wager. As such, when the primary player 1002 places a wager at a position-less table, the table management system can determine which wager(s) are associated with that primary player 1002. Accordingly, the player app may allow secondary players 1010 to track bets of the primary player 1002, place secondary wagers on one or more of those bets of the primary player 1002, see outcomes of the bets of the primary player 1002, and such.

In some embodiments, the player app may allow the secondary player 1010 to hitch to, and optionally back bet on, electronic gaming devices such as EGMs 104, bar top video wagering games, or such. As such, the secondary player 1010 may bet on gaming outcomes of primary players 1002 on slot style games, video poker, video keno, video black jack, and the like. The player app may present a floor diagram of a casino or other wagering property and allow the secondary player 1010 to select from various EGMs 104 available for back betting or select from a list of active EGMs 104. In some embodiments, the player app may allow the secondary player 1010 to hitch to, and optionally back bet on, primary players 1002 in eSports or sports wagering.

In some embodiments, the player app allows the player 302 to favor certain actions within the app. For example, the player app may allow the user (e.g., player 302, primary players 1002, secondary players 1010) to favor a particular table, a particular dealer 304, or a particular primary player 302 (e.g., allowing the user to follow play at a favorite table, or play of a particular player or dealer, jump to such locations quickly, see summary statistics or player/dealer information, and such).

In the example embodiment, and as described above, the player app acts as or otherwise integrates with a digital wallet of the secondary player 1010. More specifically, the user interface of the app allows the secondary player 1010 to identify a funds source to be used for secondary wagering. The secondary player 1010 may select from various fund sources provided by their digital wallet of the secondary player 1010. In some embodiments, the table management system and player app may conduct separate transactions for each wager made, won, or lost by the secondary player 1010 during game play. In the example embodiment, the secondary player 1010 may make a single withdrawal transaction from a fund source for purposes of betting, and those funds may be virtually held by the table management system for use in secondary wagering (e.g., as a virtual chip inventory). The target of this withdrawal transaction may be, for example, a personal "house account" of the player, and perhaps may be an account dedicated to back-betting for that player. This "house account" may be an account managed by the casino or by a trusted third party (e.g., the app provider). The source of the withdrawal transaction may be a funds source selected from the digital wallet of the secondary player 1010 or a pre-existing house account. The funds source may be referred to herein as a "working account" or "back-betting account." In some embodiments, the back-betting account may act as a virtual chip inventory as the player participates in secondary wagering. Such action may reduce the number of transactions necessary with the fund source, instead performing one or a few "buy-in" transactions from the fund source, then perhaps a "cash-out" deposit transaction at a later time (e.g., when the secondary player 1010 decides they are finished with secondary wagering).

During game play, once the secondary player 1010 has been associated with one or more particular tables (e.g., via position hitching, player hitching, or table wager hitching), the table management system tightly controls wagering window(s) provided for the secondary players 1010 for each game round of the table game at that attached table. Wagering windows of the table 300 represent time periods in which secondary players 1010 are allowed to place or withdraw secondary wagers on or during a particular game round. Since table games differ as to mechanics of how each game is played, the timing of wagering windows for valid secondary wagering may be specific to the particular game being played. The term "initial wagering window" is used herein to refer to a window of time prior to the first game play event of a round in which players (e.g., primary players at the table 300, or secondary players via as described herein) may place wagers (e.g., prior to the first card being dealt in blackjack, prior to a "come out" roll in a round of craps, prior to a croupier calling off all bets during a Roulette spin, and so forth). As such, the term "initial primary wager" or "initial secondary wager" may be used herein to refer to a respective wager placed during the initial wagering window. Some table games provide additional opportunities to place wagers during a game round, as dictated by the game play rules for those games. For example, in blackjack, players have the option to split an initial pair of cards (e.g., pairs of aces, pairs of eights). A craps round starts with a "come out roll" (e.g., to establish a point), but may continue into numerous subsequent rolls and wagering opportunities for the players until the round is concluded (e.g., if a point is successfully established, eventually concluding the round with a "7" roll). Such "intra-round" wagering opportunities for the primary players 1002 may also present secondary wagering windows for the secondary players 1010. The term "intra-round wagering window" may be used herein to refer to a window of time during a game round in which primary or secondary players may place wagers. As such, the term "intra-round primary wager" or "intra-round secondary wager" may be used herein to refer to a respective wager placed during an intra-round wagering window.

In some embodiments, the table management system may facilitate back betting at a smart table providing a player-versus-player poker game (e.g., draw poker, Texas Hold'Em, or such, where the house acts as dealer but plays no hand). The smart table 300 may include a pot RFID area (not shown) that provides chip totals for the current pot, individual bet areas for each player bet or call (e.g., similar to wagering areas 310), player inventory areas 610, and such. These RFID areas may be used to detect when primary players 1002 make a bet, and may be used to determine which primary player(s) win, lose, or split a pot (e.g., based on detected chip movement on the table 300). As such, secondary players 1002 may be allowed to back bet on primary players 1002 at the poker smart table 300. In some embodiments, secondary players 1010 may be afforded a betting window before a round of play begins, allowing the secondary players 1010 to bet on whether a particular primary player 1002 will win, lose, fold, split, or advance to or past particular rounds of play (e.g., active after flop, turn, river in Texas Hold'Em).

To facilitate control of wagering windows, such as initial wagering windows and intra-game wagering windows, the table management system maintains a digital clock (e.g., a network time protocol (NTP) clock), referred to herein as a "table clock," that may be used to demarcate time relative to the state of the table game. The table clock may be used as a reference to demarcate when a particular action occurred, such as the conclusion of a previous game round (e.g., for a particular primary player 1002, or for the game round in general), the beginning or end of a wagering window for the next game round, or the beginning of the next game round (e.g., upon the first card being dealt, or upon indication by the dealer 304). In the example embodiment, each table 300 synchronizes a local table clock with a central table clock server, which acts as source of time to which all table clocks synchronize (e.g., via NTP). The table clock server may be hosted by the table management system server 106, the casino management system server 114, or another server within the network 214. In some embodiments, the local time source (e.g., the table management system server 106) may synchronize with an external source of time, such as stratum 0 or stratum 1 NTP servers. The table clocks and system clocks may be used to timestamp various table events at the tables 300 (e.g., wager window state changes)

or system events at the servers (e.g., received requests for secondary wager placement). In some embodiments, at conclusion of a previous hand of play, an inter-round timer may be started by the table 300 and may be displayed to the dealer 304, within which secondary players 1010 may submit secondary wagers. Upon expiration of the inter-round timer, the dealer 304 may begin dealing the next round of play, and the table management system closes the secondary betting window. The player app may synchronize with the inter-round timer and display the betting window to the secondary player 1010.

In some embodiments, the smart table 300 may include hardware or software functionality that allows the dealer 304 to manually manage when wagering windows for the table 300 are open or closed. For example, the smart table 300 may include a "back-betting button" (not shown) that is easily accessible by the dealer 304 (e.g., on the shoe 312, on the table management device 320, on the table between the shoe 312 and the chip tray 314). The dealer 304 may use the back-betting button to toggle the state of the wagering window(s) between open and closed (e.g., before or during a particular game round). In one example embodiment, the back-betting button is used for controlling an initial wagering window for the table 300. For example, at the beginning of a round of game play (e.g., prior to the first card dealt in a hand of blackjack), a back-betting state of the table 300 may be set to open by the dealer 304 using the back-betting button (e.g., toggled at the end of a previous round of play). Secondary players 1010 may submit secondary wagers on the table 300 (e.g., on a particular primary player 1002) during this initial wagering window. Just before the dealer 304 begins the play round (e.g., just before the first player card is dealt in a round of blackjack, just before the croupier calls an end to betting in a Roulette spin), the dealer 304 may press the back-betting button to close the initial wagering window for the table 300. The dealer 304 may again press the back-betting button to re-open the initial wagering window for the table 300 for a next round of play after the current round has been resolved (e.g., after the dealer's hand has been exposed in a hand of blackjack, after the ball falls into a pocket on the Roulette wheel, after a dice roll is completed at a craps table).

In the example embodiment, these manual button presses of the secondary wagering button cause the table 300 to transmit button press messages to the table management system server 106. The table management system server 106 may manage or otherwise track wagering windows for the table 300, as well as for other managed tables 300. When the table management system server 106 receives a button press event, the table management system server 106 may change the state of the initial wagering window (e.g., toggle from open to closed, from closed to open). The table management system server 106 may use the state of the initial wagering window to allow or deny secondary wagers. As such, the back-betting button may be used to manually control when the wagering window is open and closed for secondary players 1010.

In some embodiments, the smart table 300 automatically controls state changes for wagering windows. For example, the table management system may automatically determine when a game round begins for the table 300, when a game round ends for a particular primary player 1002, when a game round ends for the table 300, and, with some types of games, when the game transitions into different stages, either for a particular player (e.g., when a primary player 1002B splits or doubles down on a hand of blackjack) or for the game round itself (e.g., when a point is established after a "come out roll" in a round of craps). The table 300 may detect game play events using the RFID sensors built into the table 300, the chips, the cards, or other devices and mechanisms as described herein.

In some embodiments, the smart table 300 utilizes RFID-enabled playing cards (e.g., playing cards that each include an embedded passive RFID tag) and RFID card readers (not shown) configured at various positions within the table 300 to detect when to change states for various wagering windows. For example, at a blackjack configured table 300, the table 300 may include RFID readers ("card RFID readers") at one or more locations where cards are dealt by the dealer 304, both for each player position 1002 and possibly for a hand of the dealer (e.g., typically in front of the chip tray 314). The table 300 may be configured to close the initial wagering window for the table 300 when the first dealt card is sensed from any of the card RFID readers when the window is currently open. In some embodiments, the table 300 may include a threshold sensor (e.g., a card RFID reader, not shown) near a mouth of the shoe 312 over which the dealer 304 slides cards as they are dealing. The threshold sensor may be configured sense when the dealer 304 passes each individual card from the mouth of the shoe 312, across the threshold sensor, and out to each of the primary players 1002 or to the house hand. As such, the table 300 may be configured to close the initial wagering window for the table 300 when the first card is dealt for a round (e.g., as an indication of a beginning of a round event), or ensure that the initial wagering window for the table 300 is closed every time a card is sensed as being dealt (e.g., as an additional precaution).

In some embodiments, the smart table 300 automatically determines when a game round begins using a threshold sensor (not shown) near to the shoe 312 and integrated into the table 300, or integrated into the shoe 312. The threshold sensor may be configured sense when the dealer 304 passes each individual card from the mouth of the shoe 312, across the threshold sensor, and out to each of the primary players 1002 or to the house hand. As such, the smart table 300 may transition into the next game round when the dealer 304 deals the first card (e.g., when in between rounds, with the state of the window is open), thus closing the wagering window for secondary players 1010. In some embodiments, the smart table 300 may utilize digital camera input or RFID input with the cards to determine when the game round has begun or ended. For example, the cards may include bar codes that allow card detection and location from the digital video, allowing the smart table 300 to determine when cards are being placed onto the table or removed from the table. RFID areas may also be included in the smart table 300 where the dealer 304 places the cards in play (e.g., at each player position 602) such that the smart table 300 can determine when player positions 602 are dealt cards, or have cards withdrawn. As such, the first card placement detected by the RFID areas or by the digital video analysis signals the start of a round of play, and the removal of the last cards from the primary players 1002 and the house hand indicates the termination of the round of play. In one example embodiment, a house hand RFID area (not shown) is included for the house hand (e.g., near the dealer) and the smart table 300 may determine state changes or status of a round of play based on when one or more cards occupy the house hand RFID area. For example, the smart table 300 may determine that a round of play has begun when a card presence is detected in the house hand RFID area, closes the betting window for secondary players 1010 at that time, and may alert the dealer of any unauthorized changes to bets of the primary players 1002 (e.g., late bets, chip count removals or adds, as sensed via wagering areas 310) via the table management device 320 (e.g., audible alerts, visual alerts, displaying chip count change at particular player positions 602). Once the dealer 304 clears the cards from the house hand RFID area, the table 300 determines that the round is concluded.

For example, presume a card-based game such as Blackjack is being played at the smart table 300. The card game may utilize a smart shoe 312 to determine when the first card of a game round is dealt from the shoe (e.g., the first card draw event of a game round, based on output from a card deal sensor in the shoe 312). The smart shoe 312 is configured with a sensor that allows the smart table 300 to detect when a card is drawn from the shoe 312 (a "card draw" event). A particular game round for the table 300 starts in a "betting open" state (e.g., an open wagering window), allowing both primary players 1002 and secondary players 1010 to place wagers. In some embodiments, secondary players 1010 may be allowed to begin betting on the next round of play even before the previous round has concluded. Upon detecting the first card draw of the game round, the table management system automatically closes the wagering window for the table, effectively locking out secondary players 1010 from placing a wager on this game round. Any secondary wagers received after the wagering window has closed are rejected as invalid secondary wagers for the present game round (e.g., transmitting a wager rejection message to the personal device 1010 of the secondary player 1010 indicating the tardiness of the attempted wager).

While the game round is active, the wagering window is closed (e.g., the table is in a "betting closed" state), and the dealer 304 continues to administer the game round to the primary players 1002. In this blackjack example, an initial deal of two cards is dealt to each primary player 1002 as well as to the hand of the dealer 304. During this time, no chips are typically allowed to be added or removed from the wagering areas 310. Once all initial hands are dealt, the players are provided an opportunity to play each of their hands in order, typically starting from the "A" position and moving clockwise until all players have played. Some players may have achieved a natural blackjack, and thus may be immediately paid during their turn. Payment of the player at this stage may be detected based on chips moving from the chip tray 314 to the wagering area 310 of that primary player 1002. Such chip movement is automatically detected and determined to be a win for the primary player 1002, and thus also a win for any secondary player(s) 1010 hitched to that primary player 1002 and having valid secondary wagers placed on that game round. Similarly, if the primary player 1002 "busts" (e.g., draws more than 21 during their turn), the dealer 304 moves the chips of the primary player 1002 from the wagering area 310 to the chip tray 314. Such chip movement is detected by the smart table and determined to be a loss for the primary player 1002, and thus also a loss for any hitched secondary players 1010. Either a blackjack win or player bust by the primary player during their turn effectively ends the game round for the primary player 1002. In some embodiments, either of these events may open up the wagering window for any secondary players 1010 hitched to that primary player 1002, even though the game round for the table 300 may be still underway.

Continuing the blackjack example, at the conclusion of player turns for the primary players 1002, the dealer 304 administers the house hand based on pre-determined rules for the game. At the conclusion of the house hand actions, the dealer 304 has either stood with a valid card count (e.g., typically between 17 and 21), or the dealer busts (e.g., having drawn more than 21). The dealer 304 then commences determining whether each primary player 1002 has won, lost, or tied with the house hand. In situations where a particular primary player 1002B has won, the dealer 304 withdraws, from the chip tray 314, an amount of chips equal to the wager amount on the wagering area 310B and places that win amount on the wagering area 310B (e.g., typically next to the initial wager). The smart table detects this chip movement and determines that the primary player 1002B has won this game round, and thus any hitched secondary players 1010 have also won. In situations where the primary player 1002B has lost, the dealer 304 withdraws the wager chips from the wagering area 310B and places those chips in the chip tray 314. The smart table detects this chip movement and determines that the primary player 1002B has lost this game round, and thus any hitched secondary players 1010 have also lost. In situations where the primary player 1002B has tied with the house hand, no chip exchange is made between the chip tray 314 and the wagering area 310 and, as such, the outcome of that primary player 1002B may be as yet unascertained. If the smart table 300 determines that a subsequent player in the play order has won or lost (e.g., based on the chip movement steps above), then the smart table 300 may conclude that the primary player 1002B tied the house hand, and thus no win or loss is awarded to either the primary player 1002B or to any hitched secondary players. In some embodiments, as each particular primary player 1002 is determined to have won or lost, the table management system may open the wagering window for any secondary players 1010 hitched to that primary player 1002.

In some embodiments, the table 300 may detect when the last card of an initial deal for a round is dealt to the dealer 304 (e.g., second card dealt to the dealer 304 in blackjack) and may open the initial wagering window for the next round at that time.

In some situations (e.g., in blackjack), the primary player 1002 may be afforded an opportunity for supplemental play during a particular round of play (e.g., to double down or split a pair of cards in their initial hand). In some embodiments, the table management system may allow any hitched secondary player 1010 a brief window of time to determine whether or not they wish to increment their secondary wager amount (e.g., in the case of a double down by the primary player 1002) or add additional funds to play an additional hand (e.g., in the case of a split action by the primary player 1002). Such betting may be referred to herein as "supplementary wagering." For example, the table 300 may automatically determine a supplementary play situation based on when the primary player 1002 is dealt a pair of cards which may be split (e.g., via values determined by RFID with the individual cards) in conjunction with an additional matching bet amount sensed on the table 300 as being added within wagering area 310, as well as possibly sensing a separation of the cards (e.g., in a split situation). In some embodiments, the dealer 304 may indicate a supplemental wagering window, and type of supplementary wagering opportunity, available to secondary players 1010 for particular positions, as the hands dictate (e.g., via the table management device 320). As such, a "supplemental wagering window" particular to that primary player 1002 may be opened for a short period of time to allow any hitched secondary players 1010 to submit supplementary wagers. In other embodiments, the hitched secondary players 1010 may not be afforded such an opportunity and simply win or lose their secondary wager based on the initial hand and the initial secondary wager amount. Other types of table games may similarly provide supplementary play for the primary players 1002 and, as such, the table management system may similarly provide supplementary wagering windows.

In some embodiments, a visual indicator may be provided (e.g., to the dealer 304) to indicate when a particular primary player 1002 has hitched secondary players 1010 with active secondary wagers in the current game round. For example, in one embodiment, a small light (not shown) is provided at each position 602. The table management system may automatically activate the light whenever a secondary player 1010 has an active bet on that position 602. As such, the dealer 304 is able to easily tell when secondary wagering is occurring on any particular position 602. Accordingly, in situations of supplemental play (e.g., a split or double down), the dealer 304 may see that the secondary wagering indicator is active for a particular position and may pause to allow secondary players to make their supplementary wagering before continuing to deal the secondary play. This dealer delay effectively extends the supplementary wagering window.

In some embodiments, the shoe 312 may be configured with a visual indicator for the supplementary wagering windows. For example, the shoe 312 may include a red light that may be toggled on (e.g., do not deal) when a supplementary wagering window is open for a particular position. Once the supplementary wagering window is closed (e.g., after a pre-configured period of time), the table management system toggles the red light off (e.g., allowed to deal). In some embodiments, the shoe 312 may be configured to automatically lock cards from being dealt from the shoe 312 during supplementary wagering windows.

Since player evaluation and payment order may be dictated by conventions of the table game, the smart table 300 may determine a timing of the conclusion of the game round once the last primary player 1002 has been evaluated. The smart table 300 may determine which positions 602 are active for a given game round based on whether any chips are present on the wagering areas 310 of each of the positions 602. From the set of active positions 602, the smart table 300 may determine which active position 602 is the last to be paid (e.g., the closest to the "F" position). In the example shown here, the "E" position, player position 602E, is the last primary player position 602. As such, once that active position 602E has been evaluated for a win or a loss, the table management system may conclude the game round and open the wagering window generally. In some situations, the last primary player 602E may have tied the house hand, and thus will not register a win or a loss. In some embodiments, the table management system may utilize a time-out timer that starts with evaluation of the prior primary player 602D such that if the last primary player 602E is not detected to have won or lost within a pre-determined time (e.g., five seconds), the table management system concludes that the last primary player 602E has tied and closes the game round.

During the open wagering window, the secondary players 1010 determine to whom they wish to hitch (e.g., based on player position 602, based on player identity), how much they wish to wager on the upcoming game round, and a funds source for the secondary wager from their digital wallet. When a secondary wager is placed and confirmed valid, the table management system deducts the secondary wager amount from the identified funds source. As each primary player 1002 is evaluated for a given game round, the table management system thus also evaluates any hitched secondary players 1010 based on the outcome of the primary player 1002. For example, when the primary player 1002 wins, the table management system credits the hitched secondary players 1010 based on their secondary wager amounts (e.g., crediting the initial bet and the win amount to a fund target in their digital wallet). When the primary player 1002 loses, the table management system has already deducted the secondary wager amount, and thus no further action is required. When the primary player 1002 ties, the table management system reimburses the fund target with the initial wager amount. As such, the secondary players 1010 are able to back-bet on primary players 1002 wirelessly with their personal devices 1012, and without cash or chips by using their digital wallet for money movement with the casino.

There may be latency between (A) when the wagering window for the table 300 is closed (e.g., automatically or manually, as discussed above) and (B) when the table management system server 106 receives a signal indicating that the wagering window is closed or (C) when the personal devices 1012 of secondary players 1010 receive a signal indicating that the wagering window is closed. In other words, there may be a small period of time when the wagering window has been closed at the table 300 but the other participating devices are not yet aware. Such latency may occur naturally due to sensor signaling, signal propagation time, intermediary networking, server processing, communication delays, bandwidth constraints, or other such factors. Latency introduces a period of time ("latency window") in which secondary players 1010 may be submitting secondary wagers that appear to have been timely submitted to their personal devices 1012 (e.g., because the device 1012 has not yet received indication of the window closing) but that were in fact submitted after the wagering window for the table 300 is actually closed. This situation may give the perception to the secondary player 1010 that their secondary wager was timely submitted even though the wagering window had already closed. Further, in some situations, an unscrupulous secondary player 1010 may attempt to exploit such a latency window to gain an unfair advantage (e.g., by waiting for the first card of a black jack hand to be dealt before deciding on whether to submit a secondary bet on that first player).

To remediate such issues, in some embodiments, the table management system may queue secondary wagers (e.g., at the table management system server 106) for a short period of time, referred to herein as a "latency hold time," before allowing the secondary wagers to be confirmed for a particular game round. For example, the table management system may be configured with a latency hold time of 1.0 seconds. As such, when the table management system server 106 initially receives a secondary wager, even though the table management system server 106 may currently identify the wagering window as open for that table, the table management system server 106 may delay confirmation of that secondary wager for 1.0 seconds before confirming that secondary wager as timely entered. During that latency hold time period, the table management system server 106 may receive a close window signal from the table 300 and, if so, any queued secondary wagers are rejected as having been untimely submitted. Further, the player app may display a visual indication during the pendency of the secondary wager submission, changing to a confirmation message when the table management system server 106 confirms the timeliness of the secondary wager, or changing to a rejection message when the table management system 106 rejects the secondary wager.

Some latency may exist within the communications between the table management system and the personal devices 1012. For example, presume that there is a 2-second latency between when the secondary player 1010A places a secondary wager with their personal device 1012A and when the table management system receives the secondary wager request. If the secondary player 1010A is watching the play at the table 300 and submits the secondary wager just before the dealer 304 starts the game round (e.g., one second before), the secondary wager may be rejected as having arrived too late (e.g., one second after the table management system detected the start of the current game round). Such latency may cause frustration with secondary players 1010 if too large, as their actions were taken prior to the actual start of the game round, but were not recognized by the table management system in time to be confirmed for the current round. To combat such latency issues, in some embodiments, the smart table 300 may include a wireless network (e.g., Bluetooth, WiFi) which may allow nearby personal devices 1012 to connect and transmit secondary wager requests directly to the table 300. In some embodiments, the validity of a secondary wager received directly by the table 300 may be determined by the table 300 (e.g., as the primary source of control of the wagering window(s)). For example, the table 300 may receive a secondary wager and determine whether an appropriate wagering window is currently open (e.g., for the entire table in the case of an initial secondary wager, for a particular position in the case of a supplementary wagering window). If the secondary wager is timely submitted, then the table 300 may transmit the secondary wager to the table management system server 106 as a table-confirmed secondary wager. If the secondary wager is not timely submitted, then the table 300 may reject the secondary wager, and may communicate the rejection directly to the personal device 1012 of the secondary player 1010 or as a table-rejected secondary wager to the table management system server 106 (e.g., for tracking purposes, for server-based alerting of the secondary player 1010). Such proximity connectivity may reduce such latency issues by circumventing intervening networking hardware that may be present in other connectivity methods, such as if the personal device 1012 uses cellular connectivity or general site WiFi for network communications with the table management system, and instead having the personal devices 1012 communicating directly with the table 300.

In some embodiments, the table 300 transmits time-stamped log message on some or all state change events detected by the table 300 to the table management system server 106 or another logging server. For example, the table 300 may capture a time when the wagering window is opened or closed for the table 300, or a supplementary wagering window is opened or closed for a particular position 602 at the table 300. The table 300 may transmit the table identifier, the timestamp of the event, and an identifier for the particular event (e.g., WINDOW_OPENED, WINDOW_CLOSED, SUPP_WINDOW_OPENED, SUPP_WINDOW_CLOSED) as a log message. In some embodiments, the table 300 may collect and transmit play data for each round of play at the table 300. Play data may include, for example, wager amounts made at each position 602 (e.g., primary wagers, side bet wagers), secondary wager amounts made against each position 602, player information for primary players 1002 or secondary players 1010 participating in the round (e.g., player ID, position, primary or secondary, and so forth), wager outcomes for each position 602, chip movement data (e.g., chip totals or changes in 314, chip additions or removals from wagering areas 310), RFID card data (e.g., player hands, dealer hands, ordered list of cards dealt), player IDs, loyalty IDs, device IDs, device types, session-open and session-closed timestamp information, hands played, per hand wager amounts, per hand wager side bets, per hand wager split bets, per hand wager double down bets.

In the example embodiment, the player app provides a graphical interface through which players may interact with their digital wallets, participate in back betting, or other functionality described herein. The player app may provide a hitching module that allows secondary players 1010 to, for example, see a map of a casino property and the various tables 300 on which they may participate in back betting, see a list of active primary players 1002 to which they can hitch, select a particular table 300, view play information of the selected table 300 (e.g., primary players 1002 and positions 602 at the table 300, currently dealt cards and active bets at each position 602, player performance history), and select one or more primary players 1002 to hitch. The player app may provide a secondary wagering module that allows secondary players 1010, once hitched, to view play information at the hitched table 300, view opening and closing of wagering windows, submit secondary wagers against the hitched primary player 1002, identify sources of funds targets for winnings for secondary wagers, view play results, interact with their digital wallet, and other functionality that facilitates the secondary wagering systems and methods described herein. In some embodiments, the player app may allow secondary players 1010, once hitched, to automatically submit a secondary wager on the hitched primary player 1002 when a new round of betting begins. In some embodiments, the player app may allow secondary players 1010 to automatically submit supplementary wagers during supplementary play (e.g., automatically split or double-down if the hitched primary player 1002 performs that action, automatically pass on supplementary wagers).

In some embodiments, the table management system requires the secondary players 1010 to be at or near the table 300, within the casino property, or other such distance-based restrictions (e.g., within a pre-determined distance of the table 300). In some embodiments, the table management system may automatically disallow back betting or unhitch secondary players 1010 from their hitched primary players 1002 or tables 300 if the secondary player 1010 is not within a pre-determined distance (outside a "zone of play") of the hitched table 300. For example, if the secondary player 1010 is determined to be more than 50 feet from the table 300, then the table management system may unhitch that secondary player 1010 from any hitched primary players 1002, may disqualify (e.g., revoke) any already-placed wagers in the current round, or may disallow wagers in subsequent rounds (e.g., until the secondary player 1010 returns into the zone of play of the table 300). In some embodiments, when the secondary player 1010 returns into the zone of play of the table 300, the table management system may automatically rehitch the secondary player 1010 to previously-hitched primary players 1002. In some embodiments, the table management system may allow operators to configure a zone of play radius for use with the table 300 (e.g., using a betting railing that includes beacons and behind which secondary players 1010 must stand to be eligible, having directional beacons mounted in the ceiling above and defining secondary betting areas, having back-betting stations with beacons and around which secondary betters 1010 may gather, geofencing secondary betting areas). Such proximity requirements may facilitate satisfying regulatory requirements or improve security of secondary wagering.

In some embodiments, the table management system may provide aspects of secondary betting information to the dealer 304 via the table management device 320. For example, the user interface on the table management device 320 may display whether or how many secondary players 1010 are currently hitched to primary players 1002 at the table 300 (e.g., as back-bettor player icons behind the positions 602), which secondary players 1010 are hitched to each particular player position 602 or primary player 1002 (e.g., player name, ID, details on active secondary players 1010), or secondary wagering information such as how much each secondary player 1010 has wagered on the current game round, or net performance by the secondary player 1010 over time. In some embodiments, the table management device 320 may allow the dealer 304 or other operations personnel (e.g., via casino management system server 114) to restrict secondary wagering at the entire table 300 (e.g., based on security concerns), or for a particular position (e.g., by request of the primary player 1002).

In some embodiments, the table management system requires the secondary players 1010 to be registered with the table management system (e.g., with the player tracking system). Such registration ensures that the secondary wagering of the secondary players 1010 may be tracked and evaluated (e.g., for security purposes, for income reporting purposes, and so forth), whether that secondary player 1010 is eligible to back bet, has a digital wallet, or such.

Figure 11:
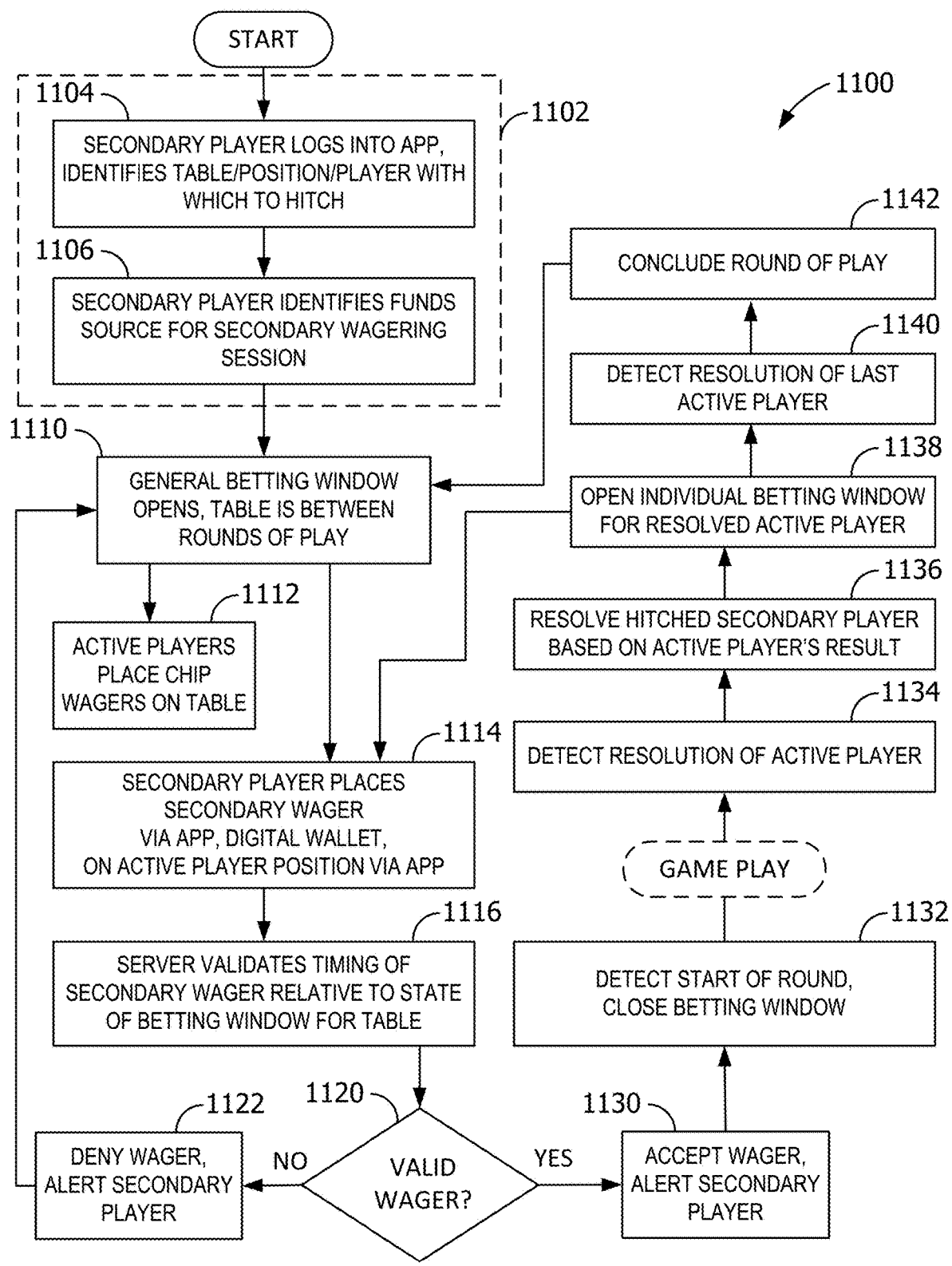
FIG. 11 is a flow chart illustrating an example method for allowing secondary players to back-bet on primary players at the smart table shown in FIG. 10 using the table management system in conjunction with the personal device of the secondary players.

FIG. 11 is a flow chart illustrating an example method 1100 for allowing secondary players 1010 to back-bet on primary players 1002 at the smart table 300 shown in FIG. 10 using the table management system in conjunction with the personal device 1012 of the secondary players 1010. In the example embodiment, the secondary player 1010A spectates a table game of blackjack being played at the table 300 and wishes to back-bet on (e.g., hitch to) the primary player 1002B at player position 602B. Initially, the secondary player 1010A performs a few setup steps 1102 before they enter secondary wagering. More specifically, the secondary player 1010A logs into the player app on their personal device 1012A and identifies the table, position, or player with which they wish to hitch (operation 1102). The secondary player 1010A also identifies a funds source (e.g., from their digital wallet) for the secondary wagering session (e.g., a bank account or casino player account from which funds will be withdrawn for wagering) (operation 1106). In some embodiments, the secondary player 1010A may perform a preliminary withdrawal transaction from an external funds source to the casino, with which the casino may maintain a working account usable as a working pool of funds for secondary wagering. Once the secondary player 1010A has configured the app to hitch to one or more primary players 1002, the secondary player 1010A may enter secondary wagering with the table management system and the smart table 300.

In the example embodiment, FIG. 11 illustrates a cyclical set of operations (e.g., operations 1110-1142) that occur during each round of game play. The primary players 1002 and secondary players 1010 begin a particular round of play, and the wagering window for the table 300 is open at this time (e.g., able to accept both physical wagers from the primary players 1002 as well as secondary wagers from the secondary players 1010) (operation 1110). The table 300 may generate a unique round ID number for the next round. The round ID number may be used to uniquely identify each round of play at the table 300 for secondary wagering, logging, and other such operations. During the open wagering window, primary players 1002 place primary wagers by placing chips on the table 300 at this time, and until the first card of the hand is dealt (e.g., in the example of blackjack) (operation 1112). In this example, the primary player 1002B places a $5 chip on their wagering area 310B. It should be understood that each game round includes various actions by the primary players 1002, but some actions of the primary players 1002 may be excluded from the method 1100 shown in FIG. 11 to the extent that they do not impact the novel functionality described herein. It should also be understood that reference to "wagering windows" may refer to either a dealer-managed wagering window governing play of the primary players 1002 (e.g., based on the conventions of the particular table game), or to a virtual state (or "virtual wagering window") managed by the table management system to govern when secondary betting may occur. As mentioned above, the table management system may maintain both a general wagering window for the table 300 as well as individual wagering windows for each table position 602. Since the table management system described herein attempts to manage the virtual wagering window(s) to approximately mirror the conventions of the table game (e.g., allowing secondary betters 1010 to place wagers similar to when primary players 1002 would be allowed to place primary wagers), the term "wagering window" may be used synonymously.

During the open wagering window, the secondary players 1010 may place secondary wagers via the player app. In this example, the secondary player 1010A submits a secondary wager (e.g., $20) on the player position 602B of the primary player 1002B from their funds source (e.g., their working funds account, as configured during player setup 1102) (operation 1114). The personal device 1012A transmits a secondary wager request to the table management system. The table management system analyzes the secondary wager request and determines whether the received secondary wager is valid (operation 1116). The table management system may invalidate the secondary wager request in several circumstances. For example, if the table management system 300 is using only a general table-level wagering window for the table 300, then the table management system 300 may invalidate or place on hold a secondary wager request if the wagering window for the table is currently closed. If the table management system 300 is using player-level wagering windows for the table 300, then the table management system 300 may invalidate or place on hold a secondary wager request if the wagering window for the hitched primary player (e.g., primary player 1002B) is currently closed. Further, the table management system 300 may invalidate or place on hold the secondary wager request if the hitched primary player 1002B has not placed a primary wager on the upcoming game round (e.g., as detected by the smart table 300 from the wagering area 310B) by the time the game round starts. If the primary player 1002B has not placed a wager, then the dealer 304 will not deal that player 1002B a hand, and thus there can be no back-betting on that player position 602B.

If, at test 1120, the secondary wager request is invalidated, then the table management system denies the secondary wager request and alerts the secondary player (operation 1122). In some embodiments, the table management system may suspend the secondary wager request until the next game round, and may allow the secondary player 1010A to change or cancel the suspended secondary wager request. In such situations, the secondary player 1010A does not participate in back-betting on the current game round and, instead, waits for either the general wagering window to re-open at the conclusion of the current round of play (e.g., returning to operation 1110), or for the individual wagering window of the hitched primary player 1002B to reopen (e.g., returning to operation 1114).

If, at test 1120, the secondary wager request is valid, then the table management system accepts the secondary wager as a valid wager and alerts the secondary player 1010A that their wager is active for the current round of play (operation 1130). Subsequently, the smart table 300 detects the start of the round of play and closes wagering windows for the secondary players 1010 (operation 1132). As described above, in some embodiments, start-of-round detection may be determined automatically (e.g., based on a first card draw), or may be determined based on dealer input (e.g., based on a button push by the dealer 304). The dealer 304 thus begins game play, and the wagering window(s) are closed at this point in the process.

During game play, the table management system automatically detects resolution of the hitched primary player 1002B (operation 1134), as described above. The detection determines whether the primary player 1002B has won, lost, or tied with the house. The table management system resolves any secondary wagers hitched to the primary player 1002B (operation 1136), and may transmit a notification of the result to the secondary player 1010A. If the table 300 is using individual wagering windows, the table management system opens the individual wagering window for the primary player 1002B after their play has been resolved (operation 1138). Play continues until the table 300 detects the resolution of the last primary player (e.g., primary player 1002E) (operation 1140). Once the last primary player has been resolved, or when the dealer 304 presses the button to indicate termination of the game round, the table management system concludes the current round of play and reopens the wagering window for the table (operation 1142). As such, the table management system cycles through rounds of play, allowing secondary players 1010 to back-bet on primary players 1002 while providing security mechanics to ensure that the secondary players 1010 conform to the betting rules of the table game.

Figure 12:
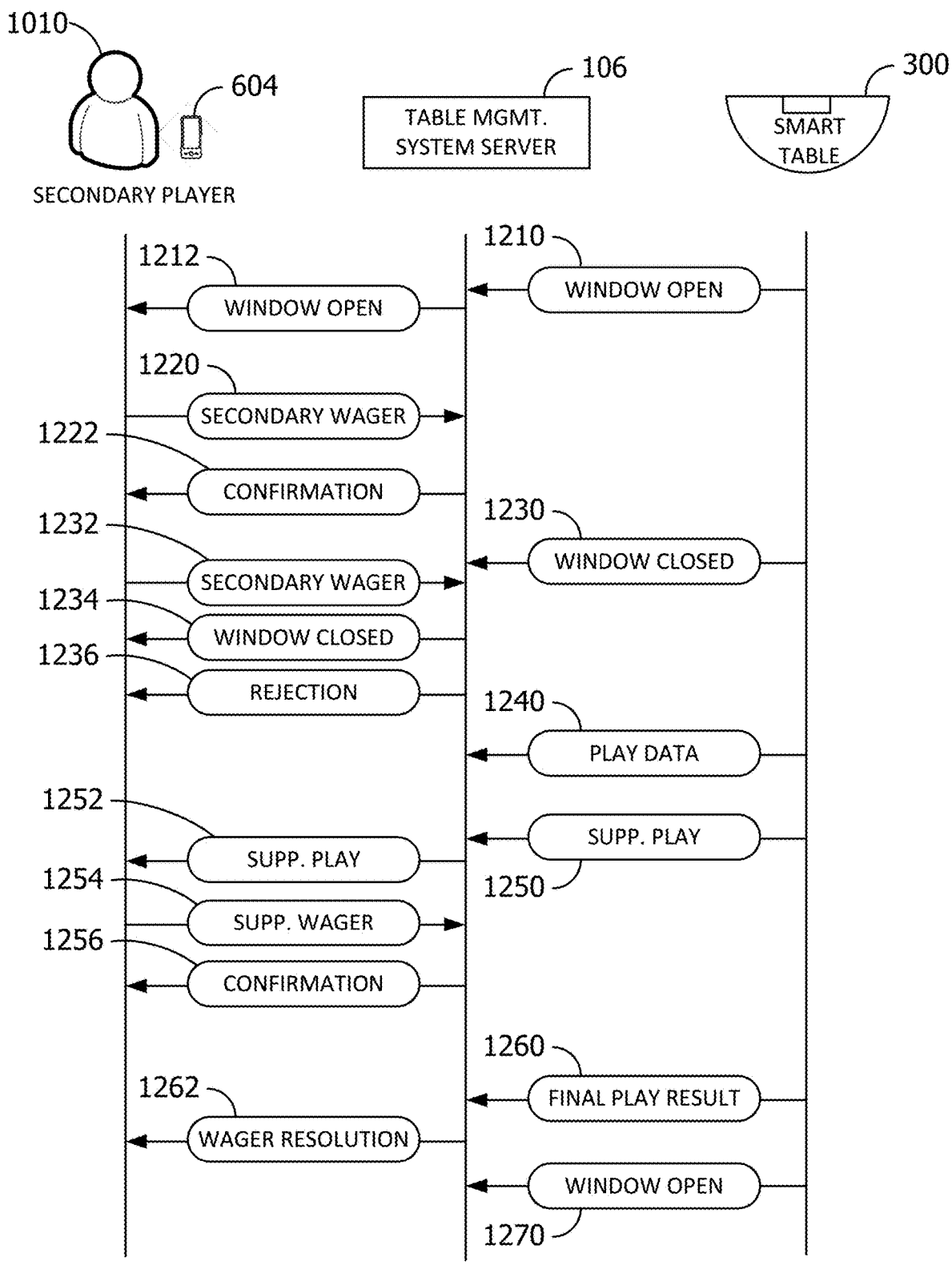
FIG. 12 is a swim lane diagram illustrating various interactions between the personal device of secondary player, the table management server, and the smart table during secondary wagering.

FIG. 12 is a swim lane diagram illustrating various interactions between the personal device 604 of secondary player 1010, the table management server 106, and the smart table 300 during secondary wagering. In FIG. 12, timing of various secondary wagering is depicted (e.g., top down). In the example embodiment, the table 300 opens the wagering window for secondary wagering at the table 300 and transmits a WINDOW OPEN message to the table management system server 106 at operation 1210 (e.g., at the conclusion of a previous round of play). At operation 1212, the table management system server 106 identifies any active secondary players 1010 currently hitched to or otherwise viewing play at the table 300 and transmits a WINDOW OPEN message to the personal device 1012 of those players (e.g., for display to the secondary players 1010, to allow submission of secondary wagers from devices 604). At such time, secondary players 1010 are prompted (e.g., by the player app having received the window open message) to enter secondary wagers.

In the example embodiment, the secondary player 1010 submits a secondary wager through the player app on their personal device 1012, and the personal device 1012 transmits a secondary wager message to the table management system server 106 at operation 1220. In other embodiments, the personal device 1012 may be in direct communication with the table 300 and may submit the secondary wager directly to the table 300, and the table 300 may transmit a confirmed secondary wager message to the table management system server 106, as described above. Upon receipt, the table management system server 106 determines that the wagering window for the table 300 is currently open, enters the secondary wager as a valid wager (e.g., into the table management database 1320), and transmits a confirmation message to the personal device 1012 confirming the validity of the secondary wager at operation 1222. As such, the secondary player 1010 has a valid and active secondary wager hitched to the outcome of a particular primary player 1002 for the upcoming round of play.

At some point, the table 300 detects that the round of play is starting (e.g., automatically via deal of cards, manually through button press of the dealer 304, or such as described above). Upon such detection, the table 300 transmits a WINDOW_CLOSED message to the table management system server 106 at operation 1230. As such, secondary wagering at the table 300 is now closed and initial secondary wagers are no longer being allowed. In this example, another secondary wager is submitted (e.g., by the same or some other secondary player 1010) to the table management system server 106 at operation 1232, and after the wagering window for the table 300 is closed. The table management system server 106 determines that the wagering window is currently closed and transmits a rejection message to the personal device 1012 of the secondary player 1010 at operation 1236, thereby informing the secondary player 1010 of the invalidity of their wager. In some embodiments, the table management system server 106 may additionally send a WINDOW_CLOSED message to the personal device 1012 of secondary players 1010. The player app may display the window status of the table 300 to the secondary player 1010 to allow the player to understand when they can and cannot enter secondary wagers. Further, the player app may restrict secondary betting when the window status of the table 300 is closed. In the example shown here, the secondary wager entered at operation 1232 is submitted to the table management system server 106 before the personal device 1012 of the secondary player 1010 receives the window closed message at operation 1234.

The current round of play is conducted from the time that the window closes (e.g., at operation 1230) to the time that play is finally concluded for all players and the house. During the round, the table 300 may send various round data to the personal devices 1012 of the secondary players 1010. For example, as cards are dealt, the table 300 may detect which cards are dealt to which positions 602 and may transmit the dealt card information to the personal device 1012 at operation 1240 for display to the player such that the player can follow along with the round without necessarily watching the table 300 directly. In such an embodiment, each dealt card may be treated as play data that is transmitted to the personal devices 1012. In other embodiments, the table 300 may transmit other play data particular to the type of game being played at the table 300 (e.g., BALL SPIN event or BALL DROP result for Roulette, dice throw result for craps, and so forth).

In some situations, supplementary play may result for one or more primary players 1002 during the round of play. For example, one hitched primary player may be dealt a 7 and a 4 as their initial two cards in blackjack and may choose to double down (e.g., by moving an additional wager in chips equal to their initial wager amount out into their wagering area 310). As such, the table 300 may detect the supplementary wager based on the addition of the additional wager amount, and perhaps in conjunction with card values of the primary player 1002 (e.g., detecting that the player 1002 has a total of 11 and players typically double down with values between 8 and 11). When the table 300 determines that a supplementary wager is underway at the hitched player position 602, the table 300 to open a supplementary wagering window for that player position 602 (e.g., allowing hitched secondary players 1010 a chance to decide whether or not to place an additional supplemental wager). The table 300 transmits a supplementary play event to the table management system server 106 at operation 1250, and the table management system server 106 transmits a supplementary play event to the personal device 1012 of the hitched secondary players 1010. The supplementary play event alerts the table management system server 106 and hitched personal devices 1012 of the opening of the supplementary wagering window for that position 602. In some embodiments, the table 300 may transmit the supplementary play event directly to the personal device 1012 of hitched players. The supplementary play event may include a type of supplementary play (e.g., split situation, double-down situation) and current dealt-card values (e.g., two 8's being split, doubling down on a 6 and 4).

While the supplementary wagering window is open, in this example, the secondary player 1010 places a supplementary wager on the hand of the hitched primary player 1002 (e.g., automatically based on settings configured in the player app, manually through the secondary player 1010 selecting their course of action). At operation 1254, a supplementary wager is transmitted from the personal device 1012 to the table management system server 106. The table management system server 106 determines that a supplemental wagering window is currently open for the associated player position 602, that the supplemental wager is timely submitted and otherwise valid, and enters the supplementary wager as a valid wager for the secondary player 1010. The table management system server 106, at operation 1256, transmits a confirmation message back to the personal device 1012 confirming the proper entry of the supplementary wager.

Once play has concluded for the hitched player position 602, either individually or for the whole table 300, the table 300 transmits a final play result to the table management system server 106 at operation 1260. In some embodiments, the table 300 automatically determines when play is concluded (e.g., via any of the automatic detection methods described above). In other embodiments, play is concluded manually (e.g., by the dealer 304 toggling the wagering window via a button or via table management device 320). The table 300 automatically determines final play results for each player position 602 as discussed above. The final play results include outcomes for one or more player positions 602 (e.g., win, lose, push, blackjack, house blackjack, house bust, player bust) and may include additional play data as described above. At operation 1260, once play has concluded, the table 300 transmits final play results 1260 to the table management system server 106. The play result identifies an outcome for one or more of the player positions 602 of the primary players 1002 (e.g., win, lose, draw), and may include supplemental information such as the primary wager amount, an amount won or lost by the primary player 1002, an outcome type (e.g., black jack, over-21 bust), ordered card values for the position 602 (e.g., 7, 5, King), dealer card values and outcome type, or other such data about the round. The table management system server 106 uses the final play results to determine the wager outcomes of secondary wagers. The secondary wager outcomes of the secondary players 1010 match that of the hitched primary player 1002 at that hitched player position 602. As such, the table management system server 106 determines a wager resolution for each secondary wager and transmits the wager resolution to the personal device 1012 of the secondary player 1010 at operation 1262. In winning or push outcomes, the table management system server 106 also credits an account of the secondary player 1010 with the winnings. In some embodiments, the smart table 300 opens the wagering window for the table 300 for the next round of play once the table 300 automatically determines the last of the final play results for the table 300. In the example embodiment, at operation 1270, the table 300 transmits a WINDOW OPEN event to the table management system server 106 to open secondary wagering. In another embodiment, the table management system server 106 may open secondary wagering for the table 300 in response to the final play result 1260 if that final play result 1260 concludes play of the game round (e.g., when the last card is dealt to the house hand).

Figure 13:
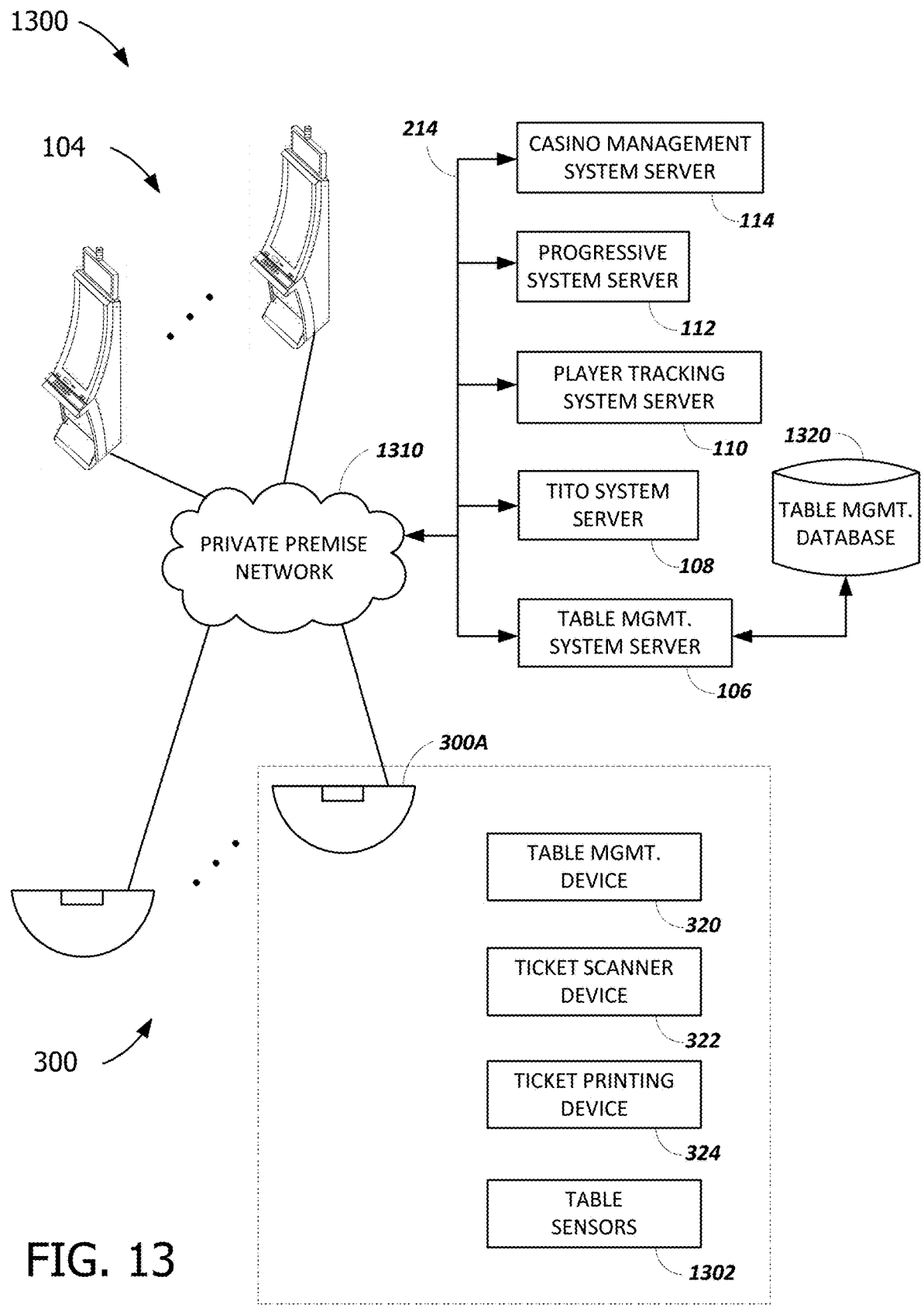
FIG. 13 is a diagram of a networked environment in which smart tables communicate with various back end computing devices.

FIG. 13 is a diagram of a networked environment 1300 in which smart tables 300 communicate with various back end computing devices. In the example embodiment, the networked environment 1300 includes various EGMs 104 and smart tables 300 networked in a private premise network 1310 (e.g., a secure Ethernet-based network not open to the public or players). The network 1310 may be coupled with network 214 or may otherwise be network 214, facilitating network communication between EGMs 104, tables, 300 and servers 106, 108, 110, 112, 114 and a table management database 1320. Each of the smart tables 300 include a table management device 320, a ticket reader device 322, a ticket printing device 324, and one or more table sensors 1302 (e.g., for detecting RFID chips or cards as discussed in the various embodiments above). In some embodiments, the networked environment 1300 supports the table ticketing system described in relation to FIGS. 3-5. In some embodiments, the networked environment 1300 supports the digital wallet and player positioning system described in relation to FIGS. 6-9. In some embodiments, the networked environment 1300 supports the secondary wagering system described in relation to FIGS. 10-12.

Figure 14:
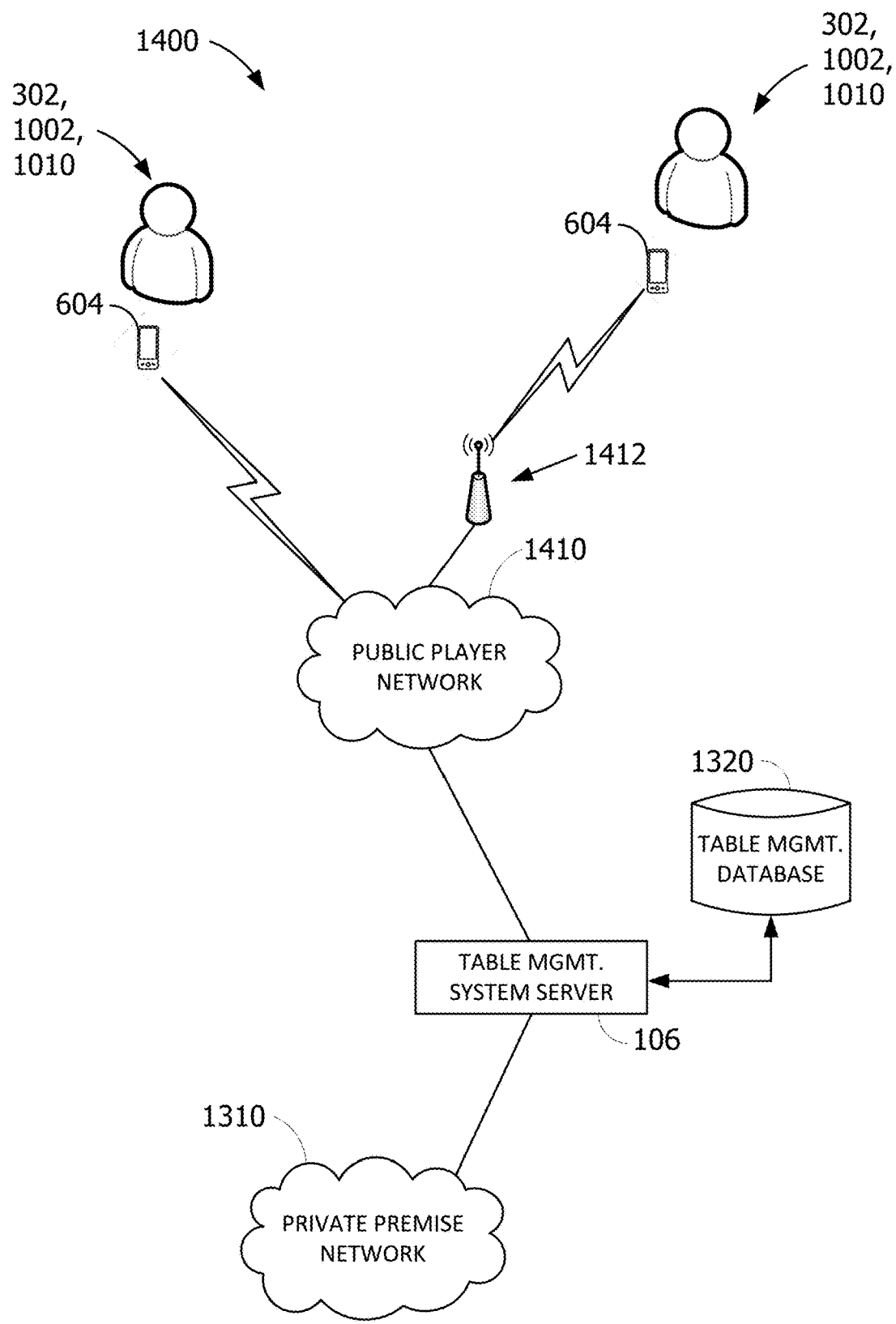
FIG. 14 is a diagram of a player network environment in which players interact with the player positioning, digital wallet, and back-betting systems described herein.

FIG. 14 is a diagram of a player network environment 1400 in which players 302, 1002, 1010 interact with the player positioning, digital wallet, and back-betting systems described herein. In the example embodiment, the table management system server 106 is connected to the private premise network 1310. In addition, the table management system server 106 is also network connected to a public player network 1410 that is open to the players 302, 1002, 1010 and their associated personal devices 604, 1012 to facilitate various connectivity and methods described herein. Some personal devices 604, 1012 of the players may connect with the public player network 1410 via their cellular service provider (e.g., 3G, 4G, 5G cellular network connectivity for smart phones). In some embodiments, some personal devices 604, 1012 of the players may connect to one or more local wireless network beacons 1412. Wireless network beacons 1412 may be WiFi beacons provided by casino operators at their premise, or may be local network beacons provided at smart tables 300. As such, the table management system server 106 is multi-homed to segment the public player network communication from the private premise network communication while enabling the various communications of the systems and methods described herein.

Figure 15:
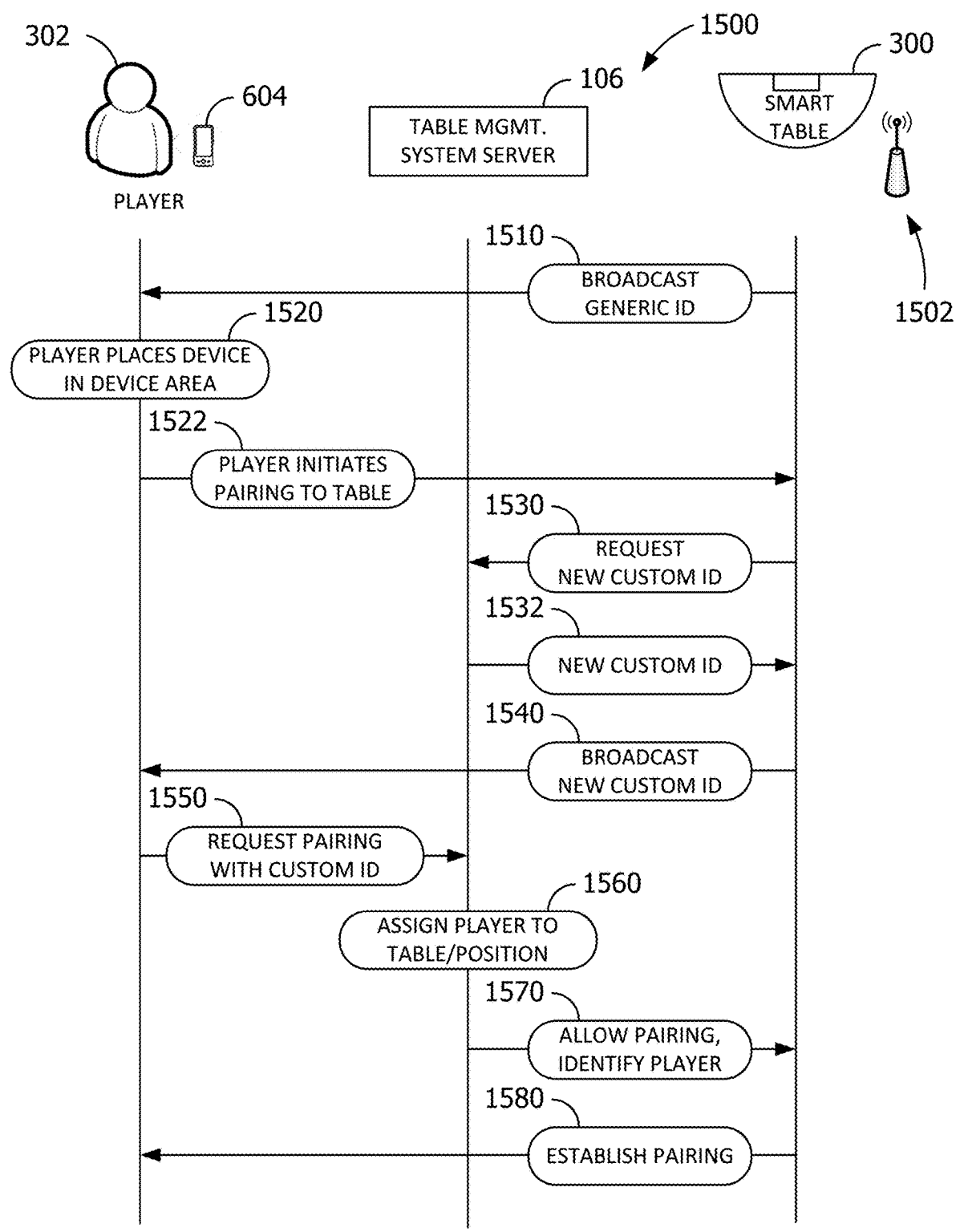
FIG. 15 is a swim lane diagram illustrating various interactions between the personal device of the player, the table management server, and components of the smart table during a cardless connection process.

FIG. 15 is a swim lane diagram illustrating various interactions between the personal device 604 of the player 302, the table management server 106, and components of the smart table 300 during a cardless connection process 1500. The process 1500 allows the player 302 (e.g., the personal device 604 of the player 302) to establish their identity with the table management system (e.g., the table management system server 106) through use of their mobile device 604 and without use of a conventional loyalty card. Cardless connectivity may be used, for example, in facilitating aspects of the ticketing features described herein, the player positioning features described herein, and the digital wallet features described herein. In the example embodiment, the smart table 300 includes an individual wireless beacon ("position beacon") 1502 (e.g., an NFC beacon) at each player position 602 which detects the presence of the nearby mobile device 604 within a device area (e.g., when the player 302 places the device 604 onto or within a pre-configured radius of the device area). In the example embodiment, the position beacon 1502 is embedded within (e.g., underneath the table surface 800 of) the table 300 near the arm rest rail 306 of each player position 602, and may be outlined on the table surface 308 to visually indicate where the player 302 should place their device 604 for proper connectivity. In some embodiments, each wireless beacon 1502 includes a unique device ID that may be used to uniquely identify that beacon 1502 and an association between that beacon 1502 and the particular smart table 300 and player position 602 at that smart table 300 (e.g., via smart table ID, position ID).

At operation 1510, the position beacon 1502 is configured to broadcast a generic ID (e.g., a default broadcast ID) while the beacon 1502 is unpaired. At operation 1520, the player 302 places their device 604 in the device area and initiates pairing via the player app at operation 1522. Upon detecting the pairing request from the device 604, the smart table 300 requests a new custom ID from the table management system server 106 at operation 1530. The new custom ID request includes the unique device identifier for the beacon 1502 ("beacon device ID") that is associated with the particular table 300 and position 602 at that table, thereby allowing the table management system server 106 to uniquely identify which table and position the request is associated (e.g., via association between unique device ID, smart table ID, and position ID at that smart table). The new custom ID request may also include a unique device ID for the mobile device 604 ("player device ID"). The beacon 1502 is configured to allow a dynamic reconfiguration of the beacon ID, allowing the beacon 1502 to change IDs during operation (e.g., to facilitate secure connections). At operation 1532, the table management system server 106 generates a new custom ID (e.g., based on an output of the RNG 212), stores an association of that new custom ID with the beacon device ID, table, position, and optionally the player device ID, and transmits that new custom ID to the smart table 300. In some embodiments, the new custom ID is generated to be unique amongst a pool of wireless beacon devices (e.g., multiple beacons 1502) managed by the table management system server 106. At operation 1540, the smart table 300 reconfigures the beacon 1502 with the custom ID and broadcasts that new custom ID 1540 back to the mobile device 604 of the player 302. In some embodiments, the smart table 300 may generate the new custom ID. In such embodiments, the smart table 300 may also transmit the custom ID to the table management system server 106 for later confirmation during subsequent steps in the pairing process described herein.

At operation 1550, the mobile device 604 receives the new custom ID from the beacon 1502 and transmits a pairing request to the table management system server 106. The pairing request identifies the identity of the player 302 (e.g., via loyalty ID, personal device ID, app ID, or such) as well as the new custom ID received from the beacon 1502. At operation 1560, the table management system server 106 determines with which table and position the pairing request is associated (e.g., based on the received new custom ID) and may authenticate the identity of the mobile device 604 (e.g., based on comparing the device ID of the request with the stored personal device ID associated with the new custom ID). In some embodiments, the table management system server 106 may determine an identity of the player 302 (e.g., based on a player account name, a loyalty account ID, a mobile device ID of the mobile device 604), and may provide player identification and other profile information on the player 302 to the smart table 300. If the request 1550 is authenticated, the table management system server 106 assigns the player 302 to the particular smart table 300 and position 602 (e.g., in the table management database 1320) at operation 1560 and transmits a pairing authorization message to the table 300 authorizing pairing with the mobile device 604 at operation 1570. The authorization message may also provide the identity of the player 302 (e.g., loyalty ID, app ID, or such) and other player information of the player 302 to the table 300. At operation 1580, the table 300 establishes pairing with the mobile device 604.

In some embodiments ("dealer-initiated pairing"), the dealer 304 may prompt the cardless connection process 1500. For example, when the player 302 first occupies a particular position 602, the dealer 304 may initiate the pairing process for that particular position 602 (e.g., via the table management device 320). Upon the dealer 304 initiating the pairing process, the table 300 may identify which beacon 1502 is associated with the chosen position 602 and may then initiate a request for a new custom ID, continuing the process 1500 at operation 1530. In some embodiments, the player 302 may be prompted (e.g., via the player app, after operation 1540), whether they want to pair with the table 300, and may choose to accept or decline the pairing.

In some embodiments, the smart table 300 may detect a disconnection of the mobile device 604 from the beacon 1502 (e.g., player 302 walks too far away from the beacon 1502, player 302 causes disconnection via the player app, dealer 304 disconnects player 302 via table management device 320, beacon 1502 loses power, or such). Upon disconnection, the smart table 300 transmits an unpairing message to the table management system server 106 indicating an unpairing of the player 302 (e.g., their mobile device 604) from the smart table 300. The smart table 300 may unpair the mobile device 604 from the beacon 1502 and may unconfigure the custom ID from the beacon 1502 and may reconfigure the beacon 1502 to broadcast a default broadcast ID. The table management system server 106 may update a record of the player positioning (e.g., within the table management database 1320) to virtually remove the player 302 from the vacated position 602 based on the unpairing.

Figure 16:
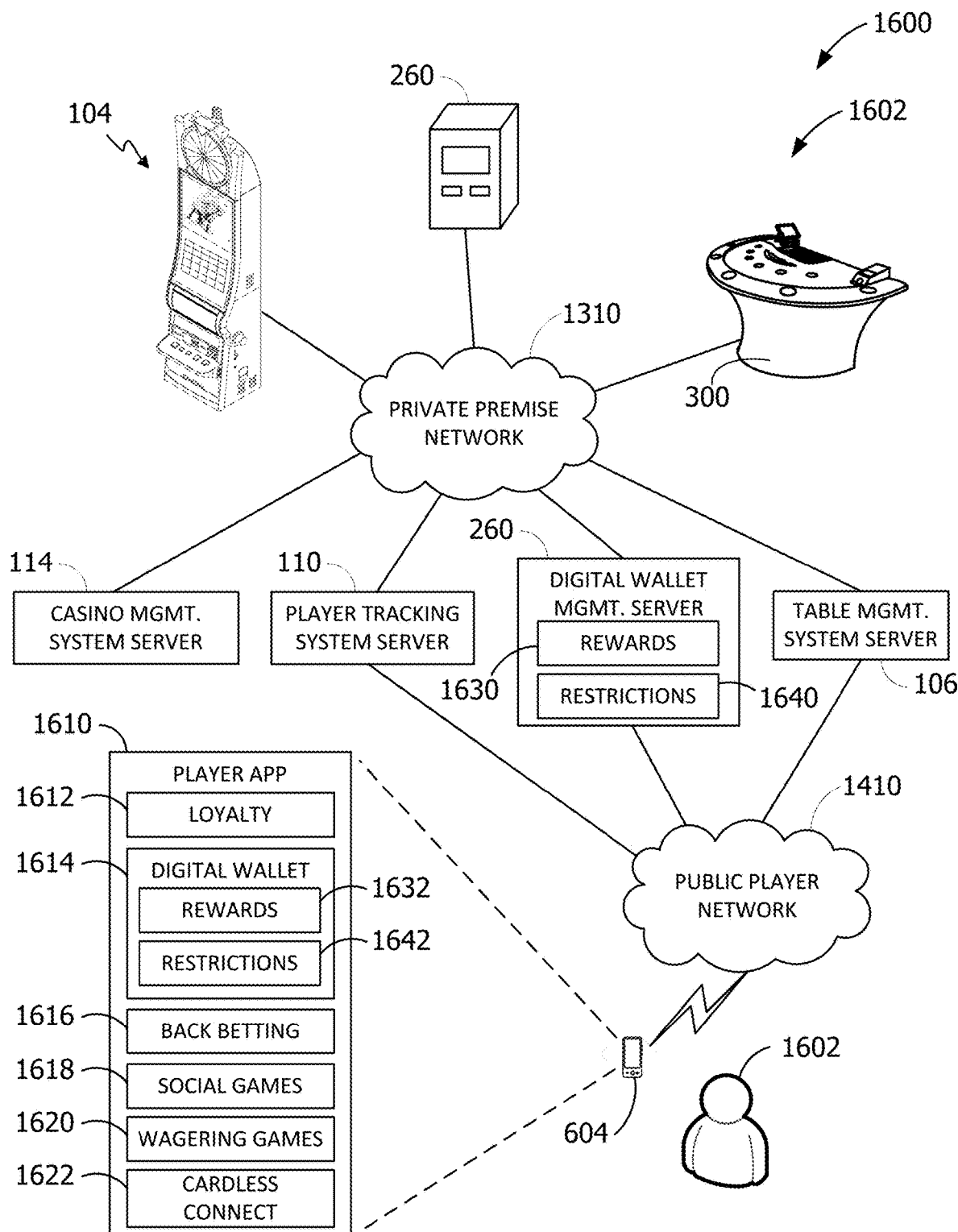
FIG. 16 illustrates a digital wallet management system in which a player uses a digital wallet for various activities within a networked environment.

FIG. 16 illustrates a digital wallet management system 1600 in which a player 1602 uses a digital wallet 1614 for various activities within a networked environment 1602. In some embodiments, the player 1602 may be the player 262 of FIG. 2B, the authorized user 274 of FIG. 2C, the player 302 of FIG. 3, 6, or 15, or the primary player 1002 or secondary player 1010 of FIG. 10. In the example embodiment, the player 1602 uses a player app 1610 installed or otherwise accessed via their mobile device 604 for various interactions within the networked environment 1602. The player app 1610 provides a loyalty component 1612, a digital wallet component 1614, a back betting component 1616, a social games component 1618, a wagering games component 1620, and a cardless connection component 1622. These various components of the player app 1610 facilitate aspects of the various embodiments described herein. For example, the player app 1610 may be used during TITO ticketing at smart table 300 (e.g., as described above with respect to FIGS. 3-6), during player positioning or digital wallet activities (e.g., as described above with respect to FIGS. 7-9), during back betting (e.g., as described above with respect to FIGS. 10-12), during cardless connection with gaming devices 104, kiosks 260, or smart tables 300 (e.g., as described above with respect to FIG. 15), as a part of the digital wallet management system 1600 described herein, or any combination thereof. The social games component 1618 provides various social games that may be played by the player 1602 on their mobile device 604 (e.g., using virtual currencies, or other non-wagering game play). The wagering games component 1620 provides various wagering games that may be played by the player 1602 on their mobile device 604 (e.g., using various real currencies via their digital wallet or other player accounts). Wagering games may require the player 1602 to be within at a physical venue of an operator, which may be determined and verified by GPS location data of the mobile device 604 and geofencing.

In the example embodiment, the digital wallet management system 1600 provides functionality related to digital wallets as described herein. Such functionality may be performed, at least in part, by the digital wallet management server 260. In addition to the above-described functionality, the digital wallet management server 260 provides a rewards component 1630 and a restrictions component 1640. The rewards component ("rewards server") 1630 manages an incentives program that can be configured to provide awards to the player 1602 based on various incentivized activities or accomplishments performed by the player 1602 involving their digital wallet. The restrictions component ("restrictions server") 1640 manages a restrictions program that can be configured to limit or otherwise restrict certain digital wallet-based actions of the player 1602. The digital wallet component 1614 of the player app 1610 includes both a rewards component ("rewards client") 1632 and a restrictions component ("restrictions client") 1642 for facilitating various aspects of the functionality described herein on the mobile device 604 of the player 1602. The term "digital wallet rewards system" (or just "rewards system") may be used herein when discussing aspects of the digital wallet rewards program provided by the rewards server 1630 of the digital wallet management server 260 in conjunction with the rewards client 1632 of the mobile device 604 and various other hardware used for various features of the program. Similarly, the term "digital wallet restrictions system" (or just "restrictions system") may be used herein when discussing aspects of the digital wallet restrictions program provided by the restrictions server 1640 of the digital wallet management server 260 in conjunction with the restrictions client 1642 of the mobile device 604 and various other hardware used for various features of the program.

The rewards system, in the example embodiment, provides an awards configuration interface (not shown) that allows an operator (e.g., a loyalty program administrator, marketing administrator, or such) to configure an award campaign tailored to incentivizing actions associated with digital wallets and digital wallet usage. Each award campaign can be configured with one or more award entries, where each award entry is defined by an award type (e.g., what the award will provide, once accomplished) and one or more trigger conditions (e.g., what actions have to be performed by the player 1602, what accomplishments have to be completed, to trigger the award for the player 1602). Each award entry may also be configured with an award action (e.g., the steps performed by the rewards system to provide the award to the player 1602, once the award is won). Some award entries may be configured with an eligibility definition in which the operator defines criteria on eligibility for the award entry (e.g., awards potentially only available to loyalty members, to a particular loyalty level of players, to players above a particular daily or weekly play level, to a selected list of players, a time period before, after, or during which the award is available to be won, or such). Some award types may provide monetary awards (e.g., real currencies, virtual currencies, merchandise, free plays, or such). Such award entries may, thus, define a funding source for the award entry (e.g., a marketing account or such). The digital wallet rewards system may be used as a stand-alone rewards system or may be used in conjunction with a loyalty program or other awards or incentives campaigns.

In some embodiments, trigger conditions are configured based on aspects of digital wallet usage by the player 1602. For example, some award entries may be configured to trigger based on digital wallet initialization and use by the player 1602, such as when the player 1602 first creates their digital wallet (e.g., to incentivize digital wallet creation and familiarity), when the player 1602 makes an initial deposit to their digital wallet (e.g., to incentivize preparation for use), when the player 1602 makes a first transaction using their digital wallet (e.g., to incentivize use and familiarity with the digital wallet), when the player 1602 first cardlessly connects with an EGM 104, smart table 300, or kiosk 260, when the player 1602 first makes use of their digital wallet for cashing out at the smart table 300, or when the player 1602 first uses their digital wallet to back bet on gaming at smart tables 300. In some embodiments, award entries may be configured to trigger based on ongoing digital wallet usage data, such as when the player 1602 uses their digital wallet (e.g., at EGMs 104, at smart tables 300, or, in some cases, at kiosks 260) to provide credits for a threshold number of game play instances, for a threshold number of gaming days, for a threshold number of days in a predetermined time period, or for a threshold time interval of wager gaming. In some embodiments, award entries may be configured to trigger based on wagering losses (e.g., triggering a bounce-back award when the player 1602 exceeds a predetermined loss amount over a particular period of time), or when exceeding a preconfigured time on or at a particular device. In some such award entries, trigger conditions may identify threshold numbers based on game instances or threshold time intervals of wager gaming at a particular type of device (e.g., X number of spins at slot-style EGMs 104 or bar top EGMs 104, Y number of hands at smart tables 300, Z number of back bets made at smart tables 300) or at particular games or types of games (e.g., X number of spins playing a particular slot-style title, Y number of hands at a black jack smart table 300).

In some embodiments, award types for an award instance may include loyalty program points, comp dollars, a specified prize (e.g., particular merchandise, particular food or beverage, meal voucher, entry into a tournament), a personal banker transaction (PBT), table game promotional play at smart table 300, electronic gaming machine promotional play, or user-selectable percent of matching funds up to a user-selectable limit. A PBT may, for example, involve converting player loyalty points or player loyalty funds to free slot play, free table game play, extra credit, or such, via a digital wallet transaction with an EGM 104 or smart table 300. A PBT may, in some embodiments, involve converting game credits to digital wallet credits via a digital wallet transaction with the EGM 104 or smart table 300. In some smart table embodiments, award types may include match play offers, promo chips, entry into tournament play, or tournament play credits. In some EGM embodiments, award types may include entry into tournament play or tournament play credits.

In some embodiments, eligibility criteria may be configured for award entries. The rewards system may provide various types of eligibility criteria, such as by loyalty level minimum (e.g., gold, silver, bronze level), minimum length of loyalty membership (e.g., 1+ years, 2+ years, 5+ years), player age range (e.g., 65+, 18-30), or other player profile criteria, or particular players. In some embodiments, eligibility criteria may be based on game play profile data, such as how often they play a particular type of game, their daily spend average or other periodic spend averages (e.g., at particular types of games, particular food or beverage merchants, or overall spend), whether or how often they play mobile or social games or back bet via their mobile device 604. In some embodiments, eligibility criteria may be based on digital wallet usage, such as how often they use their digital wallet, number of digital transactions via their digital wallet, account totals, number of financial institutions, or such.

In some embodiments, award actions are configured for the various types of awards that may be provided by the rewards system. Award actions are the steps performed by the rewards system (e.g., by the rewards server 1630, rewards client 1632, casino management system server 114, or such) to provide the configured award to the player 1602 upon winning the award or upon redemption of the award. Some award types, such as free credits or free plays, may cause the rewards system to add a rewards entry into the digital wallet of the player 1602 (e.g., as a reward transaction into the digital wallet). As such, the player 1602 may view pending, unredeemed awards in their digital wallet and may choose if or when to redeem such awards. Some award types may cause a reward voucher to be printed as a TITO ticket (e.g., at a ticket printer of the EGM 104, kiosk 260, or smart table 300) upon the player 1602 winning or redeeming the award. Some award types may cause the rewards system to upload credits or free plays to an EGM 104 or smart table 300 at which the player 1602 is currently playing (e.g., adding to their existing credit balance at the EGM 104, alerting the dealer 304 to issue free play vouchers or chips to the player 302 at the smart table 300). Some award types may cause the rewards system to transmit a message to a merchant handler to provide free merchandise to the player 1602. Some award types may cause the rewards system to transmit an email or text notification to the player 302 (e.g., for printing, for redemption at a players club, or such).

In some embodiments, award multipliers may be provided by the digital wallet management system 1600. The digital wallet management system 1600 may provide an award multiplier user interface for defining one or more player loyalty award multipliers. Award multipliers may include an award type multiplier data corresponding to one or more selected player loyalty award multipliers. The one or more player loyalty award multipliers may, for example, include a per-award multiplier. When a transaction value is being determined for an award type, the process may include multiplying the transaction value by the per-award multiplier.

In the example embodiment, the rewards system provides a configuration interface to rewards system administrators (e.g., casino operators, marketing administrators, digital wallet management system administrators, or such) that allows the administrators to configure the various aspects of award campaigns and their associated award entries. The rewards system allows the administrator to configure campaigns and award entries, enable, monitor, reconfigure, and disable the various award campaigns. The rewards system allows the administrator to identify funds sources for various awards. The rewards system may store such campaign data in a database (not separately shown), and may configure mobile device 604 (e.g., rewards client 1632), digital wallet management server 260 (e.g., rewards server 1630), or other components of the player app 1610 or other server systems 102 to monitor for the occurrence of various conditions associated with active award campaigns and their associated award entries. Upon detecting the occurrence or satisfaction of a particular trigger condition by the player 1602, a trigger alert message may be sent to the digital wallet management server 260 identifying the occurrence of the trigger condition, as well as particular supporting details (e.g., timestamp, trigger condition ID, award entry ID, mobile device ID, player ID, or such). Upon satisfaction of the trigger condition(s) for an active award entry by an eligible player 1602, the digital wallet management server 260 provides the configured award to the player 1602 (e.g., via the award actions configured for that award entry).

The restrictions system, in the example embodiment, provides a restrictions configuration interface (not shown) that allows an administrator (e.g., a casino operator, a financial administrator) to configure restrictions surrounding use of the digital wallet. The administrator configures one or more restriction entries that define disallowed uses of the digital wallet. More specifically, restriction entries may include an excluded action definition (or just "restricted action") and a scope of player restriction definition (or just "restriction scope"). The excluded action definition defines what action(s) the restriction entry is configured to prohibit with regard to digital wallet usage. The restriction definition defines the players 1602 to which the restriction entry will apply. While the restriction examples described herein are framed as exclusions (e.g., with digital wallet operations being, by default included unless expressly excluded by a restriction entry), it should be understood that the digital wallet management system 1600 could provide operations as inclusions (e.g., with digital wallet operations being, by default, excluded unless expressly included by an "inclusion entry").

The digital wallet includes a wagering account (or "play account") that is the primary source of wager game funding from the digital wallet during play sessions. To fund the play account, the player 1602 performs a funds transfer from an external account (e.g., bank account, payment card account, third-party digital wallet account) into the play account of their digital wallet. The digital wallet management server 260 or other server 102 manages the play account of the digital wallet on behalf of players 1602, tracking account totals, performing withdrawal and deposit transactions with the gaming devices (e.g., EGMs 104, kiosks 260, smart tables 300), performing purchase transactions from digital wallet accounts (e.g., purchases at merchants), providing a player interface to view accounts and transaction history, and so forth. During game play, the player 1602 may use their digital wallet to perform "internal withdrawal-type transactions" from their digital wallet. For example, the player 1602 may use their digital wallet to add credits to an EGM 104 (e.g., for slot game play), perform a cash-in transaction at the smart table 300 (e.g., to acquire chips for table game play), or to acquire a TITO ticket with value at kiosk 260 (e.g., to be used at EGMs 104 for credits or at smart tables 300 for chips), where the withdrawals come from their play account of their digital wallet. Similarly, the player 1602 may use their digital wallet to perform "internal deposit-type transactions" from their digital wallet. For example, the player 1602 may receive credits back into their play account of their digital wallet by, for example, cashing out at the EGM 104 to their play account, cashing out at the smart table 300 to their play account, or redeeming a TITO ticket at the kiosk 260 to their play account. Such transactions may be referred to as "internal" as they happen between source and target devices within the gaming environment (e.g., mobile device 604 and the gaming devices 104, 260, 300).

In the example embodiment, the administrator defines one or more excluded actions for a new restriction entry. One example excluded action may limit when players 1602 can transfer money from their external accounts into their play account ("external withdrawal transactions") of their digital wallet. Such transactions may be referred to as "external" as they happen between the mobile device 604 (as orchestrated by the digital wallet management server 260 or other internal server 102) and an external party (e.g., banking institution, payment card provider, third-party digital wallet provider, or such). The digital wallet management system 1600 may, for example, restrict players 1602 from performing such external transactions during an active gaming session (e.g., to limit rash decisions by the player 1602 during game play). Some jurisdictions may have gaming regulations restricting such actions. Such actions may be referred to herein as "in-game withdrawals". To limit such in-game withdrawals, the excluded action definition may require the player to terminate an active gaming session before allowing an external withdrawal. The digital wallet management system 1600 determines whether the player 1602 has an active gaming session based on whether the player 1602 is currently carded into an EGM 104 or a smart table 300. As described above, carded play may be initiated by the player 1602 by either presenting a physical loyalty card at the EGM 104 or smart table 300, or by cardlessly connecting to the EGM 104 or smart table 300 with their mobile device 604. A carded play session is tracked by the player tracking system server 110 during normal operation, and the digital wallet management server 260 may query status of active play sessions for particular players 1602 during administration of such digital wallet restrictions (e.g., when the player 1602 attempts to initiate an external withdrawal). In some embodiments, the digital wallet component 1614 may determine that the player 1602 currently has an active gaming session at the EGM 104 or smart table 300 (e.g., based on cardless connection with the mobile device 604), may be pre-configured with the restriction entry, and may reject the external withdrawal operation locally (e.g., without need to query the digital wallet management server 260 or player tracking system server 110). In some embodiments, the digital wallet component may, upon determining that the player has attempted to initiate an eternal withdrawal while in a carded play session, automatically terminate the player's carded play session, and further may require that the player establish a new carded play session to continue gaming once the eternal withdrawal has been completed. In some embodiments, such an in-game withdrawal restriction may additionally be configured with a "cool-off timer." The timer may require the player 1602 to have terminated their last play session for a pre-configured minimum length of time (e.g., 5 minutes, 10 minutes, 30 minutes) before an external withdrawal transaction can be performed. As such, the player 1602 is forced to have a period of time for calm reflection in which they can contemplate whether they wish to proceed with the external withdrawal and continue gaming.

In some embodiments, location restrictions may be used in conjunction with limiting external withdrawal transactions. For example, the digital wallet management system 1600 may use GPS location data or geofencing to enforce a restriction requiring the player 1602 to be outside of a preconfigured distance of the gaming device 104, 300 of their last gaming session, or outside of a preconfigured distance of all gaming devices 104, 300, or outside of a gaming floor (e.g., based on a geofence of a gaming floor at a physical venue). To determine compliance with such location-based restrictions, the digital wallet management system 1600 may collect GPS location data from the mobile device 604 and may compare that device location data to location data of the gaming device 104, 300 last played by the player 1602, or to geofenced areas. Such location restrictions may be used to force the player 1602 to leave the wagering area, adding a location aspect to cooling off and allowing the player to more carefully reflect on their transactions.

Another example excluded action may enforce play limits through use of the digital wallet. The digital wallet management system 1600 may, for example, provide loss limits for pre-configured periods (e.g., daily, weekly, or monthly loss limits). The digital wallet management system 1600 enforces such loss limits by tracking internal withdrawals from and internal deposits into the play account of the digital wallet and prohibiting withdrawals that exceed the particular period limit. For example, the restriction entry may define a daily loss limit of $500 for the player 1602. During a given day, the player 1602 may perform a first internal withdrawal transaction of $300 from their play account into the EGM 104. At a conclusion of this first gaming session, the player 1602 may have a balance of $250 and elect to redeem the balance as a TITO ticket. At this point, the digital wallet management system 1600 computes a net daily balance of the player at −$300 (e.g., just the withdrawal) without crediting the net balance of the $250 because those funds are still out and available for use by the player 1602. The player 1602 may sit down at the smart table 300 and redeem the $250 TITO ticket at the table 300 for chips (e.g., to play Baccarat). The player 1602 may additionally attempt to withdraw another $400 from their play account at the table 300 (e.g., to increase their amount of chips, to replenish their chips after a loss). At the time of the second transaction, the digital wallet management system 1300 determines that their current net daily balance (−$300) minus their attempted internal withdrawal of −$400 (a total of $700 out) would exceed their $500 daily limit. As such, this example restriction entry causes the digital wallet management system 1600 to reject the internal withdrawal attempt. In a related example, presume that after the first gaming session, the player 1602 cashed out their $250 remaining balance from the EGM 104 to their play account of their digital wallet. After such a transaction, the digital wallet management system 1600 credits the net daily balance of the player with the internal deposit, resulting in a net daily balance of −$300+$250=−$50. If the player 1602 then attempts the example $400 internal withdrawal at the table 300, the digital wallet management system 1600 determines that the resultant net daily balance of the player 1602 would be −$50−$400=−$450, which does not exceed the daily limit. As such, the digital wallet management system 1600 allows this transaction to complete.

Other play limits involving the digital wallet may include, for example, restrictions based on time of day, day of week, number of days per week, loss limits at particular games or types of games (e.g., $200 loss limit on video poker games), or complete restrictions from playing certain games or types of games (e.g., disallowing player 1602 from using their digital wallet to fund black jack at table 300).

In some embodiments, the player 1602 may voluntarily configure the digital wallet management system 1600 with one or more restrictions to enforce. Such restrictions may be referred to herein as "elected restrictions," and may include any of the types of restrictions described herein. In some embodiments, elected restrictions may include restricting the player 1602 from or to particular days (e.g., days of the week, days of the month, days of the year, or such). In some embodiments, the digital wallet management system 1600 may provide, via the digital wallet client 1614, a menu of options from which the player 1602 may choose the restrictions they wish to enable. In some embodiments, once enabled, the digital wallet management system 1600 may prohibit the player 1602 from disabling elected restrictions based on certain conditions. For example, the player 1602 may be restricted from disabling elected restrictions until they have ceased wagering activities for a predetermined length of time (e.g., 10 minutes, one hour, one day), or until they satisfy a location limitation (e.g., until they are at their home address, until they are within a predetermined distance from the physical venue).

In the example embodiment, the administrator also defines a scope of player restriction definition for the new restriction entry. The restriction definition defines to which players 1602 the restriction entry will be applied. In some embodiments, restriction scope may be defined based on individual player identity (e.g., a list or group of individuals, based on loyalty ID, mobile device ID, or such). In some embodiments, restriction scope may be defined based on player profile information (e.g., loyalty level, length of loyalty membership, demographic information). In some embodiments, restriction scope may be defined based on historical or current play data (e.g., past, recent, or current session data). Administrators may manually change or update which restrictions apply to particular patrons by changing the restriction scopes for the various restriction entries.

During operation, in the example embodiment, the digital wallet management system 1600 evaluates restriction scopes when trigger condition(s) for a given restriction entry are satisfied (e.g., as a second tier check before activating the particular restriction). If the trigger condition(s) for a given restriction entry are satisfied and if the player 1602 triggering those conditions is included in the restriction scope, then the digital wallet management system 1600 blocks the excluded action.

Figure 17:
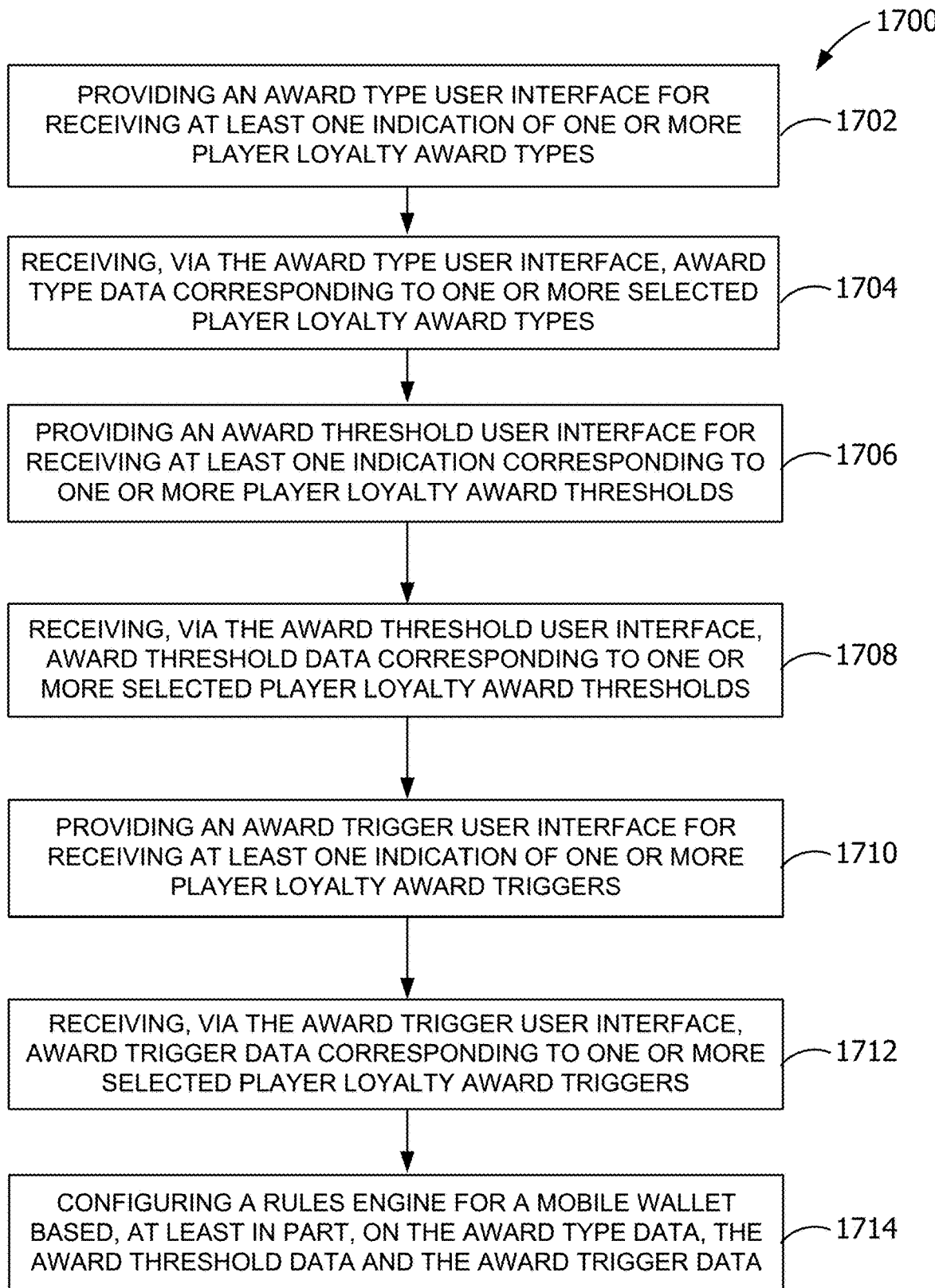
FIG. 17 is a flow diagram for an example embodiment of a method in accordance with some aspects of the present disclosure.

FIG. 17 is a flow diagram for an example embodiment of a method 1700 in accordance with some aspects of the present disclosure. In some embodiments, method 1700 may be the digital wallet management system 1600 (shown in FIG. 16) (e.g., by the digital wallet management server 260, digital wallet component 1614, or such). As with other methods described herein, the number and sequence of blocks shown in FIG. 17 are merely examples. Similar disclosed methods may include more or fewer blocks. Moreover, at least some of the blocks may occur in a different sequence than the sequence that is shown in a flow diagram.

In the example embodiment, method 1700 involves configuring a digital wallet application (e.g., digital wallet component 1614, rewards server 1630, restrictions server 1640, player tracking system server 110) for implementing a casino player loyalty program. In particular, method 400 involves configuring a digital wallet management system for a digital wallet. The digital wallet management system may be implemented, for example, via instructions (e.g., software) stored on one or more non-transitory media. The software may include instructions for controlling one or more devices, such as one or more mobile devices 604 that are running a digital wallet application (e.g., player app 1610), a device of the digital wallet management system 1600, or such.

According to this example, operation 1702 involves providing an award type user interface for receiving at least one indication of one or more player loyalty award types. Operation 1702 may, for example, involve a control system (such as the digital wallet management server 290) controlling a display to present the award type user interface. The award type user interface may for example, be a graphical user interface that includes one or more fields indicating an award type and a corresponding field, virtual button, etc., for receiving user input regarding the award type. The player loyalty award types may, for example, include points, comp dollars, a personal banker transaction (PBT), a specified prize, table game promotional play, electronic gaming machine promotional play and/or a user-selectable percent of matching funds up to a user-selectable limit. A PBT may, for example, involve converting player loyalty points or player loyalty funds to free slot play, free table game play, extra credit, etc., via a digital wallet transaction with an EGM or a smart table. A PBT may, in some instances, involve converting game credits to digital wallet credits via a digital wallet transaction with an EGM or a smart table.

According to this implementation, operation 1704 involves receiving, via the award type user interface, award type data corresponding to one or more selected player loyalty award types. For example, operation 1704 may involve receiving, via the award type user interface, award type data selected by an authorized casino employee. The casino employee may, for example, be responsible for implementing at least some aspects of a casino loyalty program. In some instances, the casino employee may be responsible for implementing at least some aspects of a marketing campaign for the casino. For example, operation 1704 may involve receiving, via the award type user interface, a touch on a touch screen in one or more areas that correspond with one or more fields of the award type user interface. Alternatively, or additionally, operation 404 may involve receiving numerical or text input in one or more fields of the display corresponding to one or more award types.

According to this example, operation 1706 involves providing an award threshold user interface for receiving at least one indication corresponding to one or more player loyalty award thresholds. Operation 1706 may, for example, involve a control system controlling a display to present the award threshold user interface. The one or more player loyalty award thresholds may include a per-award threshold and/or a per-campaign limit on a number of awards that can be issued.

In this example, operation 1708 involves receiving, via the award threshold user interface, award threshold data corresponding to one or more selected player loyalty award thresholds. Operation 1708 may, for example, involve receiving user input from the above-referenced casino employee.

According to this example, operation 1710 involves providing an award trigger user interface for receiving at least one indication of one or more player loyalty award triggers. Operation 1710 may, for example, involve a control system controlling a display to present the award trigger user interface. The one or more player loyalty award triggers may, for example, include one or more of digital wallet creation, an initial deposit to the digital wallet or a first transaction using the digital wallet. Alternatively, or additionally, the player loyalty award trigger(s) may include using the digital wallet to provide credits for a threshold number of game instances and/or using the digital wallet to provide credits for a threshold time interval of wager gaming. In some such examples, the player loyalty award trigger(s) may require the threshold number of game instances and/or threshold time interval of wager gaming to involve a particular type of EGM, a particular game theme, etc.

In this example, operation 1712 involves receiving, via the award trigger user interface, award threshold data corresponding to one or more selected player loyalty award triggers. Operation 1712 may, for example, involve receiving user input from the above-referenced casino employee.

According to this implementation, operation 1714 involves configuring a rules engine for a digital wallet based, at least in part, on the award type data, the award threshold data and/or the award trigger data. For example, operation 1714 may involve a control system updating software code that implements the rules engine. The software code may, for example, be stored on one or more devices of a digital wallet management system, such as the digital wallet management system 1600 disclosed herein. For example, operation 1714 may involve updating lines of software code that correspond to the award type data, the award threshold data and/or the award trigger data.

According to some examples, method 1700 may involve providing an award multiplier user interface for receiving at least one indication of one or more player loyalty award multipliers. Method 1700 may, for example, involve a control system controlling a display to present the award multiplier user interface. According to some such examples, method 1700 may involve receiving, via the award type user interface, award type multiplier data corresponding to one or more selected player loyalty award multipliers. The one or more player loyalty award multipliers may, for example, include a per-rule multiplier. When a transaction value is being determined for an award type, the process may involve multiplying the transaction value by the per-rule multiplier. Method 1700 may involve configuring the rules engine based, at least in part, on the award type multiplier data.

According to some examples, method 1700 may involve providing a usage restriction user interface for receiving at least one indication of one or more digital wallet usage restrictions. Method 1700 may involve receiving, via the usage restriction user interface, usage restriction data corresponding to one or more selected usage restrictions. Method 1700 may involve configuring the rules engine based, at least in part, on the usage restriction data.

Figure 18:
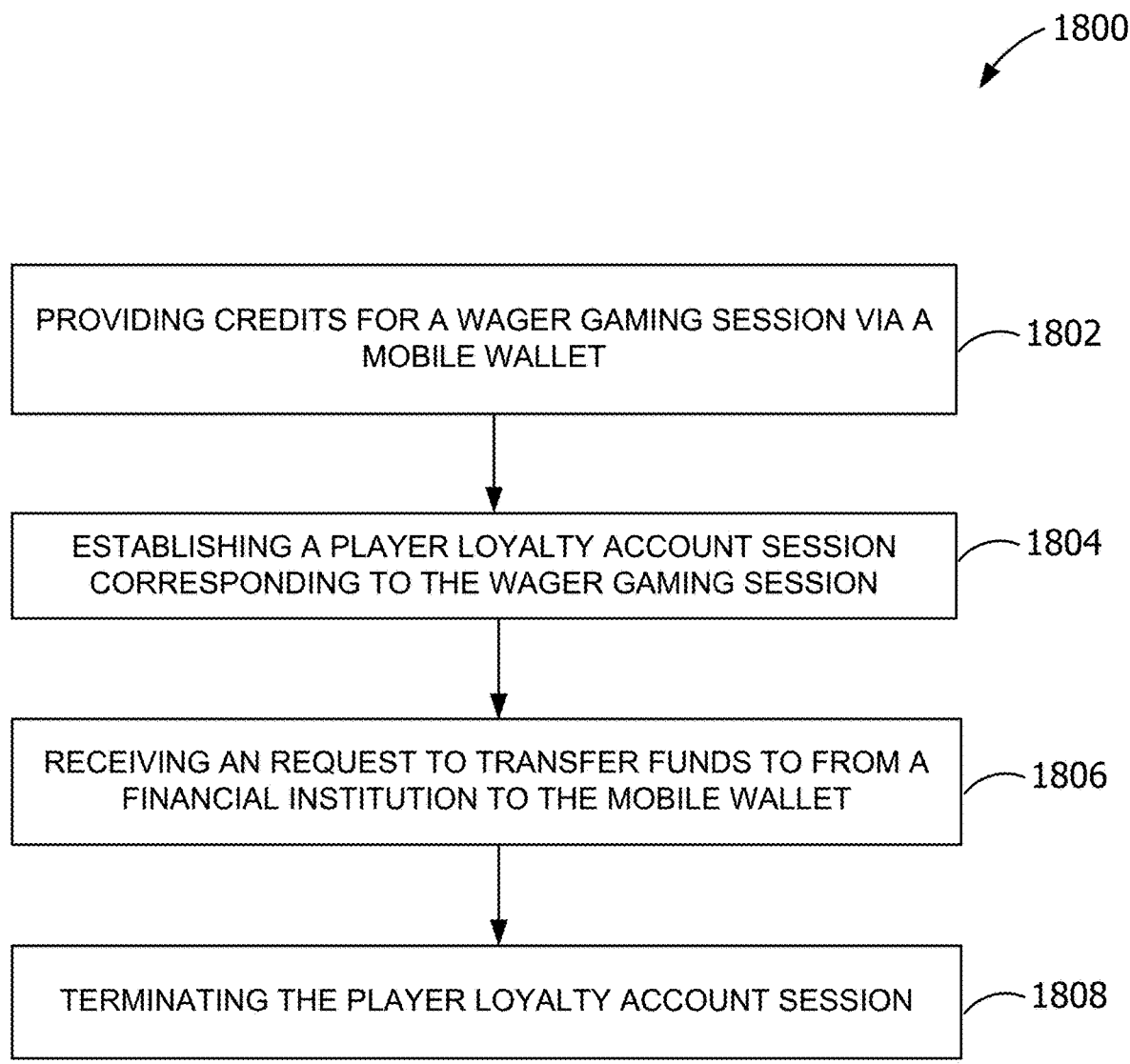
FIG. 18 is a flow diagram for an example embodiment of a method in accordance with additional aspects of the present disclosure.

FIG. 18 is a flow diagram for an example embodiment of a method 1800 in accordance with additional aspects of the present disclosure. In some embodiments, method 1800 may be the digital wallet management system 1600 (shown in FIG. 16) (e.g., by the digital wallet management server 260, digital wallet component 1614, or such).

According to some implementations, the above-referenced digital wallet usage restrictions may correspond to at least one restriction on transferring funds from a financial institution to the digital wallet. In this example, method 1800 involves a "run-time" example of applying one such restriction. The operations of method 1800 occur after a user has enrolled in a casino-sponsored digital wallet program, has a digital wallet application running (e.g., player app 1610) on the user's mobile device (e.g., mobile device 604) and has funds available in the digital wallet.

In this implementation, operation 1802 involves providing credits for a wager gaming session via a digital wallet. In some examples the wager gaming session may be a session on an EGM, whereas in other examples the wager gaming session may be a table gaming session. Accordingly, block 1802 may involve transferring funds from the digital wallet to an EGM or transferring funds from the digital wallet to an interface configured to receive credits for table gaming.

According to this example, operation 1804 involves establishing a player loyalty account session corresponding to the wager gaming session. As noted above, in some instances a digital wallet application may be configured for communication with one or more devices of a casino's player loyalty system, e.g., with the player tracking system server 110 referenced above. According to some such examples, block 1804 may involve establishing a player loyalty account session via the digital wallet. However, in some examples, the player loyalty account session may be established in another manner, e.g., by using a player loyalty card.

In this implementation, operation 1806 involves receiving a request to transfer funds from a financial institution to the digital wallet. For example, a player may wish to continue the wager gaming session but may need to obtain additional funds from a financial institution (e.g., from the player's bank account or credit card account) in order to provide credits for continued wager gaming. Operation 1806 may involve receiving input from the player, e.g., from a user interface of a mobile device that is running a digital wallet application.

In this example, operation 1808 involves terminating the player loyalty account session. For example, operation 1808 may involve receiving input (e.g., a command) from a device of the digital wallet management system 1600 that is implementing the rules engine. The input may, for example, be received by a device of a casino player loyalty system and/or by a gaming device that is providing the wager gaming session. The input may cause the player loyalty account session to be terminated. According to some implementations, the player loyalty account session may be resumed if the player logs in again after transferring the funds from the financial institution.

According to some instances, the above-described digital wallet usage restrictions may correspond to at least one area within which the digital wallet will be able to provide credit for wager-based gaming and outside of which the digital wallet will not be able to provide credit for wager-based gaming. The area may, for example, be a wager gaming area of a casino.

Figure 19:
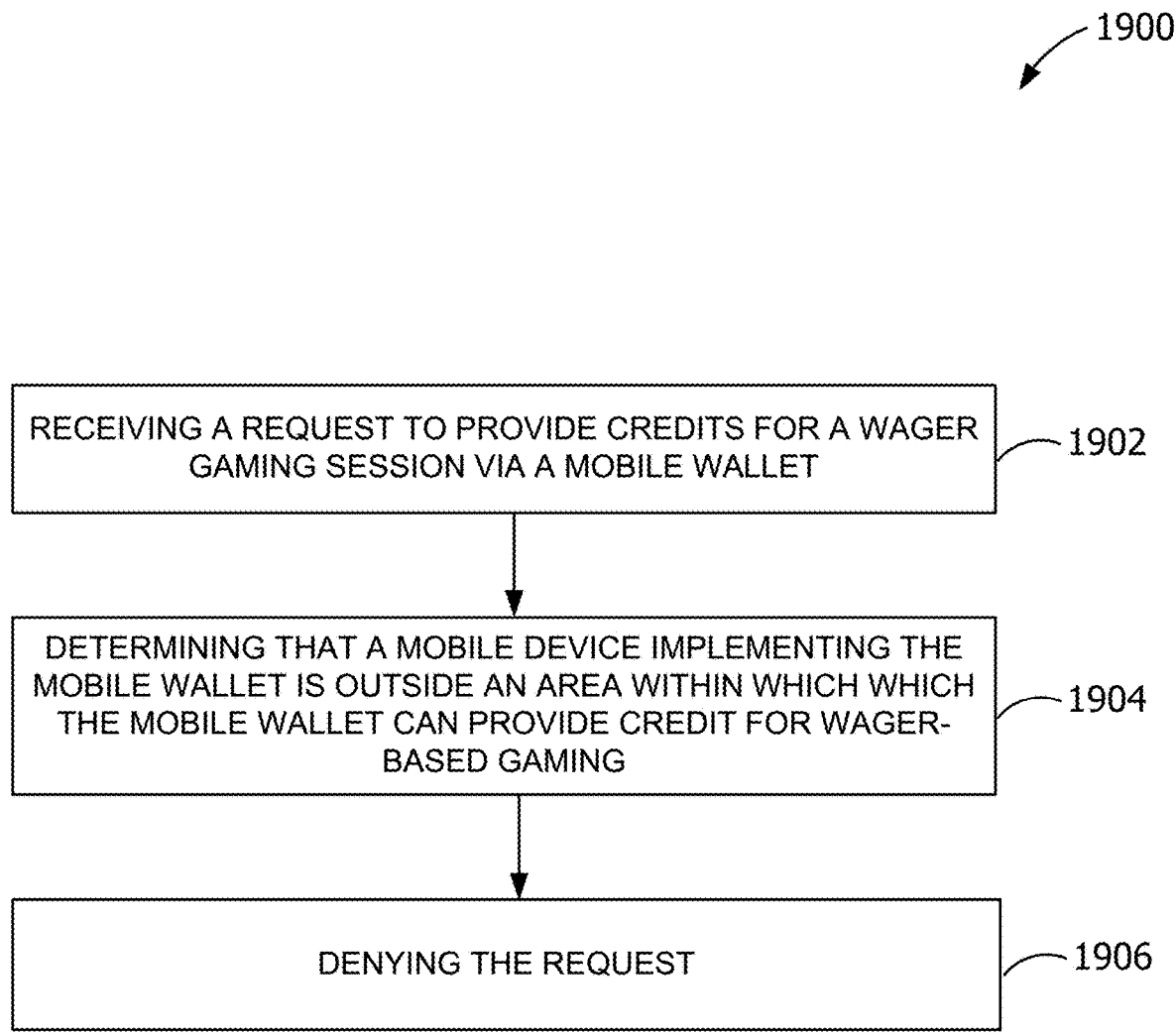
FIG. 19 is a flow diagram for an example embodiment of a method in accordance with additional aspects of the present disclosure.

FIG. 19 is a flow diagram for an example embodiment of a method 1900 in accordance with additional aspects of the present disclosure. In some embodiments, method 1900 may be the digital wallet management system 1600 (shown in FIG. 16) (e.g., by the digital wallet management server 260, digital wallet component 1614, or such).

In this example, operation 1902 involves receiving a request to provide credits for a wager gaming session via a digital wallet. Operation 1902 may, for example, involve a device of the digital wallet management system receiving the request from a mobile device that is running an instance of a digital wallet application. The request may, for example, include location information (e.g., geographic coordinates) indicating the current location of the mobile device.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A system comprising:
a memory storing player positioning information associated with a table gaming environment;
a smart table at which a wagering game is provided to one or more active players and is configured to use radio-frequency identification (RFID)-enabled chips, the smart table includes at least one RFID sensor configured to detect the presence of RFID-enabled chips, the at least one RFID sensor includes a dealer scratchpad for detecting a value of RFID-enabled chips within a scratchpad area on the smart table, the smart table defines a plurality of player positions; and
at least one processor executing instructions which cause the processor to:
detect, by the smart table, presence of a player at a first player position of the plurality of player positions;
receive, from a player computing device of the player, a request to buy into the wagering game for a buy-in value using a funds source from a digital wallet of the player accessed from the player computing device;
display, to a dealer of the wagering game at the smart table, a confirmation that the player at the first player position is entitled to receive the buy-in value;
detect, from the at least one RFID sensor, a chip value within the scratchpad area;
compare the chip value to the buy-in value; and
display, to the dealer, a confirmation that the chip value matches the buy-in value, thereby authorizing the dealer to pass chips from the dealer scratchpad to the player.

2. The system of claim 1, wherein the instructions further cause the processor to:
receive an initiation message indicating a cash-out function;
detect, from the at least one RFID sensor, a chip cash-out value within the scratchpad area; and
initiate a deposit transaction into a digital wallet account of the player for an a transaction amount equal to the chip cash-out value.

3. The system of claim 2, wherein the instructions further cause the processor to transmit the chip cash-out value to the player computing device for chip count verification by the player.

4. The system of claim 2, wherein the at least one RFID sensor includes a chip tray sensor disposed beneath a chip tray of the smart table and configured to detect a chip tray value of chips within the chip tray, wherein the instructions further cause the processor to:
detect, from the chip tray sensor, an initial chip tray value;
detect, from the at least one RFID sensor, removal of the chip cash-out value from the scratchpad area;
detect, from the chip tray sensor, a subsequent chip tray value;
determine that a difference between the initial chip tray value and the subsequent chip tray value is not equal to the chip cash-out value; and
transmit an alert message indicating a discrepancy during cash-out.

5. The system of claim 1, wherein each player position of the plurality of player positions includes a machine-readable image that embeds a unique position identifier for the associated player position, wherein detecting presence of the player at the first player position includes determining that the player is in the first player position based on a scan of an associated machine-readable image of the first player position.

6. The system of claim 1, wherein each player position of the plurality of player positions includes a wireless beacon configured to detect player presence at the first player position based on wireless connectivity to the player computing device.

7. The system of claim 1, wherein detecting player presence at the first player position includes receiving an input from the dealer including an identity of the player and an indication of the first player position.

8. The system of claim 1, wherein the instructions further cause the processor to:
determine a separation distance between the smart table and the player computing device;
compare the separation distance to a pre-determined distance limit for wagering; and automatically unhitch the player from the first player position when the separation distance exceeds the pre-determined distance limit for wagering.

9. The system of claim 1, wherein the funds source is a house account of the player with a casino operator, wherein the instructions are further configured to withdraw the buy-in value from the house account of the player in response to the request to buy into the wagering game.

10. A method for cashless exchange at a smart table, the method being performed by a computing device including at least one processor, the smart table providing a wagering game to one or more active players using radio-frequency identification (RFID)-enabled chips, the smart table including at least one RFID sensor configured to detect the presence of RFID-enabled chips, the at least one RFID sensor includes a dealer scratchpad for detecting a value of RFID-enabled chips within a scratchpad area on the smart table, the smart table defining a plurality of player positions, the method comprising:
  detecting, by the smart table, presence of a player at a first player position of the plurality of player positions;
  receiving, from a player computing device of the player, a request to buy into the wagering game for a buy-in value using a funds source from a digital wallet of the player accessed from the player computing device;
  displaying, to a dealer of the wagering game at the smart table, a confirmation that the player at the first player position is entitled to receive the buy-in value;
  detecting, from the at least one RFID sensor, a chip value within the scratchpad area;
  comparing the chip value to the buy-in value; and
  displaying, to the dealer, a confirmation that the chip value matches the buy-in value, thereby authorizing the dealer to pass chips from the dealer scratchpad to the player.

11. The method of claim 10 further comprising:
  receiving an initiation message indicating a cash-out function;
  detecting, from the at least one RFID sensor, a chip cash-out value within the scratchpad area; and
  initiating a deposit transaction into a digital wallet account of the player for an a transaction amount equal to the chip cash-out value.

12. The method of claim 11 further comprising transmitting the chip cash-out value to the player computing device for chip count verification by the player.

13. The method of claim 11, wherein the at least one RFID sensor includes a chip tray sensor disposed beneath a chip tray of the smart table and configured to detect a chip tray value of chips within the chip tray, the method further comprising:
  detecting, from the chip tray sensor, an initial chip tray value;
  detecting, from the at least one RFID sensor, removal of the chip cash-out value from the scratchpad area;
  detecting, from the chip tray sensor, a subsequent chip tray value;
  determining that a difference between the initial chip tray value and the subsequent chip tray value is not equal to the chip cash-out value; and
  transmitting an alert message indicating a discrepancy during cash-out.

14. The method of claim 10, wherein each player position of the plurality of player positions includes a machine-readable image that embeds a unique position identifier for the associated player position, wherein detecting presence of the player at the first player position includes determining that the player is in the first player position based on a scan of an associated machine-readable image of the first player position.

15. The method of claim 10, wherein each player position of the plurality of player positions includes a wireless beacon configured to detect player presence at the first player position based on wireless connectivity to the player computing device.

16. The method of claim 10, wherein detecting player presence at the first player position includes receiving an input from the dealer including an identity of the player and an indication of the first player position.

17. The method of claim 10, wherein the instructions further cause the processor to:
  determine a separation distance between the smart table and the player computing device;
  compare the separation distance to a pre-determined distance limit for wagering; and
  automatically unhitch the player from the first player position when the separation distance exceeds the pre-determined distance limit for wagering.

18. The method of claim 10, wherein the funds source is a house account of the player with a casino operator, wherein the instructions are further configured to withdraw the buy-in value from the house account of the player in response to the request to buy into the wagering game.

19. A non-transitory computer readable medium that includes computer executable instructions wherein, when executed by a computing device comprising at least one processor in communication with at least one memory device, the computer executable instructions cause the computing device to:
  detect, by a smart table, presence of a player at a first player position of the plurality of player positions, the smart table providing a wagering game to one or more active players using radio-frequency identification (RFID)-enabled chips, the smart table including at least one RFID sensor configured to detect the presence of RFID-enabled chips, the at least one RFID sensor includes a dealer scratchpad for detecting a value of RFID-enabled chips within a scratchpad area on the smart table, the smart table defining a plurality of player positions;
  receive, from a player computing device of the player, a request to buy into the wagering game for a buy-in value using a funds source from a digital wallet of the player accessed from the player computing device;
  display, to a dealer of the wagering game at the smart table, a confirmation that the player at the first player position is entitled to receive the buy-in value;
  detect, from the at least one RFID sensor, a chip value within the scratchpad area;
  compare the chip value to the buy-in value; and
  display, to the dealer, a confirmation that the chip value matches the buy-in value, thereby authorizing the dealer to pass chips from the dealer scratchpad to the player.

20. The non-transitory computer readable medium of claim 19, wherein the instructions further cause the at least one processor to:
  receiving an initiation message indicating a cash-out function;
  detecting, from the at least one RFID sensor, a chip cash-out value within the scratchpad area; and initiating a deposit transaction into a digital wallet account of the player for an a transaction amount equal to the chip cash-out value.

\* \* \* \* \*